(12) United States Patent
Sato et al.

(10) Patent No.: US 6,668,438 B2
(45) Date of Patent: Dec. 30, 2003

(54) PRODUCTION OF VEHICLES

(75) Inventors: Manabu Sato, Yokohama (JP); Masato Takiguchi, Kanagawa (JP); Kouji Sato, Kanagawa (JP); Kouichi Ohira, Kanagawa (JP); Masami Tashiro, Kanagawa (JP); Takashi Matsuoka, Kanagawa (JP); Takamitsu Tajima, Kanagawa (JP); Kenji Kanamori, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 215 days.

(21) Appl. No.: 09/964,674

(22) Filed: Sep. 28, 2001

(65) Prior Publication Data

US 2002/0014008 A1 Feb. 7, 2002

Related U.S. Application Data

(62) Division of application No. 09/458,692, filed on Dec. 10, 1999, now Pat. No. 6,334,252.

(30) Foreign Application Priority Data

Dec. 11, 1998 (JP) .......................... 10-353428

(51) Int. Cl.⁷ ................................ B23P 23/04
(52) U.S. Cl. ................... 29/33 K; 29/33 P; 29/783; 29/791
(58) Field of Search ............... 29/897.2, 897, 29/428–431, 496, 525.14, 783, 786, 787, 791, 793, 795, 794, 33 R, 33 K, 33 P; 296/193–197, 185; 219/121.6, 121.63

(56) References Cited

U.S. PATENT DOCUMENTS 4,194,043 A 3/1980 Lee et al.
4,589,184 A 5/1986 Asano et al.
4,991,282 A 2/1991 Konig
5,027,502 A 7/1991 Sakamoto et al.

(List continued on next page.)

FOREIGN PATENT DOCUMENTS

| | | |
|---|---|---|
| EP | 0 076 934 B1 | 1/1986 |
| EP | 0 184 968 B1 | 3/1988 |
| JP | 2-38193 | 2/1990 |
| JP | 4-201138 | 7/1992 |
| JP | 5-24563 | 2/1993 |
| JP | 5-105133 | 4/1993 |
| JP | 5-105134 | 4/1993 |
| JP | 5-105136 | 4/1993 |
| JP | 5-155365 | 6/1993 |
| JP | 5-162670 | 6/1993 |
| JP | 6-171477 | 6/1994 |
| JP | 7-80398 | 3/1995 |
| JP | 8-104264 | 4/1996 |
| JP | 9-99870 | 4/1997 |
| JP | 10-264870 | 10/1998 |
| JP | 11-91658 | 4/1999 |

*Primary Examiner*—Charles T. Jordan
*Assistant Examiner*—T. Nguyen
(74) *Attorney, Agent, or Firm*—Foley & Lardner

(57) ABSTRACT

A compact vehicle production line is disclosed. The production line comprises a floor process of assembling floor constituent parts. Each is an aluminum alloy extrusion die cast product, which has been made, in an extrusion die casting process, by forcing molten aluminum alloy through a mold cavity in a predetermined direction. The assembled floor constituent parts are welded to make a floor structure. In an interior parts mount process, interior parts are to the floor structure to make a floor unit. In a body main process, each of two body side structures are trimmed to make a body side unit. A roof structure is trimmed to make a roof unit. The floor unit, the body side units, and the roof unit are assembled. The assembly is welded to make a body unit. In a running parts mount process, an under running unit is mounted to the body unit. In an exterior parts attachment process, color body panels are attached to the body unit.

1 Claim, 41 Drawing Sheets

U.S. PATENT DOCUMENTS

| | | |
|---|---|---|
| 5,127,569 A | 7/1992 | Sekine et al. |
| 5,143,270 A | 9/1992 | Hamada et al. |
| 5,155,891 A | 10/1992 | Yoshii et al. |
| 5,184,766 A | 2/1993 | Takahashi et al. |
| 5,209,541 A | 5/1993 | Janotik |
| 5,211,216 A | 5/1993 | Drury et al. |
| 5,267,683 A | 12/1993 | Hamada et al. |
| 5,338,080 A | 8/1994 | Janotik et al. |
| 5,480,208 A | 1/1996 | Cobes et al. |
| 5,619,784 A | 4/1997 | Nishimoto et al. |
| 5,765,906 A | 6/1998 | Iwatsuki et al. |
| 6,145,180 A | 11/2000 | Kogai et al. |
| 6,421,893 B1 * | 7/2002 | Katayama et al. .......... 29/33 K |

* cited by examiner

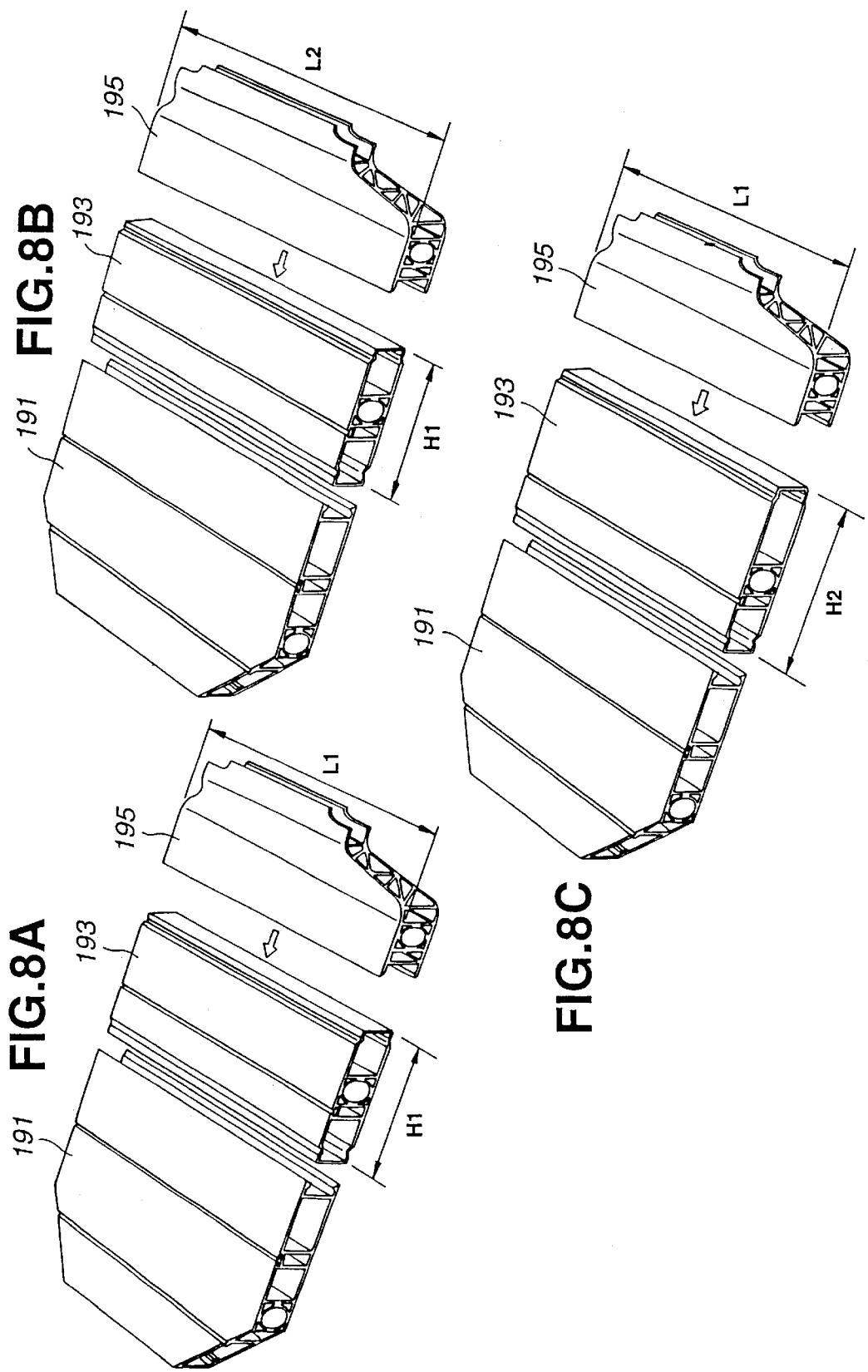

PRODUCTION OF VEHICLES

This is a Divisional of application Ser. No. 09/458,692, filed Dec. 10, 1999, now U.S. Pat. No. 6,334,252.

BACKGROUND OF THE INVENTION

1. Field of the Invention

The present invention relates to production of vehicles, and more particularly to a production method of vehicles, a production system of vehicles, and a vehicle.

2. Acronyms

The written description provided herein contains acronyms, which refer, for example, to various stages of production of vehicles. For purposes of the written description herein, acronyms will be defined as follows:

Floor Process Unit (FPU)
Interior Parts Mount Process Unit (IPMPU)
Body Main Process Unit (BMPU)
Running Parts Mount Process Unit (RPMPU)
Exterior Parts Attachment Process Unit (EPAPU)
Assembly Process Unit (APU)
Weld Process Unit (WPU)
Floor Main Process Unit (FMPU)
Rear Floor Module Process Unit (RFMPU)
Rear End Module Process Unit (REMPU)
Body Side LH Process Unit (BSLHPU)
Roof Process Unit (RPU)
Body Side RH Process Unit (BSRHPU)
Body Side Sub-line Inner Trimming Unit (BSSITU)
Set Process Unit (SPU)
Body Unit (UBU)
Under Running Unit (URU)
Liquid Supply Process Unit (LSPU)
Window Attachment Process Unit (WAPU)
Door Mount Process Unit (DMPU)
Exterior Surface Decoration Process Unit (ESDPU)
Right-hand Door Assembly Process Unit (RDAPU)
Left-hand Door Assembly Process Unit (LDAPU)

3. Background Information

In production of a body of an automotive vehicle, a various kinds of pillars, side sills, side members, cross members, a cowl box, and roof rails are made of a structurally strengthened member having a closed section, and they are connected to form a body structure. Body panels are attached to the structure to form a three-dimensional appearance of the body.

SUMMARY OF THE INVENTION

Within a plant, an automated production line is installed for production of automotive vehicles. The production line begins with a pressing process for production of body panels of different three-dimensional appearances. Conventionally, a painting and coating process is included in the production line. The painting process necessarily requires a drying process. Also included in the production line is equipment to cope with a change in body color. The drying process requires a lot of space within the plant. Accordingly, the conventional production of vehicles requires a great number of processes ranging from 800 to 1000 if a space needed for one vehicle is counted as one process.

The conventional production of vehicles demands workers to do their jobs within such closed spaces as an engine compartment and a vehicle cabin. Thus, much time and effort are consumed. For example, a worker must enter a vehicle cabin through an opening for a door to do his job.

An object of the present invention is to accomplish an enormous reduction in number of processes for production of vehicles as well as a remarkable improvement in working environment.

According to one aspect of the present invention, there is provided a method of production of vehicles, comprising:

a floor process of assembling floor constituent parts, each being a light metal extrusion die cast product, and connecting said assembled floor constituent parts to make a floor structure;

an interior parts mount process of mounting interior parts to said floor structure to make a floor unit;

a body main process of trimming each of two body side structures to make a body side unit, trimming a roof structure to make a roof unit, assembling said floor unit, said body side units, and said roof structure, and connecting said assembled floor unit, body side units and roof unit to make a body unit;

a running parts mount process of mounting to said body unit an under running unit that includes an engine, a power train, and a suspension unit; and an exterior parts attachment process of attaching body panels to said body unit.

According to another aspect of the present invention, there is provided a system of production of vehicles, comprising:

a floor process unit (FPU) for assembling floor constituent parts, each being a light metal extrusion die cast product, and connecting said assembled floor constituent parts to make a floor structure;

an interior parts mount process unit (IPMPU) for mounting interior parts to said floor structure to make a floor unit;

a body main process unit (BMPU) for trimming each of two body side structures to make a body side unit, trimming a roof structure to make a roof unit, assembling said floor unit, said body side units, and said roof structure, and connecting said assembled floor unit, body side units and roof unit to make a body unit;

a running parts mount process unit (RPMPU) for mounting to said body unit an under running unit that includes an engine, a power train, and a suspension unit; and an exterior parts attachment process unit (EPAPU) for attaching body panels to said body unit.

According to other aspect of the present invention, there is provided an automotive vehicle comprising:

a floor unit made by mounting parts to a floor structure that has been made by assembling and connecting floor constituent parts, each being a light metal extrusion die cast product;

two body side units made by trimming two body side structures;

a roof unit made by trimming a roof structure;

said roof unit, said body side units, and said roof unit being assembled and connected to make a body unit;

an under running unit that includes an engine, a power train, and a suspension unit, said under running unit being mounted to said body unit;

door units made by trimming door structures, said door units being mounted to said body unit; and body panels attached at least to said body unit.

BRIEF DESCRIPTION OF THE DRAWINGS

FIGS. 8A, 8B, and 8C are exploded perspective views of floor structures for three different vehicle body types.

DESCRIPTION OF THE PREFERRED EMBODIMENTS

Referring to the accompanying drawings, like reference and numerals are used throughout all Figures to designate like or similar parts or portions.

Figure 1A:
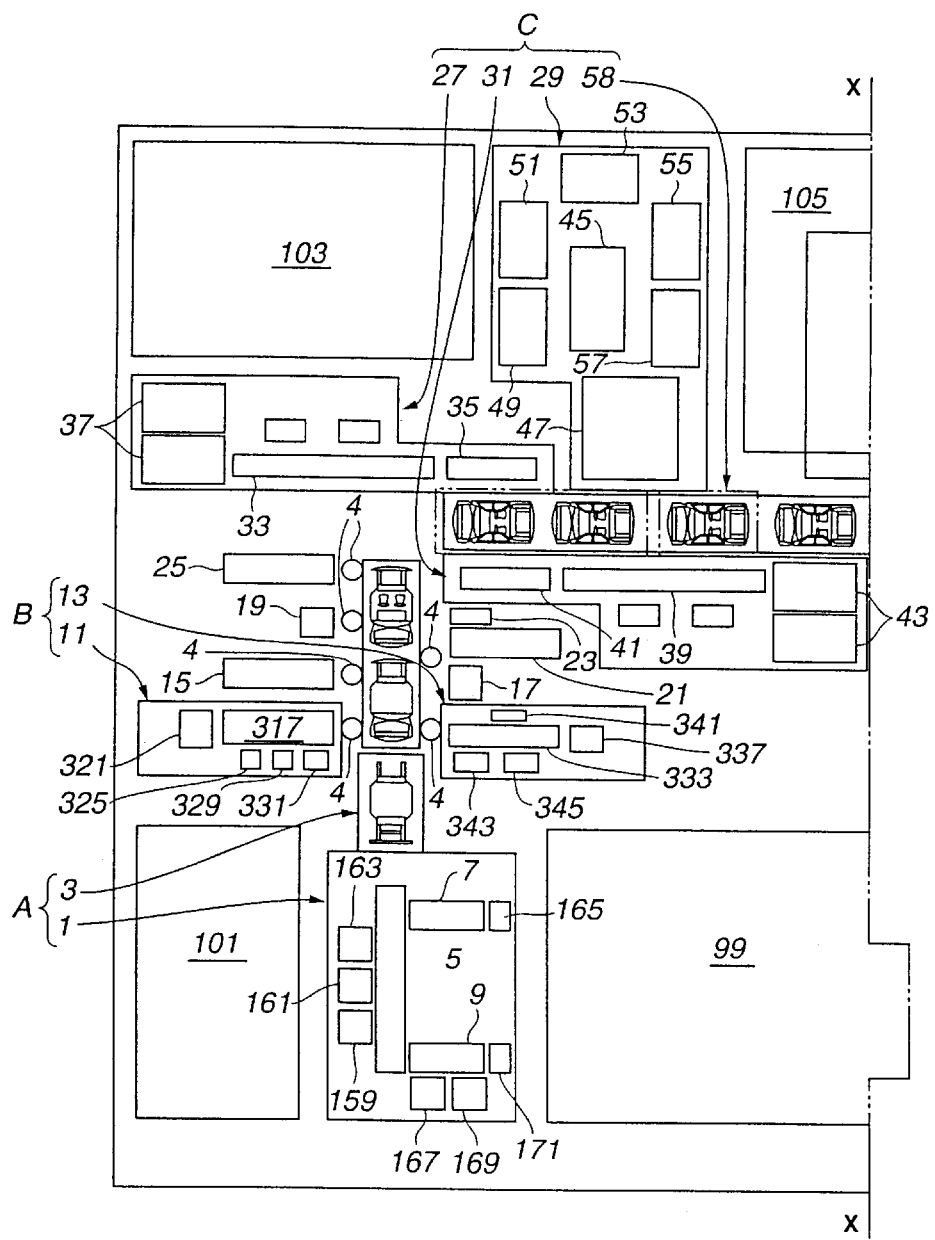
FIGS. 1A and 1B, when combined, illustrate a diagrammatic plan view of an assembly shop for automotive vehicles implementing the present invention.
Figure 1B:
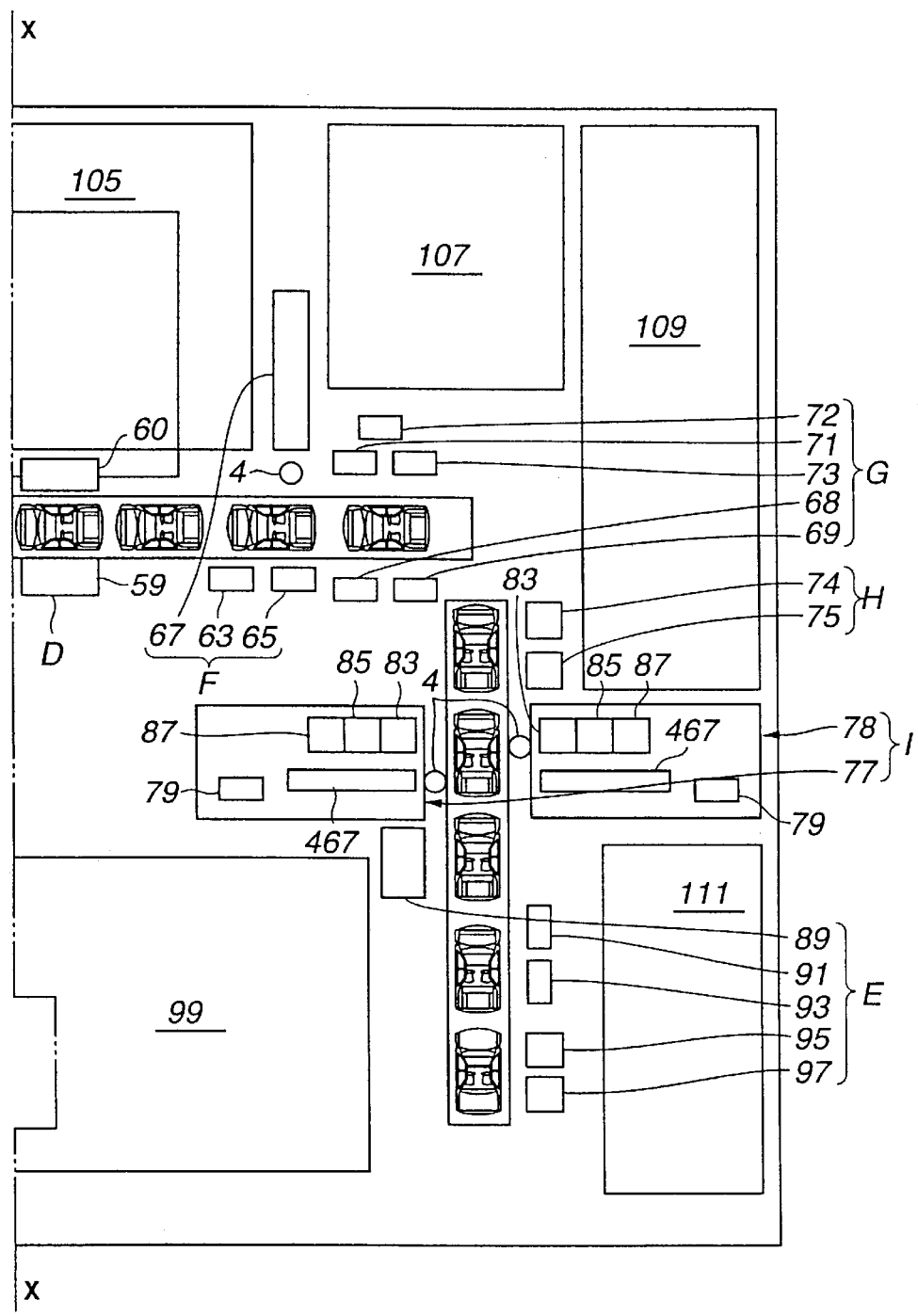

FIGS. 1A and 1B, when combined, illustrate a diagrammatic plan view of an assembly shop for automotive vehicles implementing the present invention. In FIGS. 1A and 1B, the reference numeral A generally indicates a floor process unit (FPU). An interior parts mount process unit (IPMPU) B follows the FPU A. A body main process unit (BMPU) C follows the IPMPU B. A running parts mount process unit (RPMPU) D follows the BMPU C. An exterior parts attachment process unit (EPAPU) F follows the RPMPU D.

The FPU A, which will be further described later in connection with FIGS. 3 and 9, performs a process of producing a floor. Floor constituent parts are light metal die cast parts, respectively. In various examples of the present application, an aluminum alloy is used in a standard casting process although a magnesium base alloy may be used as well. Workers assemble the floor constituent parts and a welding machine is used to securely connect them to produce a floor structure. The FPU A includes an assembly process unit (APU) 1 and a weld process unit (WPU) 3. The APU 1 includes a floor main process unit (FMPU) 5 and two sub-process units 7 and 9. Workers engage in jobs supporting each of the FMPU 5 and the sub-process units 7 and 9.

The IPMPU B, which will be further described later in connection with FIGS. 11 and 12, includes a rear floor module process unit (RFMPU) 11 and a rear end module process unit (REMPU) 13. Workers support each of the RFMPU 11 and REMPU 13. The IPMPU B also includes two manual lifts 4 in the neighborhood of the RFMPU 11 and REMPU 13, respectively, to assist worker(s) in transferring products to a main line. It further includes a dash module pallet 15, an engine room parts pallet 17, a carpet pallet 19, a rear sheet pallet 21, a console pallet 23, and a front sheet pallet 25. These pallets carry the parts. To assist worker(s) in transferring the parts to the main line, four manual lifts 4 are provided.

The BMPU C, which will be further described later in connection with FIGS. 14 and 15, includes a body side LH process unit (BSLHPU) 27, a roof process unit (RPU) 29, and a body side RH process unit (BSRHPU) 31. The BSLHPU 27 functions to produce a body side unit by trimming the interior of a body side structure. The BSLHPU 27 includes a body side sub-line inner trimming unit (BSSITU) 33, a body side set dolly 35, and a set of body side pallets 37. The body side pallets 37 and other pallets carry necessary parts for production of body side units. Workers support the BSSITU 33. The BSRHPU 31 functions to produce a body side unit by trimming the interior of a body side structure. The BSRHPU 31 includes a body side sub-line inner trimming unit (BSSITU) 39, a body side set dolly 41, and a set of body side pallets 43. The body side pallets 43 and other pallets carry necessary parts for production of body side units. Workers support the BSSITU 39. The RPU 29 includes a set process unit (SPU) 45, and a roof-reversing arm 47. Roof parts needed for different automobile types are carried by a plurality of pallets, namely, a small-sized (S-sized) sedan pallet 49, a small-sized (S-sized) tall pallet 51, a wagon pallet 53, a SS-sized commuter pallet 55, and a medium-sized (M-sized) sedan pallet 57.

The BMPU C further includes a weld process unit (WPU) 58 where the assembled roof unit, body side units, and roof unit are fixedly secured by laser welding.

Parts needed for trimming roofs having different widths and body sides are stored in pallets and located in a parts stock site 103. Theses pallets are supplied to sub-lines according to production order.

The RPMPU D, which will be further described later in connection with FIG. 20, includes an automatic mounting machine 59 for mounting a body unit (UBU) to an under running unit (URU) 60 having been supplied to the line.

The EPAPU F follows the RPMPU D. The EPAPU F is followed by a liquid supply process unit (LSPU) G, a window attachment process unit (WAPU) H, a door mount process unit (DMPU) I, and an exterior surface decoration process unit (ESDPU) E.

The EPAPU F includes a rear bumper pallet 63, a front bumper pallet 65, a front end module pallet 67, and a lift 4 adjacent the front end module pallet 67 to assist a worker in conveying a front end module to the line. Workers draw a rear bumper from the pallet 63 and attach it to the rear end of the body unit. They draw a front bumper from the pallet 65 and attach it to the front end of the body unit. Using the lift 4, the workers mount a front end module to the body unit.

The LSPU G includes a long life coolant supply station 68, a gasoline supply station 69, a brake oil supply station 71 and a power steering oil supply station 73. Necessary parts are provided at 72. A worker supply the vehicle with long life coolant, gasoline, brake oil and power steering oil.

The WAPU H includes a lamp pallet 74 and a windshield panel pallet 75. Workers mount windshields to the body unit after drawing parts out of these pallets 74 and 75.

The DMPU I, which will be described later in connection with FIG. 21, includes a right-hand door assembly process unit (RDAPU) 77, and a left-hand door assembly process unit (LDAPU) 78. Lifts 4 are provided adjacent to the RDAPU 77 and LDAPU 78, respectively. Workers support the RDAPU 77 and LDAPU 78. Using the lifts 4, workers can mount the door units out of the RDAPU 77 and LDAPU 78 to the body unit.

Figure 21:
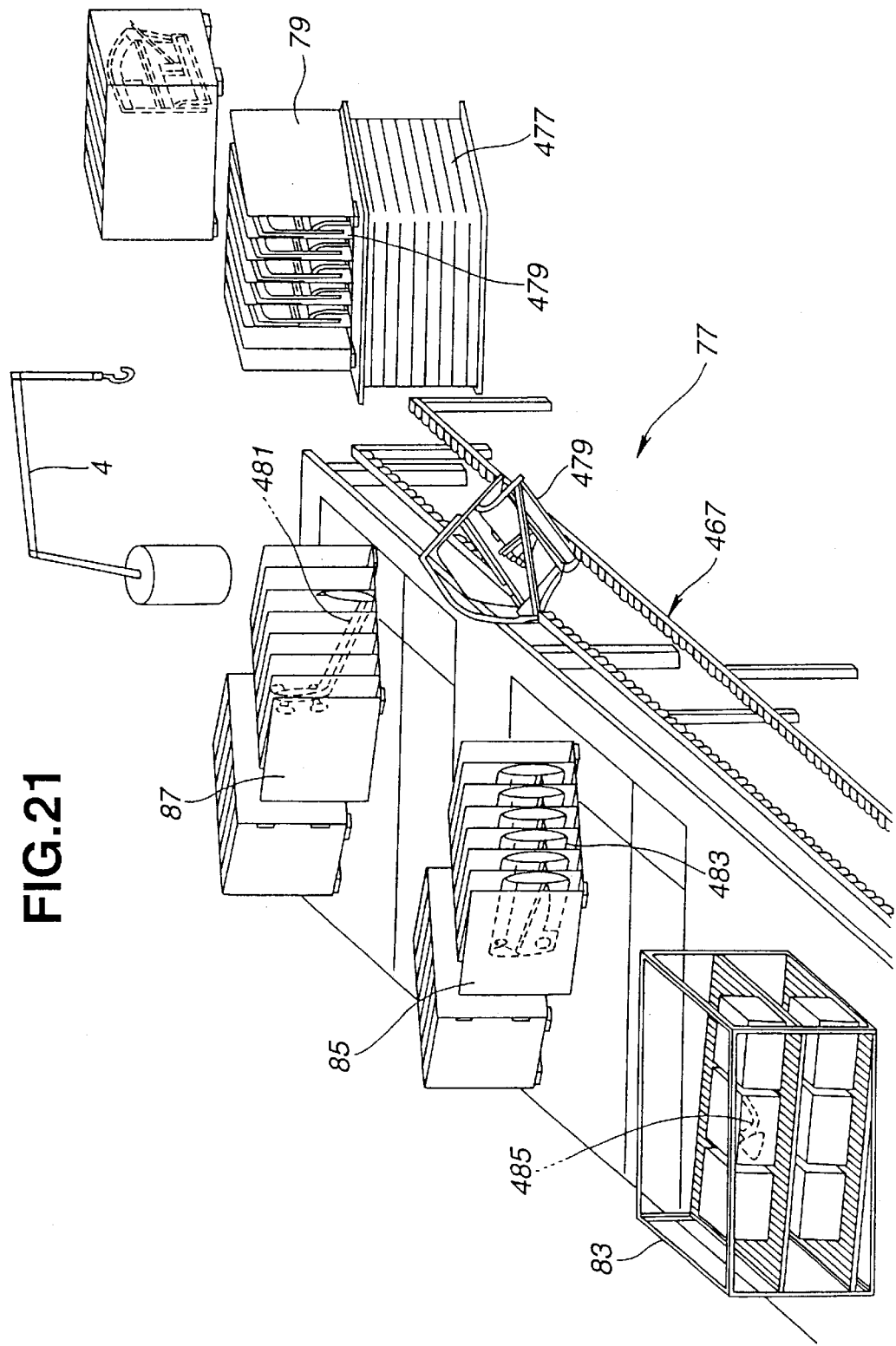
FIG. 21 is a perspective fragmentary view of a right-hand door assembly process unit.

Referring also to FIG. 21, the RDAPU 77 includes a sash module front pallet 79, a door mirror unit pallet 83, an interior trim module pallet 85, and an inner module pallet 87 around a roller conveyer 467 to make it easier for workers to assemble parts. The LDAPU 78 is substantially the same in construction as the RDAPU 77 so that the same reference numerals are used to designate like portions. Lifts 4 are provided adjacent the RDAPU 77 and LDAPU 78, respectively.

Finally, the ESDPU E includes a roof pallet 89 for carrying a roof decoration plate of synthetic resin, a rear fender pallet 91 for carrying a rear fender decoration plate of synthetic resin, a front fender pallet 93 for carrying a front fender decoration plate of synthetic resin, a trunk lid pallet 95 for carrying a trunk lid decoration plate of synthetic resin, and a hood pallet 97 for carrying a hood decoration plate of synthetic resin. Workers draw the necessary decoration plates out of the pallets 89, 91, 93, 95, and 97 and attach them to the body unit.

Parts needed by the above-mentioned process units A, B, C, D, F, G, H, I, and E are stocked at the adjacent sites 99, 101, 103, 105, 107, 109, and 111.

First of all, a die casting process is used to make a light metal die cast part, which serves as one of floor constituent parts. In the die casting process, molten light metal, such as aluminum (Al) alloy and magnesium (Mg) alloy, is forced into a die. In this example, the floor constituent parts are made of aluminum alloy extrusion die cast products. In the FPU A, workers manually engage in assembling the floor constituent parts. In the WPU 3, a welding machine welds the assembled floor constituent parts to produce a floor structure. Subsequently, in the IPMPU B, the rear floor module, rear end module, dash module, engine room parts, carpet, rear sheet, console, and front sheet are mounted onto the floor structure to produce a floor unit (FU). The floor unit is conveyed to the BMPU C.

In the BMPU C, the BSSITU 33 produces a left-hand body side unit that has been trimmed, and the BSSITU 39 produces a right-hand body side unit that has been trimmed. The body side set dolly 35 is used to transfer the left-hand body side unit to the left-hand side of the floor structure for attachment thereto. The body side set dolly 41 is used to transfer the right-hand body side unit to the right-hand side of the floor structure for attachment thereto. Subsequently, the roof-reversing arm 47 sets a roof unit for attachment to the upper ends of the body side units. In the SPU 45, a selected roof structure fit for type of vehicle is trimmed to produce a roof unit, and the roof unit is supplied to the roof-reversing arm 47.

After assembling the floor unit, body side units, and roof unit, they are fixedly secured to each other by laser welding in the WPU 58 to fixedly interconnect body parts of a body unit (UBU).

In the RPMPU D, the automatic mounting machine 59 is used to mount an under running unit (URU) 60 to the body unit to produce a vehicle core. The under running unit 60 includes an engine, a power train, and a suspension. In the EPAPU F, a rear bumper, a front bumper, a front end module, and etc. are attached to the vehicle core. In the LSPU G, long life coolant, gasoline, brake oil, and power steering oil are fed to the vehicle core.

In the WAPU H, windshield panels are mounted to the vehicle core. In DMPU I, left-hand and right-hand door units are mounted to the vehicle core. Each of the door units has attached thereto a sash module front, a door mirror, an interior trim module, and an inner module.

Finally, in the ESDPU E, a roof decoration plate of synthetic resin, a rear fender decoration plate of synthetic resin, a front fender decoration plate of synthetic resin, a trunk lid decoration plate of synthetic resin, and a hood decoration plate of synthetic resin are attached to the vehicle core. An inspection line follows the EPDPU E.

From the preceding description, it is now understood that workers can mount seats, an instrument panel, harness, and the other necessary equipments to the floor structure in an open space. It is also understood that workers can conduct trimming of the body sides and the roof in an open space. Thus, workers load in assembly of the vehicle body is greatly reduced.

A painting process is no longer required. Thus, there is no need to alter painting equipment to cope with color switching. Assembling bodies can synchronize with assembling of vehicles. Stocks of bodies and parts associated therewith are greatly reduced, in number.

A very compactor short vehicle assembly line is accomplished. This is because line length from the initiation of assembly of bodies to the completion of vehicles has been reduced to sixteen (16) processes from the conventional line length of about eight hundred (800) processes.

Accordingly, the time required from the initiation of assembly of a body to the completion of a vehicle is greatly shortened. This makes it possible to shorten the time required from order to deliver. Conventional stock production can be replaced with order production. If order production is employed, stocks are greatly reduced, in number, thus resulting in a reduction in cost needed for transportation and stock control. Because the assembly line length for vehicle production can be greatly shortened, only a small area suffices for establishment of an assembly shop.

Figure 2H:
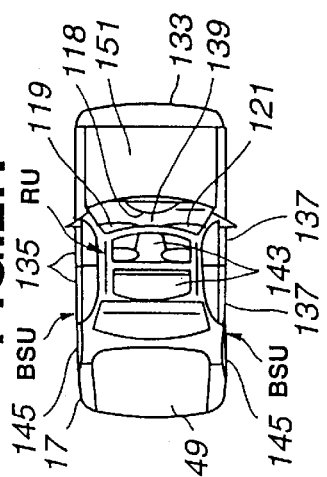
FIGS. 2A through 2H illustrate how parts are combined in various production stages on an assembly line to make a vehicle.
Figure 2E:
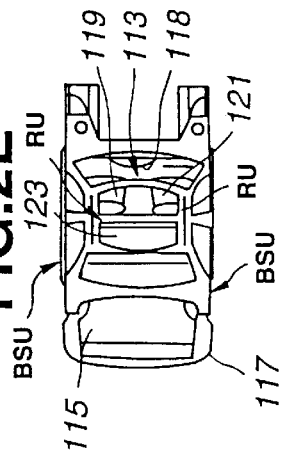
Figure 2F:
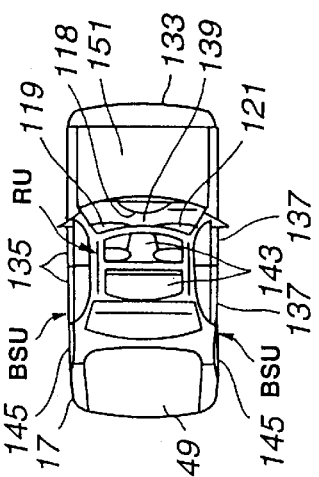
Figure 2G:
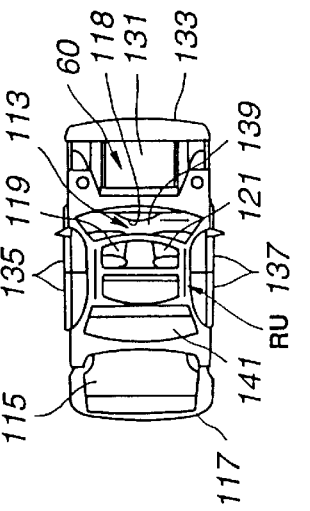
Figure 2A:
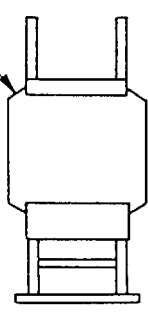
Figure 2B:
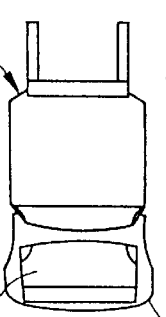

Referring to FIGS. 2A through 2H, it is illustrated how parts are combined in various production stages on the assembly line to make a vehicle. FIG. 2A illustrates a floor structure 113 on the assembly line immediately downstream of the FPU A. FIG. 2B illustrates the floor structure 113 with a rear floor module 115 and a rear end module 117 on the assembly line immediately downstream of the RFMPU 11 and REMPU 13 of the IPMPU B.

Figure 2C:
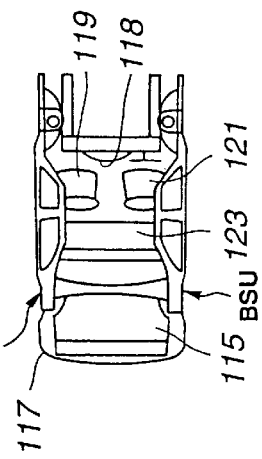
Figure 2D:
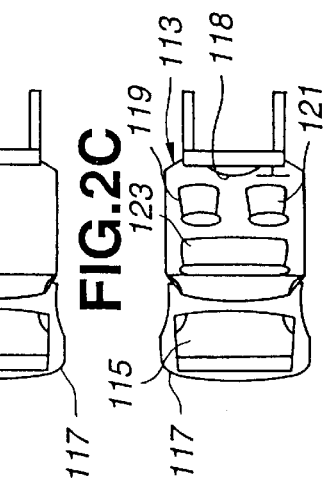

FIG. 2C illustrates the floor structure 113 with a dash module 118, front sheets 119 and 121, and a rear sheet 123 on the assembly line immediately downstream of the IPMPU B to make a floor unit (FU). FIG. 2D illustrates the FU with body side units (BSU) on the assembly line immediately downstream of the BSLHPU 27 and BSRHP 31 of the BMPU C. FIG. 2E illustrates the FU with a roof unit (RU) on the BSUs on the assembly line immediately of the RPI 29 of the BMPU C. Laser welding in the WPU 58 fixedly secures the FU, BSUs and RU to each other to make a body unit (UBU).

FIG. 2F illustrates the UBU with an under running unit (URU) 60 on the assembly line immediately downstream of the RPMPU D. The URU 60 includes an engine 131.

FIG. 2G illustrates the UBU with the URU 60 and also with door units 133, 137, windshield panels 149, 141, and liquid additives including engine brake oil, which is on the assembly line immediately downstream of DMPU I after the EPAPU F, LSPU G, and WAPU H.

FIG. 2H illustrates a vehicle off the assembly line immediately downstream of the ESDPU E, which vehicle has attached thereto a roof panel of synthetic resin 143, a rear fender panel of synthetic resin 145, a front fender panel of synthetic resin 147, a trunk lid panel of synthetic resin 149, and a hood panel of synthetic resin 151.

Figure 3:
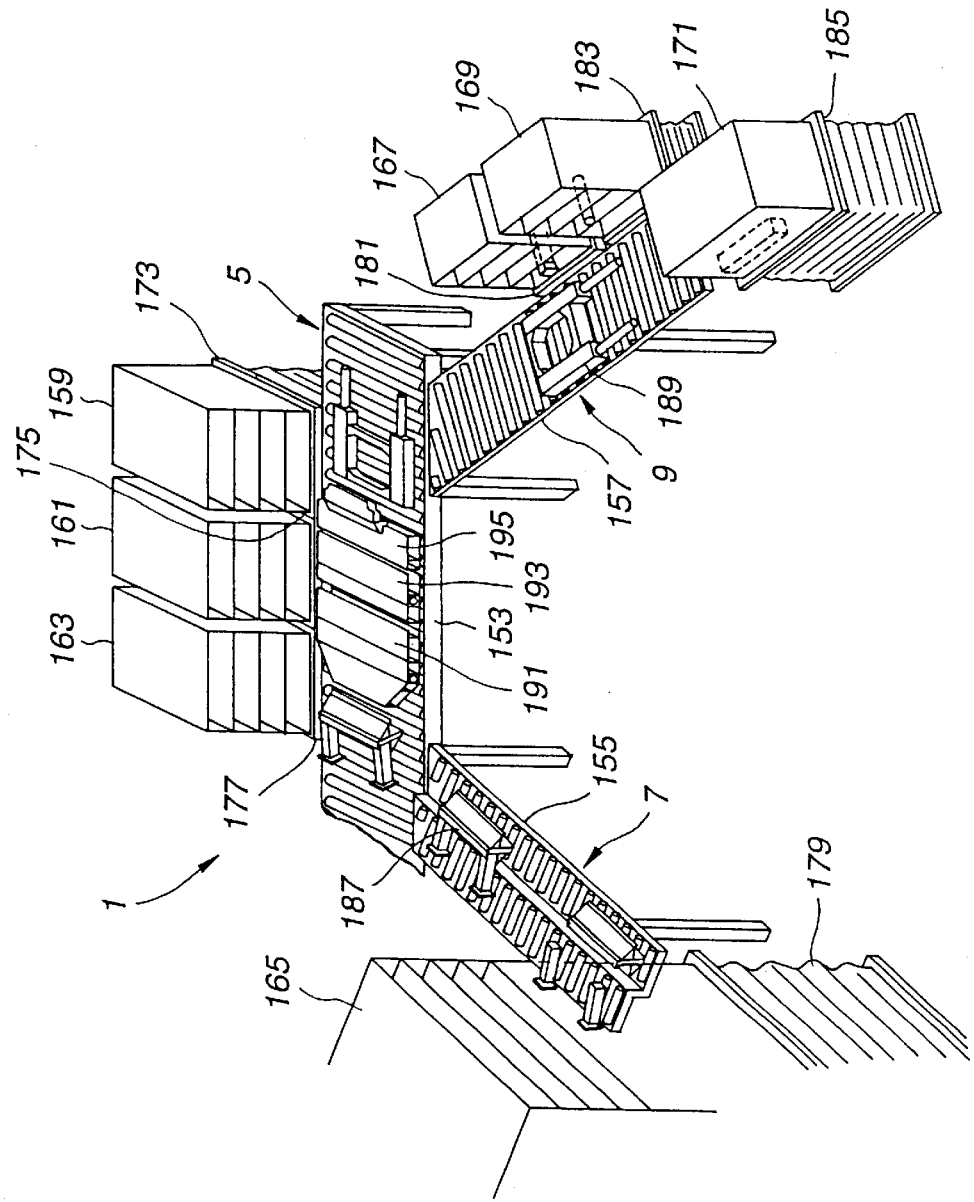
FIG. 3 is a perspective view of an assembly process unit of a floor process unit.

FIG. 3 is a perspective view of the FPU A with its WPU 3 removed. The floor main process unit 5 and the sub-process units 7 and 9 have manual roller conveyers 153, 155, and 157, respectively. The floor main process unit 5 has three pallets 159, 161, and 163. These pallets 159, 161, and 163 are placed on load responsive extendable wheeled supports 173, 175, and 177, respectively. The sub-process unit 7 has one pallet 165 that is placed on a load responsive extendable wheeled support 179. The other sub-process unit 9 has three pallets 167, 169, and 171. These pallets 167, 169, and 171 are placed on load responsive extendable wheeled supports 181, 183, and 185, respectively. Each of the supports 173, 175, 177, 179, 181, 183, and 185 extends as weight of the pallet placed thereon decreases.

Referring also to FIGS. 1A and 1B, the pellets 159, 161, and 163 are located near the site 101, and the pallets 165, 167, 169, and 171 are located near the site 99. After loading the pallets 159, 161, and 163 with the corresponding parts from the site 101, workers manually deliver them to locations as illustrated in FIG. 3 near the roller conveyer 153. Similarly, after loading the pallets 165, 167, 169, and 171 with the corresponding parts from the site 99, workers deliver them to locations as illustrated in FIG. 3. For smooth supply of a pallet carrying a relatively heavy part to an area with the reach of hands of a worker attending the assembly work, a pallet shooter incorporating wheel conveyer is used.

Each of the pallets 159, 161, and 163 has a plurality of shelves. A plurality of rear front floor constituent parts 195 are put on each of the shelves of the pallet 159. A plurality of middle front floor constituent parts 193 are put on each of the shelves of the pallet 161. A plurality of front floor constituent parts 191 are put on each of the shelves of the pallet 163. The pallet 165 has a plurality of shelves. A set of constituent parts of an engine compartment frame 187 is put on each of the shelves of the pallet 165. Each of the pallets 167, 169, and 171 has a plurality of shelves. Constituent parts of a rear floor frame 189 are put on shelves of the pallets 167, 169, and 171, respectively.

With regard to the pallets 159, 161, 163, 165, 167, 169, and 171, removing a part from a shelf of one of them, for example the pallet 159, causes a reduction in the magnitude of load imparted to the associated support 173. This reduction causes the support 173 to extend to lift the next lower shelf to a level as high as the roller bearing 153. This greatly assists the worker in manually drawing the part from the pallet to the surface of the roller bearing. When the pallets are empty, the workers move the extendable supports 173, 175, 177, 179, 181, 183, and 185 to the corresponding sites 101 and 99 and load the pallets with new parts.

The FPU A realizes a cellular production line. The sub-process units 7 and 9 extend from the floor main process unit 5 to accomplish the cellular production. This makes it possible to simultaneously assemble all the constituent parts needed to complete a floor structure, avoiding a need to stock incompletely assembled portions of a floor structure.

The sub-process unit 7 provides for manual assembly, on the roller conveyer 155, of parts needed to make the engine compartment frame 187. The sub-process unit 9 provides for manual assembly, on the roller conveyer 157, of parts needed to make the rear floor frame 189. The floor main process unit 5 provides for manual assembly, on the roller conveyer 153, of the front floor constituent parts 191, 193, and 195, the engine compartment frame 187 and rear floor frame 189.

Each of the floor constituent parts is made of an aluminum alloy die cast part and low, in weight, enough for worker to handle. Thus, even women and/or aged people can engage in the assembly work.

Figure 4A:
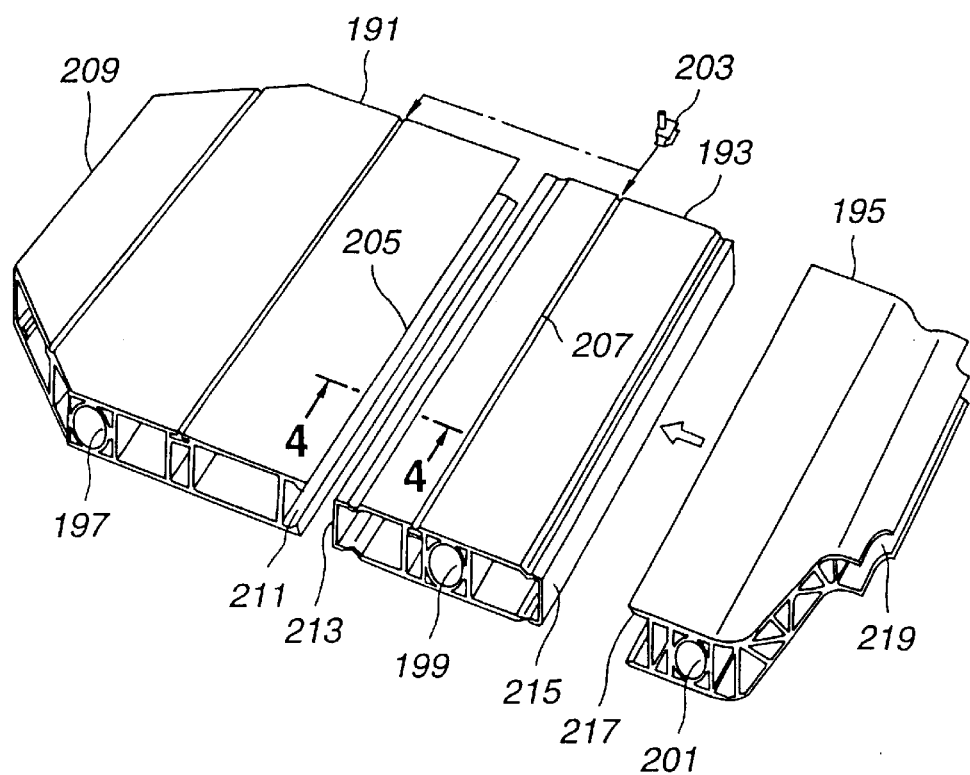
FIG. 4A is an exploded perspective view of a front floor section illustrating a front, an intermediate, and a rear constituent part.
Figure 4B:
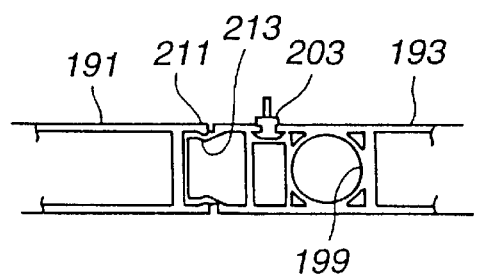
FIG. 4B is a cross section taken through the line 4—4 of FIG. 4A.

FIG. 4A illustrates the front, intermediate, and rear constituent parts 192, 193, and 195 of the front floor. Each of them is an aluminum alloy extrusion die cast product that has been made, in an extrusion die casting process, by forcing molten aluminum alloy through the mold cavity in a direction adapted to be parallel to a transverse direction of the vehicle. The front, intermediate, and rear constituent parts 192, 193, and 195 are formed with locate holes 197, 199, and 201, respectively. The front and intermediate constituent part 191 and 193 are formed with grooves 205 and 207 adapted to receive seat attachment brackets 203. The locate holes 197, 199, and 201 as well as the grooves 205 and 207 are formed in the die casting process.

At a front end, the front floor constituent part 191 is formed with a male coupling section 209. At a rear end, it is formed with a female coupling section 211. At a front end, the intermediate front floor constituent part 193 is formed with a male coupling section 213. At a rear end, it is formed with a female coupling section 215. At a front end, the rear front floor constituent part 195 is formed with a male coupling section 217. At a rear end, it is formed with a female coupling section 219.

With the male coupling section 213 engaged in the female coupling section 211, the front floor constituent parts 193 and 191 are joined to each other. With the female coupling section 217 engaged in the male coupling section 215, the front floor constituent parts 193 and 195 are joined to each other. The male and female coupling sections 213, 211, and the male and female coupling sections 215, 217 employ substantially the same structure. Referring to FIG. 4B, and FIGS. 5A to 5C, the structure of the male and female coupling sections 213 and 211 is further described.

As illustrated in FIG. 4B, and FIGS. 5A to 5C, the female coupling section 211 is formed with a positioning protrusion 223 on its bottom wall 221. The male coupling section 213 is formed with a positioning recess 225a on its leading or one end wall 225. Engagement of the protrusion 223 into the recess 225a prevents undesired rotation of the constituent part 193 in a direction to disengage from the constituent part 191.

The female coupling section 211 has a groove that is defined by the bottom wall 221 and two spaced parallel flange inner walls 235 extending from the bottom wall 221. The inboard or upper flange extends further than the outboard or lower flange does to prevent transmission of noises to the vehicle cabin. Clips 227 are disposed near leading ends of the inner walls of the upper and lower flanges to define a mouth of the groove. The clips 227 protrude inwardly from the upper and lower flanges, respectively. The male coupling section 213 is formed with clip receiving recesses 229, which receive the clips 227, respectively. The male coupling section 213 is provided with surface portions 231, which come into close contact, over the whole area, with the flange inner walls 235, respectively, when the male coupling section 193 engages in the groove of the female coupling section 211. One of the surface portions 231 is located between the end wall 225 of the male coupling section 193 and one of the clip receiving recesses 229. The other of the surface portions 231 is located between the end wall 225 of the male coupling section 193 and the other of the clip receiving recesses 229.

Figure 5A:
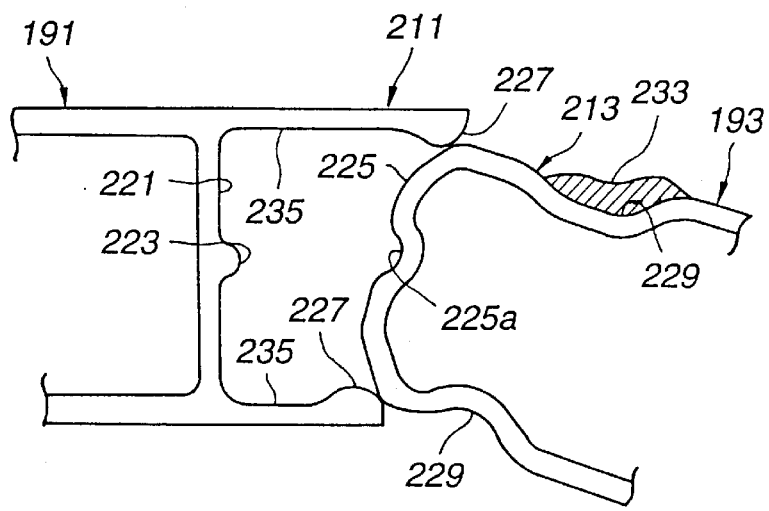
FIGS. 5A, 5B, and 5C illustrate process steps of coupling between the front and intermediate floor constituent parts.
Figure 5B:
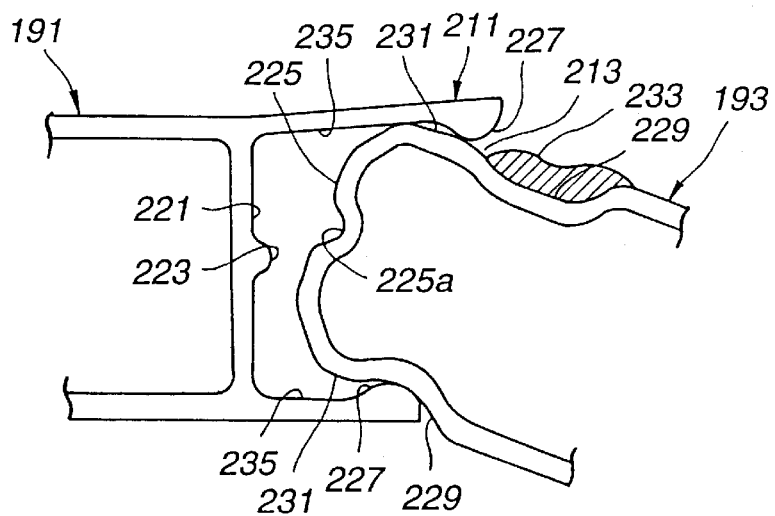

Prior to coupling, a worker puts adhesive 233 in the clip receiving recess 229 of the male coupling section 193 near the vehicle cabin. As shown in FIG. 5A, the worker engages the end wall 225 of the male coupling section 213 with the inboard and outboard clips 227 of the female coupling section 211. Then, the worker pushes the male coupling section 193 into the groove of the female coupling section 211 until the outboard clip 227 engages in the outboard recess 229 as shown in FIG. 5B. Finally, the worker rotates the male coupling section 213 about the outboard clip 227 until the inboard clip 227 engages in the inboard recess 229 and the position protrusion 223 engages in the position recess 225a, thus completing the coupling as shown in FIG. 5C.

Figure 5C:
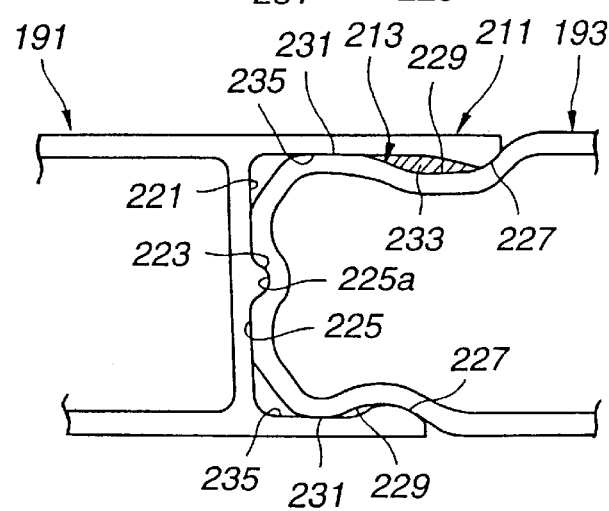

In the illustrated position of FIG. 5C, the adhesive 233 provide a firm connection between the recess 229 of the male coupling section 213 and the inboard flange inner wall 235 of the female coupling section 211, and the surface portions 231 of the male coupling section 213 firmly engage the flange inner walls 235 of the female coupling section 211. The firm engagement with the flange inner walls 235 at the surface portions 231 and the adhesive 233 prevent passage of water and gas into the vehicle cabin.

Coupling between the constituent parts 193 and 195 can be accomplished by engaging the male coupling section 215 in the female coupling section 217 in the same manner.

Figure 6:
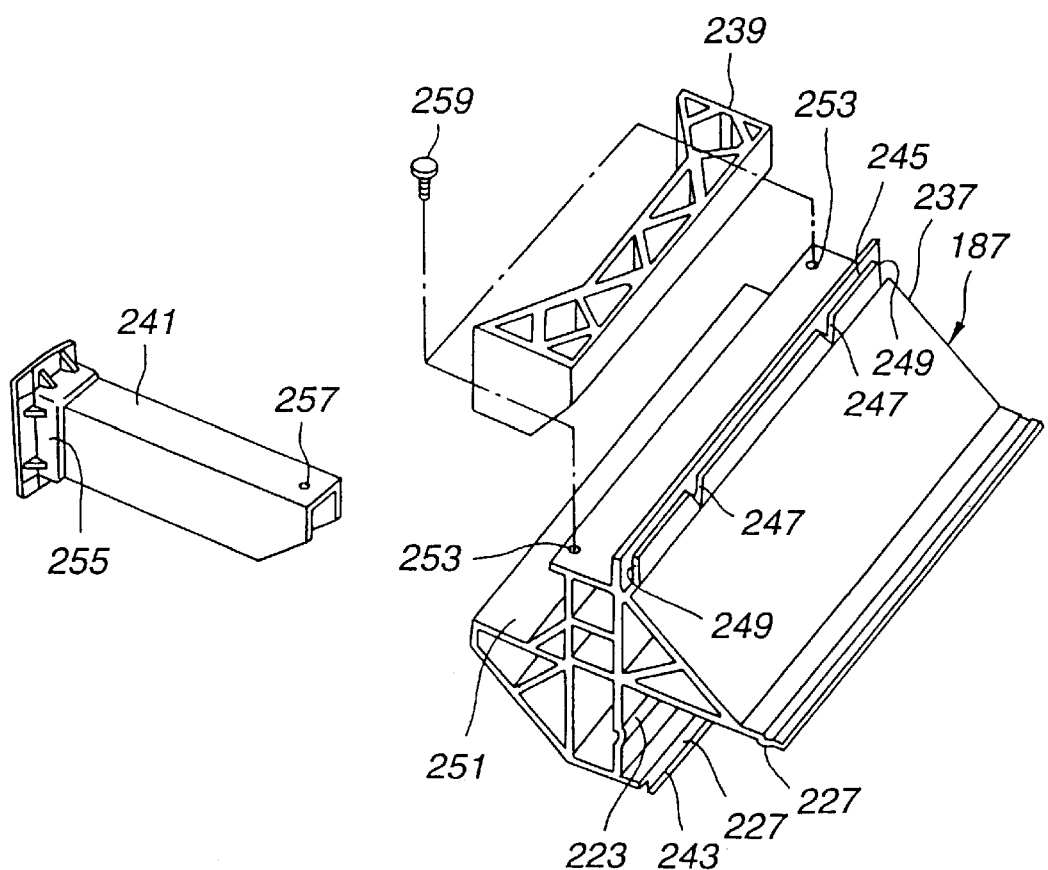
FIG. 6 is an exploded perspective view of an engine compartment frame.

FIG. 6 illustrates an engine compartment frame 187, which serves as a constituent part of the floor. The engine compartment frame 187 is made of and dividable into four parts, namely, a dash lower cross member 237, a suspension mount member 239, a left-hand front side member 241, and a right-hand front side member, not shown.

At a portion near its lower end, the dash lower cross member 237 is formed with a female coupling section 243 for receiving the male coupling section of the constituent part 191. The female coupling section 243 and the male coupling section 209 are substantially the same in structure as the female and male coupling sections 211 and 213, which have been illustrated in FIGS. 5A to 5C.

At a portion near its upper end, the dash lower cross member 237 is formed with two upright spaced walls defining therebetween a groove 245, into which a lower end of a dash module may be inserted. At two spaced portions between left and right ends thereof, the inboard side upright wall of the groove 245 is formed with two V-shaped cutouts 247. From each of the left and right ends thereof, the inboard side upright wall of the groove 245 is cut inwardly to form an end cutout 249. At a front end thereof, the dash lower cross member 237 is formed with a member coupling section 251, which the front side members 241 and the suspension member 239 are coupled with. Two through bores 253 are open at the upper surface of the coupling section 251.

The front suspension member 239 is an aluminum alloy extrusion die cast product made by a die casting process in which molten aluminum alloy has been forced through a mold in a vertical direction viewing in FIG. 6. The front suspension member 239 is provided with a coupling section for engagement with the member coupling section 251.

Each of the front side members 241 is an aluminum alloy die cast produce made by a die casting process in which molten aluminum is forced through a mold in a direction along a longitudinal line of the vehicle viewing in FIG. 6. A joint section 255 of an aluminum extrusion die cast product is attached, by welding, to the front end of each of the front side members 241. The provision of the joint sections 255 is to connect a front end module to the front side members 241. At the upper surface near the rear end thereof, each of the front side members 241 is formed with a through hole 257. At the rear ends, the left-hand and right-hand side members 241 are engaged with the member coupling section 251 at portions adjacent the ends of the suspension mount member 239. A bolt 258 is engaged into one of the through holes 253 and the through hole of the left-hand side member. Another bolt 258 is engaged into the other through hole 253 and the through hole of the right-hand side member. In this manner, the front side members 241 are provisionally connected to the dash lower cross member 237.

The assembled engine compartment frame 187 is joined with the front floor constituent part 191 by engaging the male coupling section 209 in the female coupling section 243. In the same manner as the female coupling section 211, the female coupling section 243 is provided with two clips 227 and a positioning protrusion 223. The female coupling section 243 and the male coupling section 209 are substantially the same in structure with the female and male coupling sections 211 and 213 illustrated in FIGS. 5A to 5C.

Figure 7A:
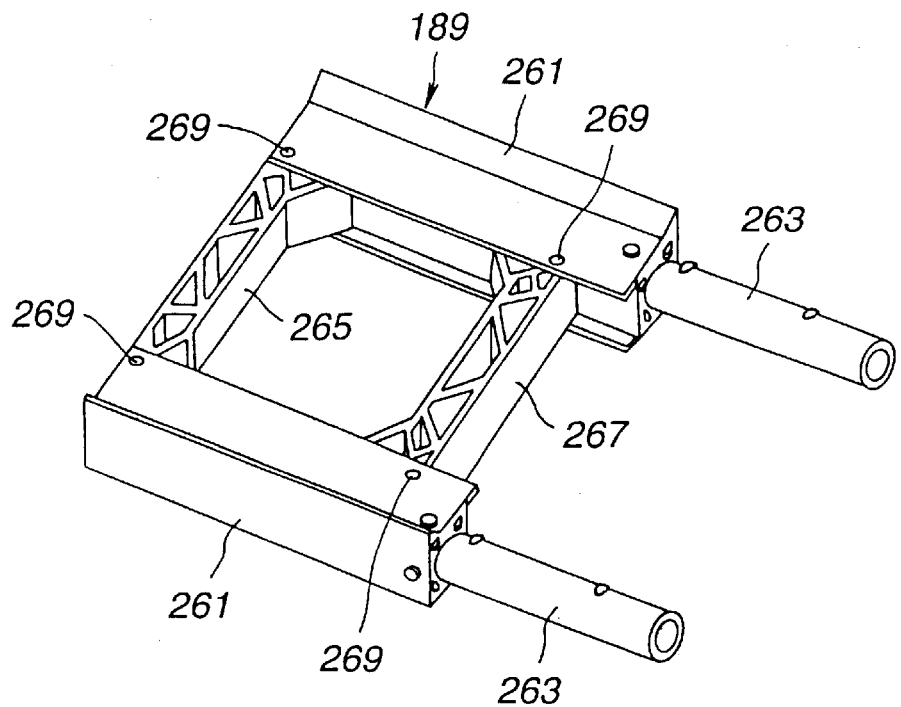
FIG. 7A is a perspective view of a rear floor frame.
Figure 7B:
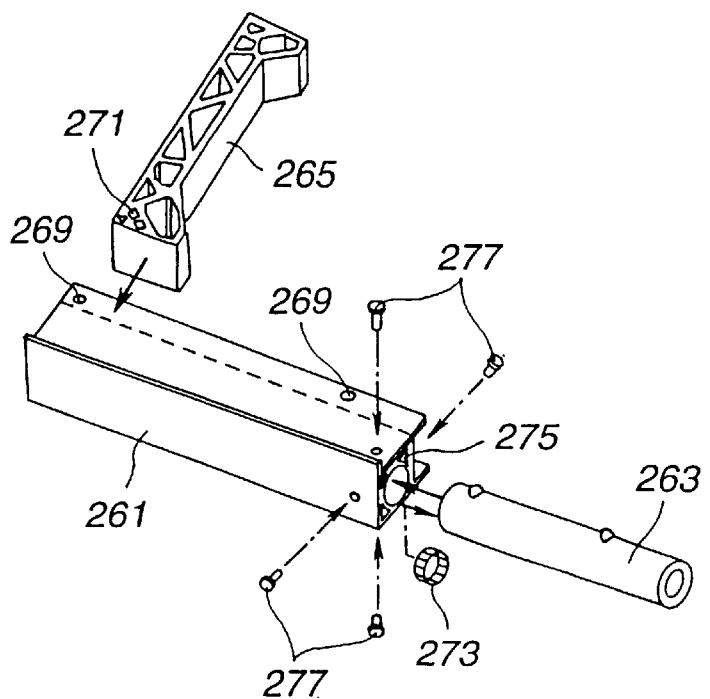
FIG. 7B is an exploded perspective view of a portion of the rear frame.

FIGS. 7A and 7B illustrate a rear floor frame 189, which serves as a constituent part of the floor. The rear floor frame 189 is made of and dividable into six parts, namely, a pair of rear side members (front) 261, a pair of rear side members (rear) 263, a rear cross member (front) 265, and a rear cross member (rear). The rear side members (front) 261 on the left-hand side and right-hand side are of symmetry in structure. They are given after cutting an aluminum alloy extrusion die cast product that is prepared by a die casting process in which molten aluminum alloy is forced through a mold in a direction along the longitudinal direction of the vehicle, viewing in FIG. 7A. The rear cross member (front) 265 and rear cross member (rear) 267 are given after cutting an aluminum alloy die case product that is prepared by a die casting process in which molten aluminum alloy is forced through a mold in a direction along the vertical direction of the vehicle.

Provisional connection between the rear cross member (front) 265, rear cross member (rear) 267, and left-hand and right-hand rear side members (front) 261 is made by locate pins, not shown, inserted through the locate holes 269. Referring to FIG. 7B, the rear cross member (front) 265 is also formed with a locate hole 271. Inserting the locate pins into the locate holes 269 and 271 results in the provisional connection of the rear cross member (front) 265 with the rear side members (front) 261. The provisional connection of the rear cross member (rear) 267 with the rear side members (front) 261 is made by the locate pins.

Subsequently, the rear cross member (front) 265, rear cross member (rear) 267, and the rear side members 261 are fixedly interconnected by a laser weld. The rear side members (rear) 263 are connected to the rear side members (front) 261, respectively, by a bolt and nut connection. Referring to FIG. 7B, a ring nut 273 is fitted into the front end of each of the rear side members (rear) 263. The ring nut 273 is formed with four peripheral nut portions. This ring nut 273 within each of the rear side members (rear) 263 is inserted into a hole 275 formed at the rear end of the associated one of the rear side members (front) 261. Four bolts 277 are inserted through the rear end portion of each of the rear side members (front) 261 into engagement with the peripheral nut portions of the ring nut 273 fitted in the associated one of the rear side members (rear) 263. In this manner, the rear side members (rear) 263 are fixedly connected to the rear side members (front) 261, respectively.

The rear floor frame 189, which results from interconnecting the six parts as previously described, is provisionally engaged in the female coupling section 219 prior to transfer to the later described weld process.

In the FPU A, the amount of work load on each worker has been greatly reduced in provisionally assembling the parts to make a floor structure 113 due to use of aluminum alloy die cast parts. Each of the parts of aluminum alloy extrusion die cast product is about half, in weight, as compared to its counterpart of steel press product. Dies for die casting process are less expensive than dies for press process. Die casting parts made by die casting process using relatively inexpensive dies are not subjected to secondary operation, for example, bending operation, and they are provisionally connected one after another in assembly work to make a floor structure 113. Cost for the secondary operation can be saved. Besides, use of parts made by die casting process and molding instead of parts made by pressing process has resulted in a great reduction in investment on dies.

If a need arises to make floor structures for different kinds of vehicles in the FPU A, an additional investment to cope with production of such floor structures can be remarkably suppressed. If a need arises to make floor structures for different types of vehicles of the same family, the FPU A can easily cope with production of such floor structures only by altering span between cutting lines of aluminum cast product and altering cast dies. Accordingly, a great reduction in equipment investment in the FPU A is accomplished with sufficient flexibility to cope with production of floor structures for different kinds of vehicles.

The size and weight of each of the floor structure constituent parts, which are made of dies casting products, fall within ranges easy to manipulate with. In this embodiment, the maximum length is 1400 mm and the maximum weight is 10 kg. Further, each of the coupling portions does not require a force greater than a manual force by workers during work to complete coupling between the adjacent two constituent parts due to snap action type clips.

FIGS. 8A, 8B, and 8C are exploded views of three floor structures resulting from modifications made to cope with three different vehicle types. FIG. 8A illustrates constituent parts of a standard floor structure. FIG. 8B illustrates constituent parts of a floor structure to cope with a wide body type. FIG. 8C illustrates constituent parts of a floor structure to cope with a long wheel base type.

Specifically, in FIG. 8A, each of the constituent parts 191, 193, and 195 has a width L1, and the constituent part 193 has a length H1. In FIG. 8B, each of the constituent parts 191, 193, and 195 has a width L2 wider than L1 although the constituent part 193 has the same length H1. In FIG. 8C, each of the constituent parts 191, 193, and 195 has a width equal to L1, but the constituent part has a length H2 longer than H1.

Figure 9:
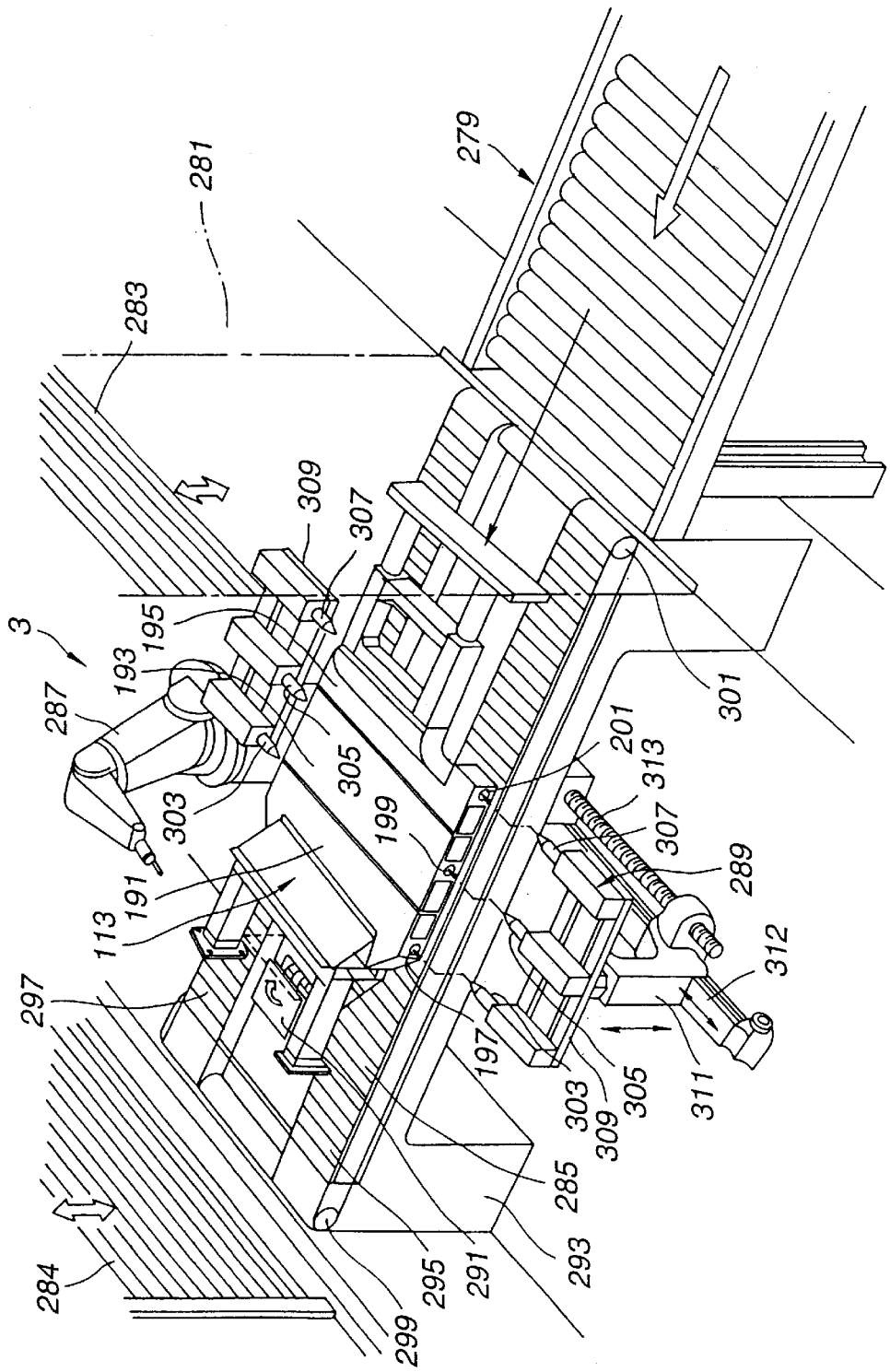
FIG. 9 is a perspective view of a portion of a vehicle production line, illustrating a weld process unit for welding constituent parts to make a floor structure.

Referring to FIG. 9, the floor structure 113 resulting from provisional interconnection of the constituent parts is transferred by a manual roller conveyer 279 to the WPU 3. The WPU 3 is installed within a site that is kept off by two spaced partitions only one being indicated at 281. A motor driven shutter 283 is provided to close an entry to the site and another motor driven shutter 284 is provided to close an exit from the site. Within the site between the two partitions 281 and 284, there are provided a motor driven automatic conveyer 285, a laser weld robot 287, a locate unit 289, and a work detector 291.

The motor driven automatic conveyer 285 is equipped with two parallel belts 295 and 297. The belts 295 and 297 extend over a base 293. The base 293 has therein a drive mechanism including a motor. The motor drives a drive roller 299. The belts 295 and 297 extend between the drive roller 299 and an idle roller 301. The laser weld robot 287 is located on one side of the conveyer 285.

On each side of the conveyers 285, the locate unit 289 has a set of three locate pins 303, 305, and 307. The locate pins 303, 305, and 307 of each set, which are on a support plate 309, can move along the adjacent side of the conveyer 285 for horizontal adjustment along the length of the belts 295 and 297 into alignment with the locate holes 197, 199, and 201 of the floor structure 113, respectively. As is readily seen from FIGS. 8A, 8B, and 8C, the locate holes 197, 199, and 201 are subject to change in position depending upon a change in vehicle body type. Thus, the adjustment function of the locate pins 303, 305, and 307 ensures accurate alignment with the locate holes 197, 199, and 201.

The support plates 309 are mounted to lifts 311, respectively, for vertical adjustment. The lifts 311 are supported on guide rails 312, respectively, for horizontal movement along the width of the belts 295 and 297. Each of the lifts 311 has a nut of a nut and screw mechanism 313. Turning the screw of one of the nut and screw mechanisms 313 adjusts the position of the associated lift 311 relative to the conveyer 285. Thus, accurate positioning of the locate pins 303, 305, and 307 relative to the locate holes 197, 199, and 201 is accomplished for the subsequent insertion into the locate holes 197, 199, and 201 to hold the floor structure 113 in an appropriate position on the conveyer 285.

The work detector 291 is mounted to the conveyer 285 between the belts 295 and 297. The work detector 291 has a stop that can pivot upwards into abutting engagement with the engine compartment frame of the floor structure 113 on the conveyer 285 for detecting the floor structure 113 as well as positioning with regard to the work transfer direction. Upon completion of weld operation by the laser weld robot 287, the work detector 291 causes its stop to pivot back to assume a horizontal rest position.

The floor structure 113 is transferred manually along the roller conveyer 279 from the FMPU 5 to a position in front of the entrance of the WPU 3 where the motor driven shutter 283 is open. Upon detection of the floor structure 113 in front of the entrance, the belts 295 and 297 of the conveyer 285 start to move. What workers have to do is to push the floor structure 113 onto the belts 295 and 297. Then, the conveyer 285 pulls the floor structure 113 into the site where the robot 287 is.

Immediately after the work detector 291 has detected the floor structure 113, the drive roller 299 stops its operation to bring the belts 295 and 297 into a standstill, and then the locate pins 303, 305, and 307 are inserted into the locate holes 197, 199, and 201. In this manner, the floor structure 113 is held in the appropriate position for the subsequent welding operation by the laser weld robot 287. The shutter 283 is closed upon or after completion of the operation to hold the floor structure 113.

Subsequently, the laser weld robot 287 is put into operation to perform a so-called "one-direction" weld by laser beam. The term "one-direction" weld is herein used to mean a weld operation to accomplish a weld between two members by concentrating energy beam to a weld point in one-direction. In this example, a laser beam is concentrated to a weld point in one-direction. The locate pins 303, 305, and 307 are lifted together with the floor structure 113 and work detector 291, holding the lower surface of the front floor constituent parts 191, 193, and 195 above the level of the belts 295 and 297. The laser weld robot 289 concentrates a laser beam on the lower surface of the constituent parts 191, 193, and 195 to accomplish weld between them. MIG welding and friction welding are alternative to the laser welding.

Immediately after completion of the laser welding, the locate pins 303, 305, and 307 are lowered to put the floor structure 113 on the belts 295 and 297. The stop of the work detector 291 is pivoted back to the horizontal stored position. The locate pins 303, 305, and 307 disengage from the locate holes 197, 199, and 201. Then, the shutter 284 is lifted to open the exit. The belts 295 and 297 starts to move to transfer the floor structure toward the next IPMPU B where the interior parts, such as seats, are mounted to the floor structure 113.

Figure 10:
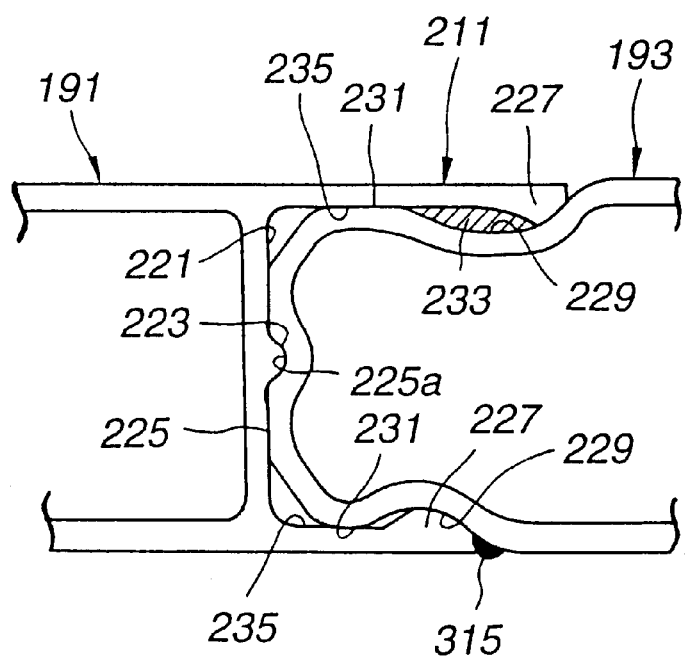
FIG. 10 is the same view as FIG. 5C, illustrating a welding portion.

The laser welding by the laser weld robot 287 results in welding at coupling sections between the constituent parts of the floor structure 113. FIG. 10 illustrates such coupling with a welding portion indicated at 315. Specifically, the leading end of the outboard flange adjacent the outboard clip 227 is welded to the outer wall adjacent the clip receiving recess 229 of the male coupling section.

The welding operation is carried out within the site that is kept off by the partitions, thus ensuring the safety of workers. The laser weld robot 287 is able to automatically locate where welding operation are needed and conducts welding operations there. The locate unit 289 cooperates with the laser weld robot 287 to control relative location among the constituent parts of the floor structure 113 during the welding operation. Thus, welding operation can be performed with excellent accuracy.

Figure 11:
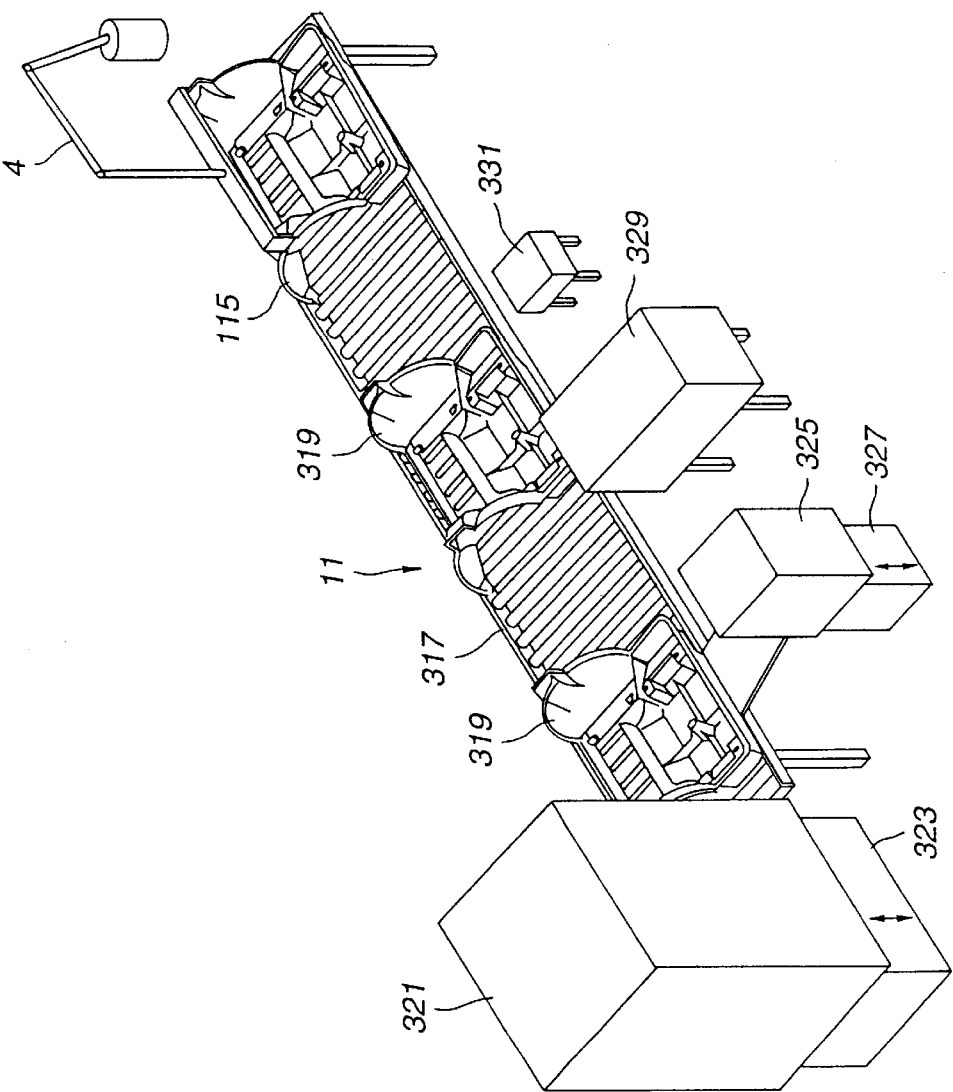
FIG. 11 is a perspective view of a rear floor module process unit where a rear floor module is made.
Figure 12:
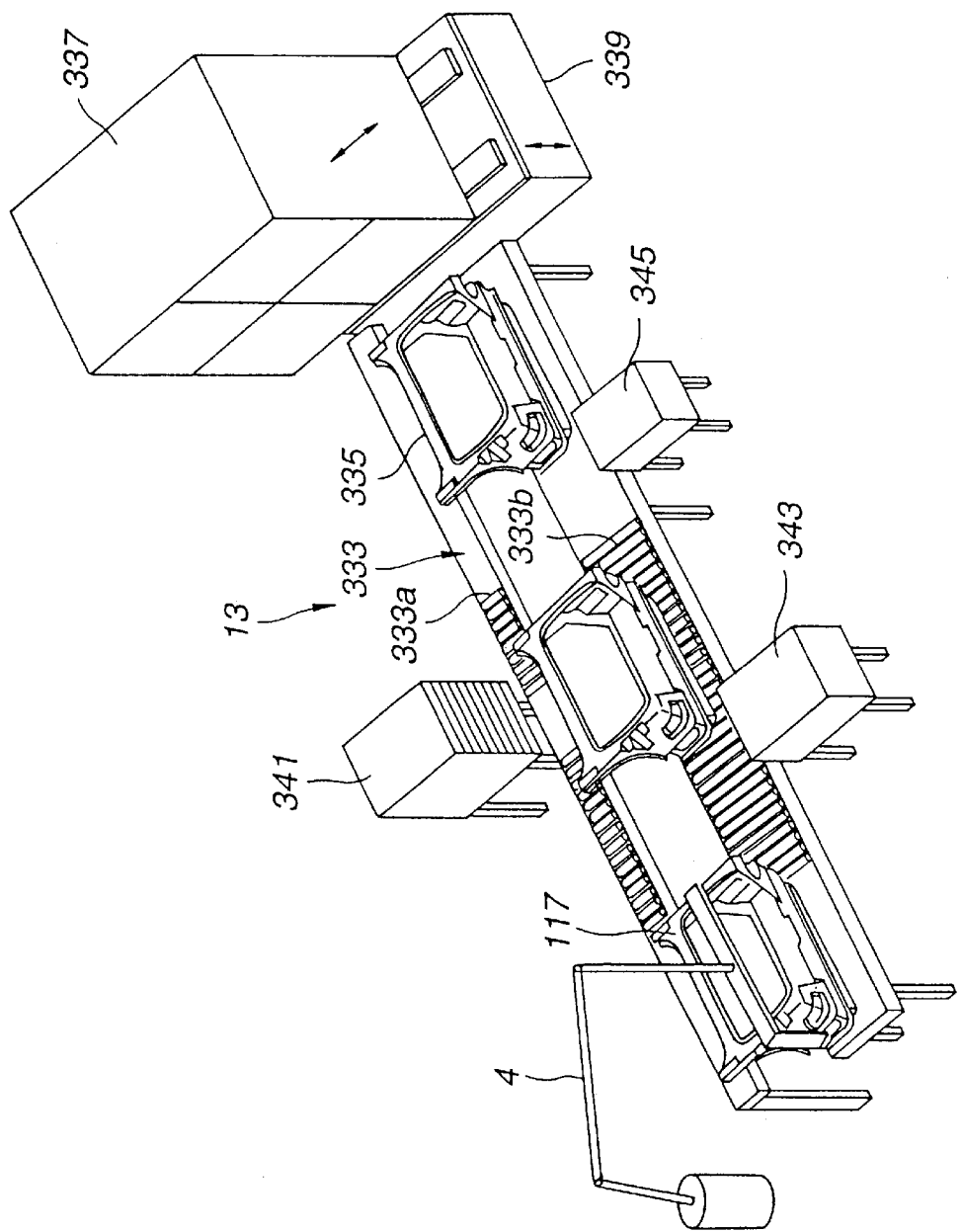
FIG. 12 is a perspective view of a rear end module process unit where a rear end module is made.

Referring to FIGS. 11 and 12, the IPMPU B includes the RFMPU 11 and the REMPU 13.

As shown in FIG. 11, the RFMPU 11 includes a roller conveyer 317. Near one end of the roller conveyer 317, a pallet 321 is arranged. The pallet 321 stores rear floor panels 319 and mounted to a wheeled load responsive extendable support 323.

Along the side of the roller conveyer 317, three pallets 325, 329 and 331 are arranged. The pallet 325 is mounted to a wheeled load responsive extendable support 327 and stores spare tires. The pallet 329 stores tire pans and floor carpets. The pallet 331 stores jacks. Near the other end of the roller conveyer 317, a manual lift 4 is arranged to assist worker in transferring a rear floor module to the main assembly line of the IPMPU B.

In operation, a worker pulls a rear floor panel 319 out of the pallet 321 onto the roller conveyer 317. Moving the rear floor panel 319 along the roller conveyer 317, the worker pulls a tire, a tire pan, a floor carpet, and a jack out of the pallets 325, 329, and 331 for attachment to the rear floor panel 319 to produce a rear floor module 115. Using the manual lift 4, the worker transfers the rear floor module 115 to the main line of the IPMPU B. The load responsive extendable supports 323 and 327 are the same in construction and operation as the load responsive extendable supports 173, 175, 177, 179, 181, 183 and 185 shown in FIG. 3.

As shown in FIG. 12, the REMPU 13 includes a roller conveyer 333. The roller conveyer 333 includes two spaced belts 333a and 333b, which are arranged on different levels to support a rear end panel 335. Near one end of the roller conveyer 333, a pallet 337 is arranged. The pallet 337 stores rear end panels 335.

The pallet 337 is mounted to a wheeled load responsive extendable support 339 for vertical movement. It also moves in a transverse direction of the conveyer 333, making it easier for a worker to pull a rear end panel 335 out of the pallet 337 onto the conveyer 333. If the pallet 337 becomes empty, a worker can move the pallet 337 on the wheeled load responsive extendable support 339 to the site 99 for supplement.

Near one side of the roller conveyer 333, a pallet 341 is arranged, which stores trunk room finishers. Near the other side of the roller conveyer 333, two pallets 343 and 345 are arranged. The pallet 343 stores a plurality piece of seal rubber. Near the other end of the roller conveyer 317, a manual lift 4 is arranged to assist worker in transferring a rear end module to the main assembly line of the IPMPU B. If empty, the pallets 341, 343 and 345 are filled up with new parts at the site 99.

In operation, a worker pulls a rear end panel 335 out of the pallet 337 onto the roller conveyer 333. Moving the rear end panel 335 along the roller conveyer 333, the worker pulls a trunk room finisher, a seal rubber and the like out of the pallets 341, 343, and 345 for attachment to the rear end panel 335 to produce a rear end module 117. Using the manual lift 4, the worker transfers the rear end module 117 to the main line of the IPMPU B.

In the IPMPU B, moving the floor structure 113 along the roller conveyer, workers mount the rear floor module 115, the rear end module 117, a dash module 118, front seats 119 and 121, a rear seat, not illustrated, and a carpet, not illustrated, to the floor structure 113.

The rear floor module 115 is mounted to the rear floor frame 189 from the above and securely fixed thereto by bolt and nut connection. At rear end portions 117a, the rear end module 117 is fixedly secured, by bolt and nut connections, to rear end flanges 189a of the rear side members (rear) 263 of the rear floor frame 189. The rear end module 17 is fixedly secured to appropriate portions of the rear floor module 115.

At a lower edge 118a, the dash module 118 is inserted into the groove 245 of the engine compartment frame 187 of the floor structure 113. Via the V-shaped cutouts 247, a center console 118b extends into the vehicle cabin. Via the end cutouts 249, dash sides 118a project into the vehicle cabin.

The front seats 119 and 121 are attached to the brackets 203 engaged in the grooves 205 and 207 of the front floor constituent parts 191 and 193. The brackets 203 have been inserted from open ends of the grooves 205 and 207 inwardly to predetermined positions. Using a proper jig, not illustrated, the brackets 203 are appropriately positioned. The rear seat is attached to the floor structure 113 in the similar manner. In this manner, a floor unit FU is made.

As is seen from the preceding description, a worker can mount the interior parts, such as the seats 119 and 121, to the floor structure 113 in an open space. Thus, the worker is no longer required to engage in hard labor within a confined closed space within a vehicle body shell. This results in a considerable increase in productivity.

Conventional door opening and cabin space have imposed restrictions on simplification of a locus of movement in carrying such interior parts as seats and dash module to appropriate positions within the vehicle cabin. Such conventional restrictions have been lifted, thus allowing great simplification of a locus of movement of the interior parts onto the floor structure 113 and giving increased flexibility of selecting directions in mounting them. Thus, a reduction in investment to robots is expected as well as a reduction in working hours for this process.

A worker transfers the floor unit FU by a roller conveyer to the BMPU C.

Figure 14:
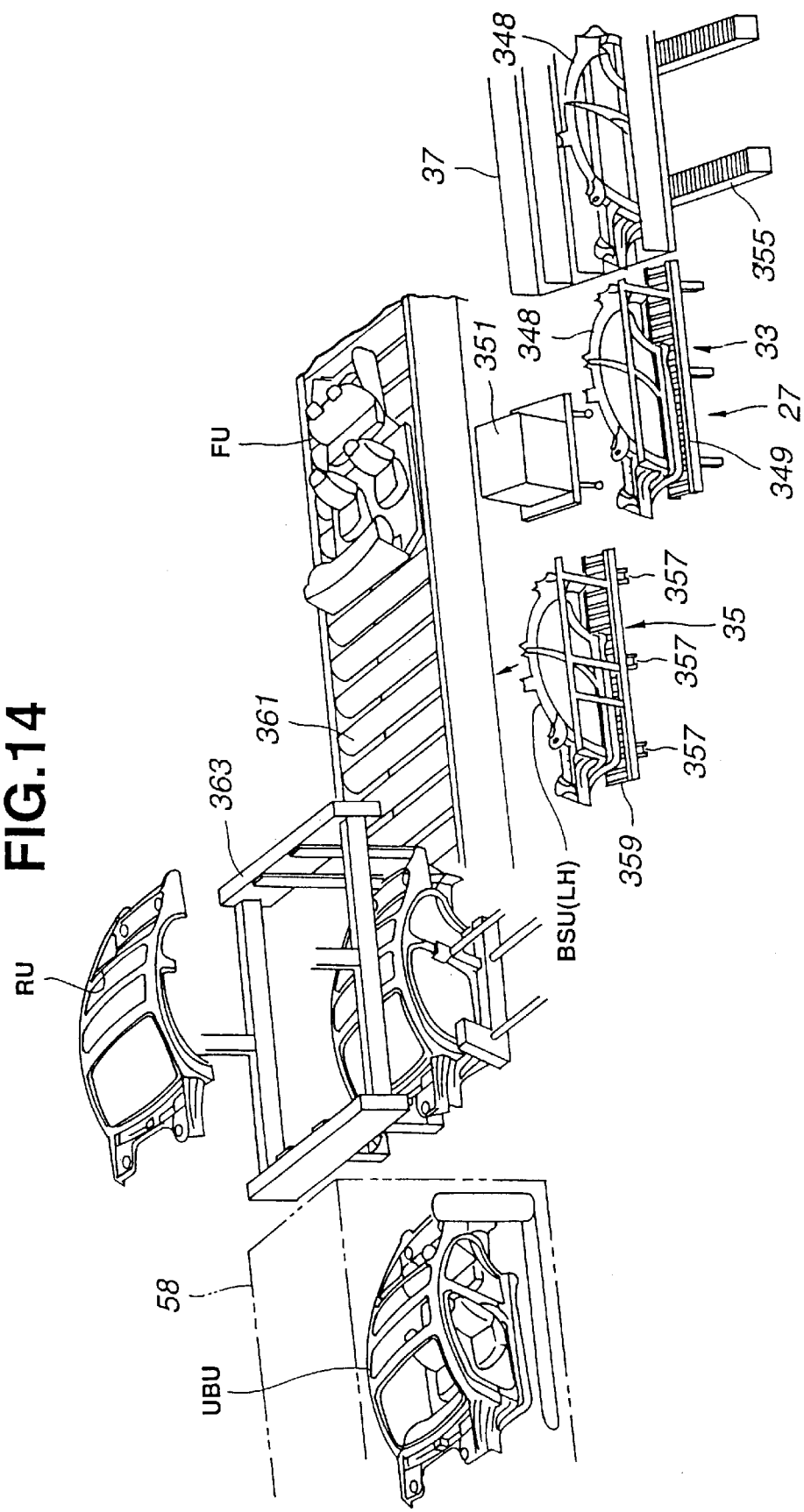
FIG. 14 is a perspective view of a body main process unit where the floor unit, body side units and a roof unit are assembled to make an upper main body unit.

FIG. 14 is a general perspective view of the BMPU C, illustrating a main line and the BSLHPU 27, which is arranged on one side of the main line. The BSRHPU 31, not illustrated, is arranged on the other side of the main line. The BSRHPU 31 is substantially the same as the BSLHPU 27.

The BSLHPU 27 includes a body side pallet 37, a roller conveyer 349 of the BSSITU 33, a pallet 351 that stores inner trimming parts, and a body side set dolly 35. The body side pallet 37 has stored in partitioned sections different body side structures 348 for a medium (M) class wagon, a height wagon, a wagon, and a small (S) sedan. The body side pallet 37 is provided with a roller conveyer for facilitating supply of the body side structure 348. The body side pallet 37 is supported on a traverse shifter 355. Thus, it can move until a required body side structure 348 is exposed for facilitating manual operation to pull the required body side structure 348 to the roller conveyer 349.

The body side set dolly 35 is a roller conveyer 359 equipped with wheels 357.

A worker selects a body side structure 348, which is to be trimmed, by sliding the pallet 37 and draws it onto the roller conveyer 349. The worker takes out an assist grip, a seat belt unit, a pillared trim and the like from the pallet 351 and attaches them to the body side structure 348 on the roller conveyer 349, producing a body side unit BSU. The attachment work is performed in an open space, resulting in increased assembly efficiency.

The body side unit BSU is transferred to the body side set dolly 35. The body side unit BSU is provisionally connected to the floor unit FU on the main line. This provisional connection is accomplished by inserting locate pins into locate holes. With this connection, accurate positioning of the body side unit BSU relative to the floor unit FU is also achieved.

In the BMPU C, the left-hand and right-hand body side units BSU are provisionally connected to the floor unit FU in the manner as described above. Then, a roof unit RU is connected to the body side units BSU. The roof unit RU is produced by the SPU 45. In the SPU 45, a roof structure appropriate to a vehicle body type is trimmed with interior parts to provide a roof unit RF, and the roof-reversing arm 47 reveres the roof unit RF to its normal position. The roof unit RF is lowered to the body side units BSU as shown in FIG. 14. Specifically, a ceiling crane 363 carries the roof unit RF to a position over the roller conveyer 361 of the main line, and lowers the roof unit RF for provisional connection with the body side units BSU. This provisional connection is accomplished by inserting locate pins into locate holes.

Then, the body assembly is transferred to the WPU 58 where, in the same manner as described referring to FIG. 9, a laser welding is carried out automatically to produce a body unit UBU.

Figure 15:
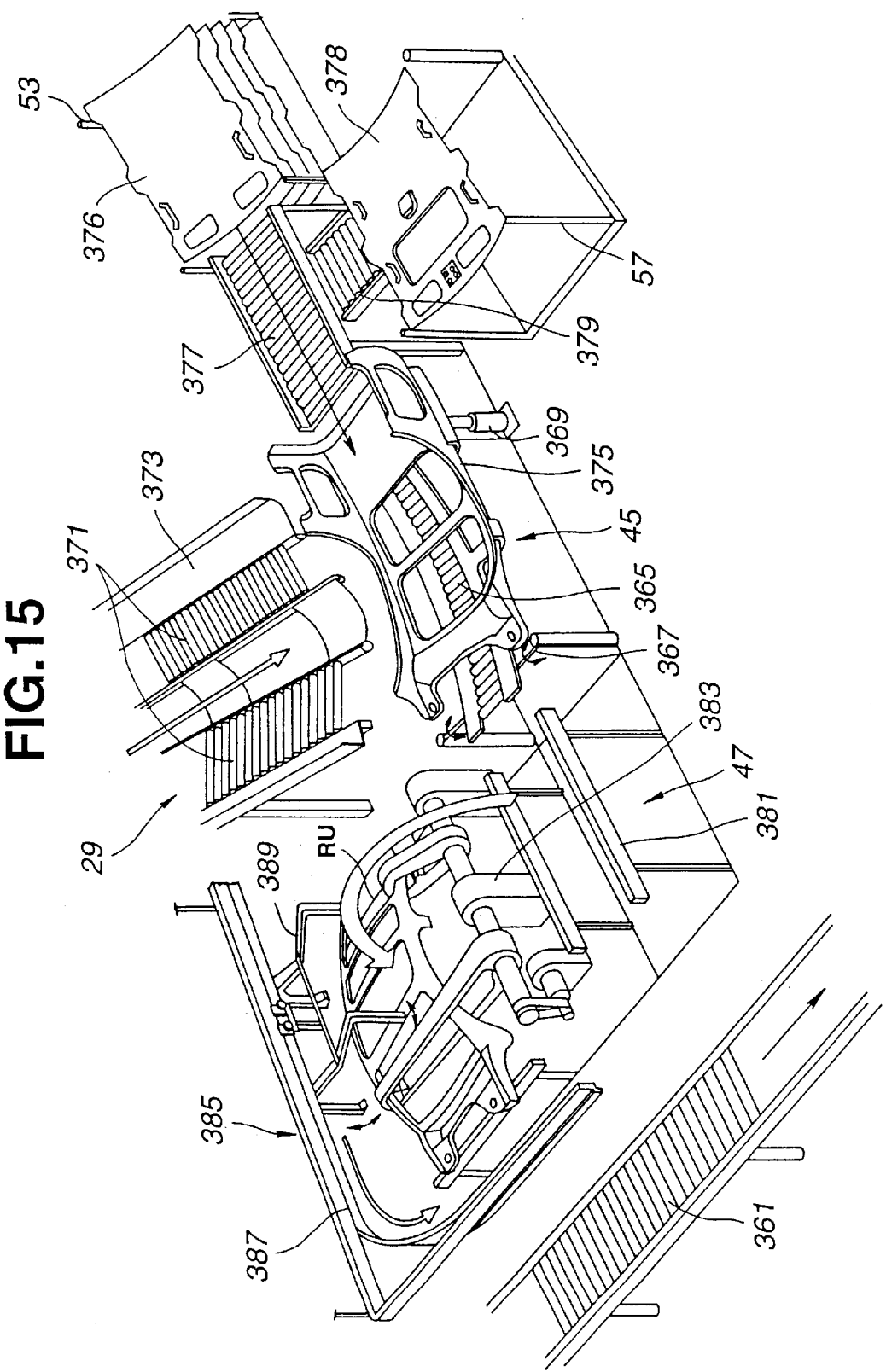
FIG. 15 is a perspective view of a portion of the body main process unit, illustrating a portion of a roof process unit that includes a set process unit.

FIG. 15 is a fragmentary perspective view of the RPU 29 illustrating how the roof unit RU is supplied to the roller conveyer 361 of the main line. The RPU 29 includes the SPU 45. The SPU 45 includes a work stand equipped with a recessed roller conveyer 365. At a portion near a leading end, the roller conveyer 365 is fixedly connected to a rotary shaft 367 that is supported for rotation about its axis. A cylinder type lift 369 is operatively connected to a portion near a trailing end of the roller conveyer 365. Thus, the roller conveyer 365 can pivot about the axis of the rotary shaft 367 as the cylinder type lift 369 lifts the trailing end. A chute 373 is provided with a roller conveyer 371 and extends from the site 103 down to the SPU 45 to supply a roof structure 375 fit for a vehicle body type.

Pallets are arranged around the SPU 45 and store different interior parts for different vehicle body types, respectively. FIG. 15 illustrates a pallet 53 storing an interior part for wagon 376 and a pallet 57 storing an interior part for M sedan 378. A roller conveyer 377 is associated with the pallet 53 to facilitate manual transfer of the part to the SPU 45. A roller conveyer 379 is associated with the pallet 57 to facilitate manual transfer of the part to the SPU 45.

The roof-reversing arm 47 includes a stand section 381 and an arm section 383. The ceiling crane 385 is installed to transfer the roof unit RU from the arm section 383 to the roller conveyer 361 of the main line. The ceiling crane 385 includes a rail 387 fixed relative to the ceiling and a wheeled shifter 389 that is automatically movable along the rail 387. The shifter 389 can grip the roof unit RU and transfer it to a predetermined portion above the roof conveyer 361 of the main line.

The chute 373 supplies roof structures 375 to the SPU 45. In the illustration of FIG. 14, the SPU 45 supports a roof structure 375 for wagon, while the roof-reversing arm 47 has a roof unit RU for sedan.

A worker selects a roof interior part for wagon 376 and transfers it onto the roof structure 375 on the SPU 45 along the roller conveyer 377 for attachment to the roof structure 375. After completion of the attachment work, the worker presses an activation button. Pressing the activation button causes the cylinder type lift 369 to extend to elevate the trailing end of the roller conveyer 365, thus providing a slope. Along this slope, the roof unit RU is transferred to the stand 381. The arm section 383 reverses the roof unit RU on the stand 381 to a position as illustrated in FIG. 15 in connection with the roof unit RU for sedan.

The wheeled shifter 389 grips the roof unit RU having been reversed by the roof-reversing arm 47 and moves along the rail 387 to the predetermined position above the roller conveyer 361 of the main line. Then, the roof unit RU is provisionally connected to the body side units BSU connected to the floor unit FU for wagon.

Figure 16:
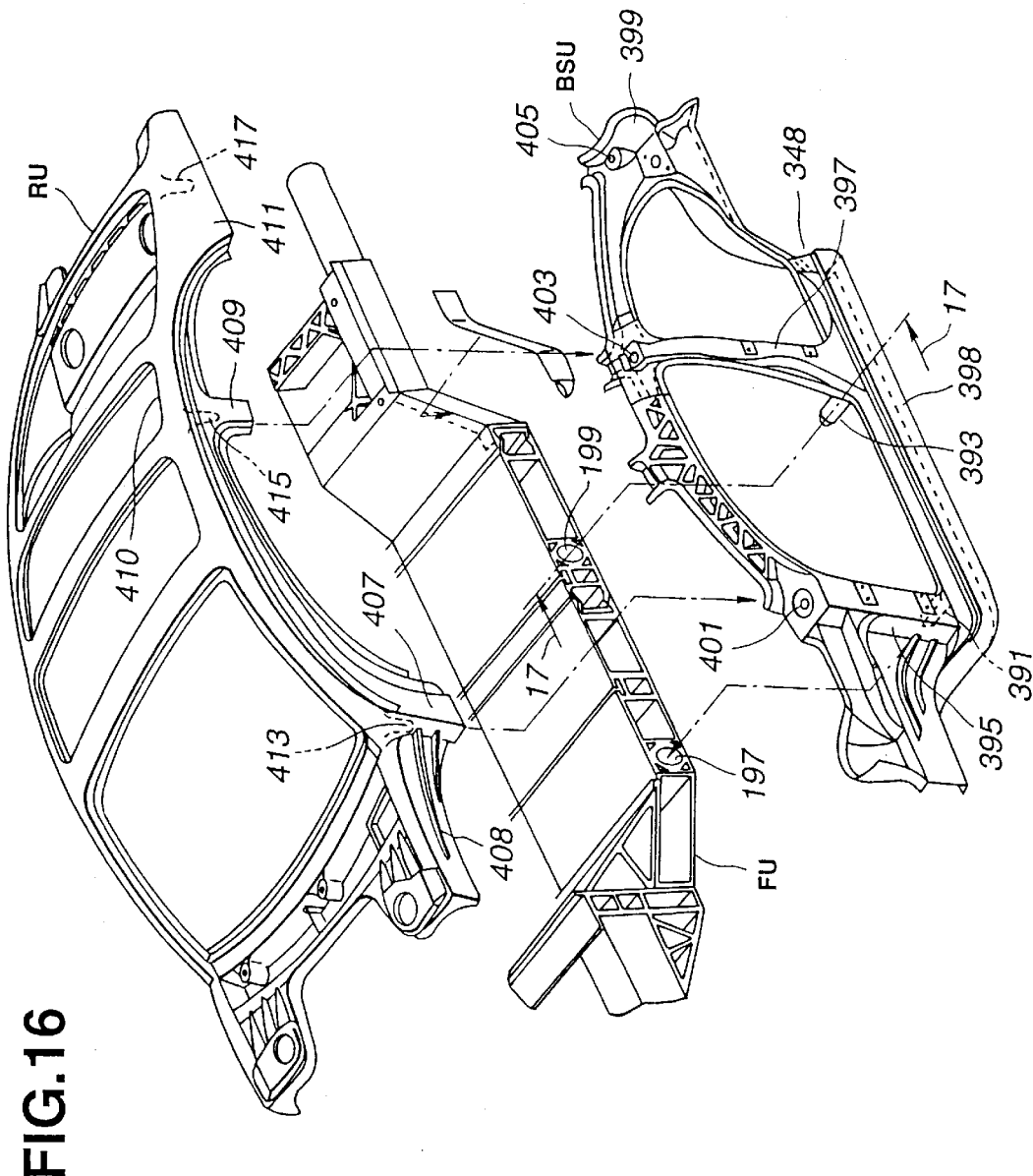
FIG. 16 is a greatly simplified exploded view, illustrating where a floor unit, a body side unit, and a roof unit are positioned relative to each other as well as structures for positioning.

FIG. 16 illustrates where a floor unit FU, a body side unit BSU, and a roof unit RU are positioned relative to each other as well as structures for positioning.

The floor unit FU is provided with two locate holes 197 and 199, while the body side unit BSU has two locate pins 391 and 393. These locate pins 391 and 393 are made of steel pipes embedded into a body side structure 348 of aluminum die cast. The pins 391 and 393 may be integral parts of the body side structure 348.

The positioning and the provisional connection between the floor unit FU and the body side unit BSU are accomplished only by inserting the locate pins 391 and 393 into the locate holes 197 and 199, respectively. Thus, according to the present embodiment, the locate pins 391 and 393 and the locate holes 197 and 199 constitute a lower structure for positioning a lower portion of the body side unit BSU to the floor unit FU. The locate pin 391 is disposed at a point below a front pillar 395 of the body side unit BSU. The locate pin 393 is disposed at a point below a center pillar 397 within an area where the center pillar 397 and a side sill 398 are joined. Accordingly, the lower structure is arranged in a level lower than a lower end of the center pillar 397. The locate pins 391 and 393 and the locate holes 197 and 199 have their axes, respectively, and they are arranged with their axes lying in a traverse direction with respect to a longitudinal direction of the vehicle body.

The positioning and the provisional connection between the roof unit RU and the body side unit BSU are accomplished by cooperation of locate pins with locate holes, respectively. The body side unit BSU is formed with three locate holes 401, 403 and 405. The roof unit RU has three locate pins 413, 415 and 417. The locate hole 401 is disposed at an upper end of the front pillar 395. The locate hole 403 is disposed at an upper end of the center pillar 397. The locate hole 405 is disposed at an upper end of a rear pillar 399. The locate pin 413 is disposed at a lower end of a front pillar 407 of the roof unit RU. The locate pin 415 is disposed at an upper end of a center pillar 409 of the roof unit RU. The locate pin 417 is disposed at an upper end of a rear pillar 411 of the roof unit RU.

The positioning and the provisional connection between the roof unit RU and the body side unit BSU are accomplished by inserting the locate pins 413, 415 and 417 into locate holes 401, 403 and 405, respectively. Thus, according to the present embodiment, the locate pins 413, 415 and 417 and the locate holes 401, 403 and 405 constitute an upper structure for positioning the roof unit RU to an upper portion of the body side unit BSU. Accordingly, the upper structure is composed of at least a portion disposed at the upper end of the center pillar 397, 409 and a portion disposed at a mid point of the front pillar 407, 395.

FIG. 16 illustrates the connections between the left-hand body side unit BSU, the floor unit FU, and the roof unit RU, only. The connections between the right-hand body side unit BSU, the floor unit FU, and the roof unit RU are substantially the same. The locate pins 413, 415 and 417 and the locate holes 401, 403 and 405 have axes. The locate pins 413, 415 and 417 and the locate holes 401, 403 and 405 are arranged with their axes lying in a vertical direction with respect to the vehicle body. In this embodiment, the axis of the locate pin 403 of the upper structure and that of the locate pin 391 of the lower structure are disposed in a common vertical plane of the vehicle body. The axis of the locate pin 415 of the upper structure and that of the locate pin 393 of the lower structure are disposed in another common vertical plane of the vehicle body.

The locate pin 413 of the roof unit RU is disposed at where the front pillar 407 and a hood ridge 408 are joined. The locate pin 415 is disposed where the center pillar 409 and a roof side rail 410 are joined. The locate pin 417 is disposed where the rear pillar 411, a rear roof rail 412, and a roof side rail 410 are joined.

With the lower positioning structure, each of the body side units BSU joins the floor unit FU inwardly in a transverse direction with respect to the longitudinal line of the vehicle body. The roof unit RU is lowered in a vertical direction to join the two body side units BSU that has previously been connected to the floor unit FU by inserting the locate pins 413, 415 and 417 into the locate holes 401, 403 and 405. In this manner, the upper positioning structure holds upper free edges of the body side units BSU that are connected to the floor unit FU, thus further enhancing accuracy in connection of the body side units BSU to the floor unit FU.

Positioning and provisional connection between floor unit FU, body side units BSU, and roof unit RU are accomplished by the pins and locate holes without any help of a vehicle body holding jig. Thus, such a jig may no longer be needed. If floor units and roof units have different widths, there is no need to prepare different jigs for different body widths. This results in a great reduction in the amount of equipment investment to the process of vehicle body build-up.

In FIG. 16, the vehicle cabin interior parts are not illustrated for the sake of simplicity of illustration.

Figure 17:
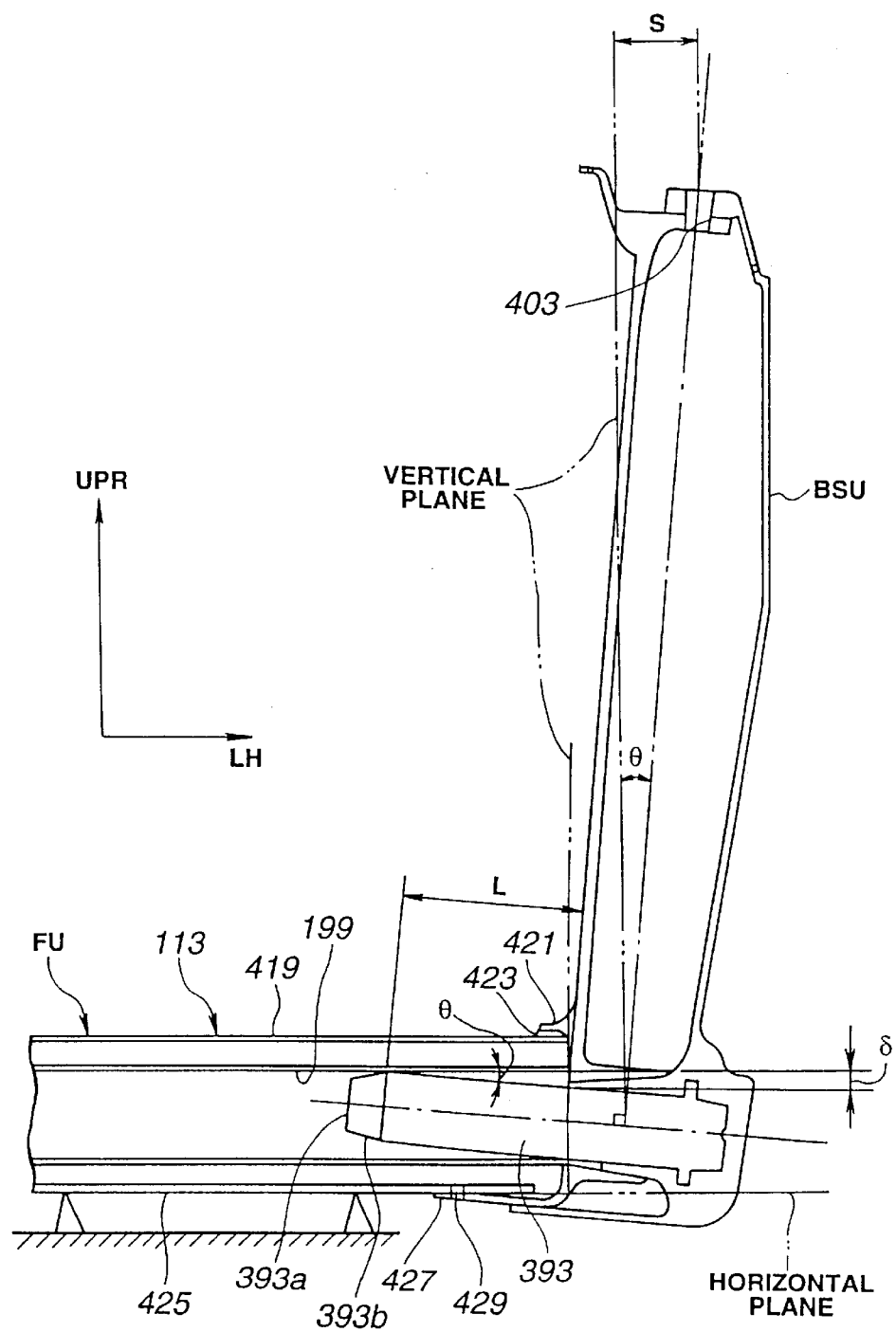
FIG. 17 is a fragmentary enlarged section taken through the line 17—17 of FIG. 16 before engagement with the roof unit, illustrating the left-hand body side unit provisionally connected to the floor unit with a pin into a locate hole.

As is readily seen from FIG. 17, provisionally connecting the body side unit BSU to the floor unit FU accomplishes positioning. When it engage the body side units BSU, the roof unit RU serves as a jig to produce a well-built vehicle body. The locate hole 199 of the floor structure 113 has an inner diameter unaltered because the floor structure 113 is of the aluminum alloy die casting product. Because the inner diameter of the locate hole 199 cannot be altered, the pin 393 of the body side unit BSU is modified for adjustment of the provisional connection.

The pin 393, which is embedded into the body side unit BSU, extends into the locate hole 199 defined by a sleeve of the floor structure 113. At a free end 393a thereof, the pin 393 is reduced in diameter. The reduced diameter free end 393a gradually increases its diameter toward the body side unit BSU, forming a conical spherical taper surface 393b, to connect smoothly into a shank with an unreduced diameter. The reduced diameter free end 393a and the adjacent taper surface 393b are provided to facilitate insertion of the pin 393 into the locate hole 199. Let it be assumed that the shank of the pin 393 is inserted into the locate hole 199 by a coupling length L (el) with a clearance δ (delta). Let it also be assumed that the body side BSU is inclined from the vertical plane through an angle θ (theta). The angle θ can be expressed as $\theta = \tan^{-1}(\delta/L)$. This angle θ determines a deviation S of an actual position of the locate hole 403 from a desired position. Thus, appropriately selecting the coupling length L and the clearance δ can control the deviation S without any help of a jig.

Figure 18:
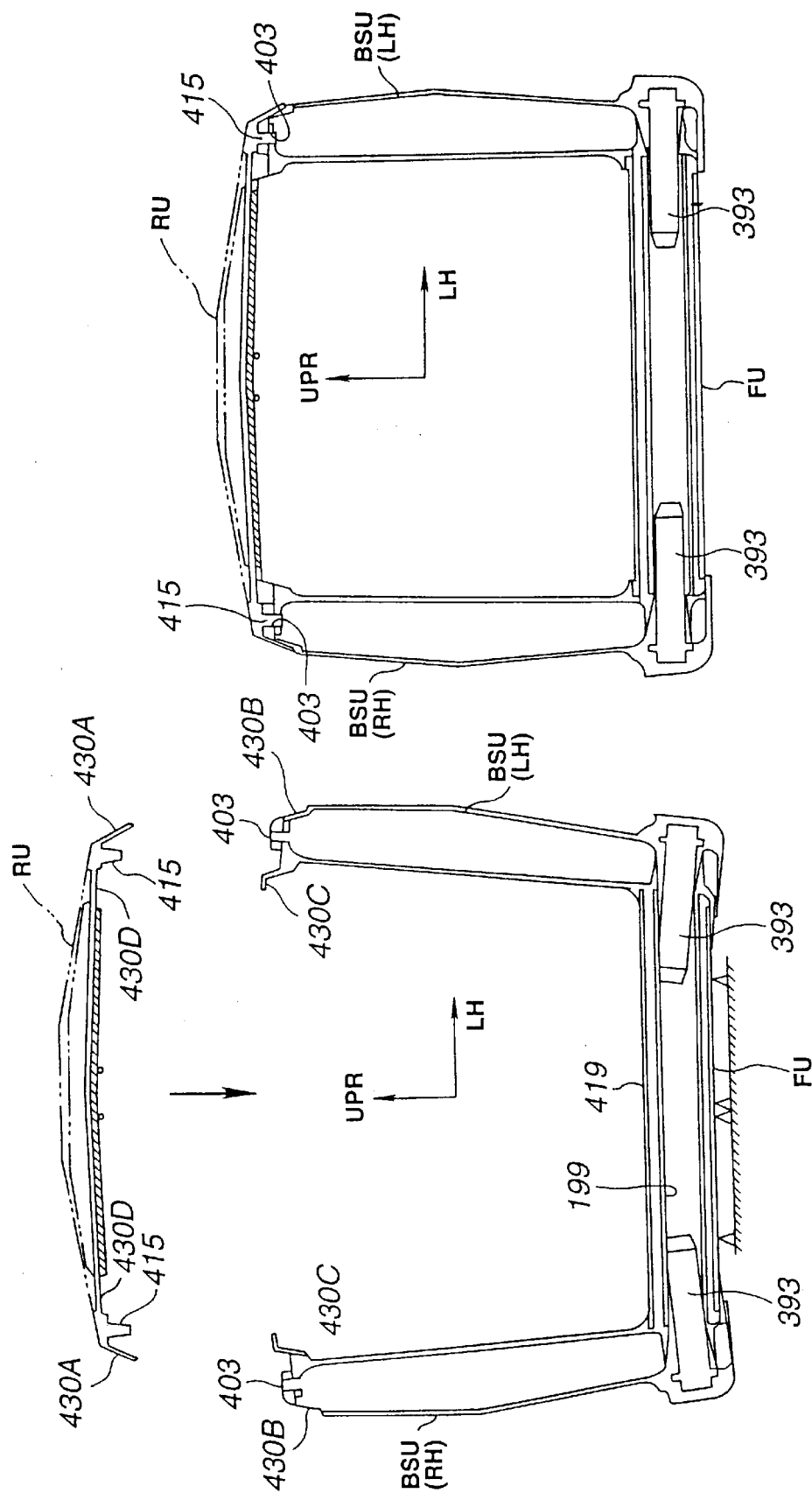
FIG. 18A is a diagrammatic section taken through the line 17—17 of FIG. 16 before engagement with the roof unit.
FIG. 18B is a diagrammatic section taken through the line 17—17 of FIG. 16 after engagement with the roof unit.

Referring to FIGS. 18A and 18B, FIG. 18A illustrates the position of the body side units BSU before engagement with the roof unit RU, while FIG. 18B illustrates the position of the body side units BSU after engagement with the roof unit. Each of the pins 393 of the lower positioning structure is inserted into the locate hole 199 in horizontal direction, while each of the pins 415 of the upper positioning structure is inserted into the locate. hole 403 in vertical direction. This connecting structure reduces the angle θ further toward zero.

The structural rigidity of the vehicle body may be increased more by providing contact surfaces, one on each of the body side units BSU and the other on the adjacent sides of the roof unit RU as well as ribs to suppress local deformation in cross sectional profile.

As described before in connection with FIG. 16, the pin 393 inserted into the locate hole 199, which is used for connection between the floor unit FU and the body side unit BSU, is fixedly attached to the body side unit BSU at an area where the center pillar 397 and the side sill 398 join with each other. The pin 413 inserted into the locate hole 401, which is used for connection between the body side unit BSU and the roof unit RU, is fixedly attached to the roof unit RU at an area where the hood ridge 408 and the front pillar 407 join with each other. The pin 417 inserted into the locate hole 405, which is used for the connection between the body side unit BSU and the roof unit RU, is fixedly attached to the roof unit RU at an area where the rear pillar 411, a rear roof rail 412 and roof side rail 410 join with each other.

The above-mentioned areas are reinforced locally to provide a vehicle body, which exhibits excellent performance in protecting vehicle occupants during collision as well as increased structural rigidity. At such areas, the pins 391, 393, 413, 415 and 417 are fixedly attached to the body side unit BSU or the roof unit RU and inserted, with an appropriate clearance, into the locate holes 197, 199, 401, 403 and 405, respectively. This pin and hole connections facilitate wide distribution of stress imparted to the vehicle body over the whole area of the vehicle body. This is because all of interface surface areas between the pins 391, 393, 413, 415 and 417 and the locate holes 197, 199, 401, 403 and 405 bear the stress. Accordingly, structural strength and rigidity of a vehicle body are maintained sufficiently high without any reinforcement.

After provisional connection, as mentioned above, between the floor unit FU, body side unit BSU and roof unit RU, the assembled body unit UBU is transferred to the WPU 58 (see FIG. 15). In the WPU 58, they are fixedly connected to each other by laser welding. The laser welding is carried out by an automatic robot and within a site defined between two spaced partitions in the same manner as the welding process to produce the floor unit FU.

The interior parts, such as seats and instrument panel, are mounted within the body unit UBU. It is impractical to carry out a spot welding mainly due to difficulty of inserting a spot gun into the interior of the body. Thus, welding from the outside of the body is recommended to fixedly connect the floor unit FU, body side units BSU and roof unit RU.

As best seen in FIG. 17, the floor structure 113 of the floor unit FU employs a dual floor structure so that an inner plate 419 of the floor structure 113 and a protrusion 421 of the body side unit BSU need to be fixedly connected. Normal temperature thermosetting adhesive 423 fills the interface between the inner plate 419 and the protrusion 421 to bond therebetween. An outer plate 425 of the floor structure 113 and a bracket 427 of the body side unit BSU are fixedly connected to each other at 429 by laser welding. Heat generated by the laser welding is transmitted through the floor structure 113 toward the interior parts already mounted to the vehicle cabin. An air layer between the inner and outer plates 419 and 425 of the dual floor structure effectively reduce the transmission of such heat, causing no heat damage. The adhesive 423 fills and seals any clearance between the inner plate 419 and the protrusion 421 to prevent any passage of air and water at an excellent level, thus eliminating a need of another sealing arrangement.

High temperature thermosetting seal, which is cured during baked finish, is used for a vehicle body in the conventional vehicle production. Such baked finish has not been used, making it impossible to use such high temperature thermosetting seal. Thus, a need has arisen to use normal temperature thermosetting adhesive at 423.

Figure 19:
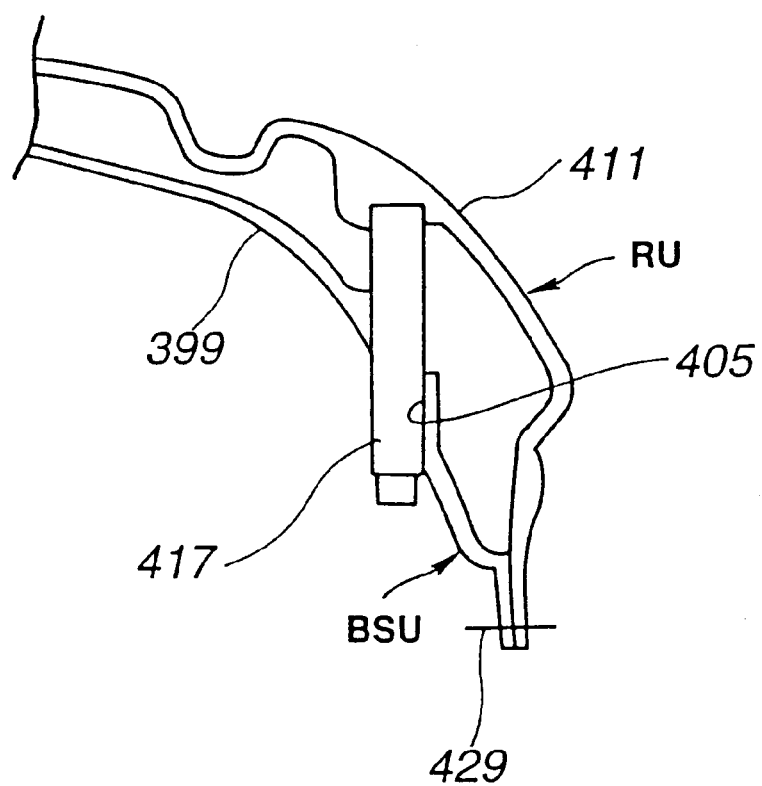
FIG. 19 is a fragmentary section showing a rear pillar structure around a pin inserted into a locate hole.

Referring to FIG. 18A, with regard to connection between the roof unit RU and the body side units BSU(LH) and BSU(RH), when the pins 415 are inserted into the locate holes 403, downwardly and outwardly extending flanges 430 of the rood unit RU overlap the body side units BSU on portions 403B along upper edges thereof, respectively, while upwardly and inwardly extending flanges 430C overlap an inner surface of the roof units at portions 430D adjacent the pins 415. The flanges 430A are fixedly connected to the portions 430B by laser welding, while the flanges 430C are fixedly connected to the portions 430D by laser welding. The laser welding operation is carried out from outside of the body unit UBU. Due to fixed connections established by laser welding around the pins, such as pins 415, and the locate holes, such as locate holes 403, the rood unit RU and the body side units BSU are brought into firm and strong engagement with each other. FIG. 19 illustrates structure around the pin 417 of the rear pillar 411 of the roof unit RU inserted into the locate hole 405 through the rear pillar 399 of the body side unit BSU. As shown in FIG. 19, the rear pillar 411 of the roof unit RU is welded, by laser welding, to the rear pillar 399 of the body side unit BSU at 429. At the other portions also, the flanges 430A and 430C are welded, by laser welding, to the body side unit BSU and the roof unit RU, respectively, to provide the closed sectioned structure reinforcing the roof side rail 410 (see FIG. 16). The preceding description now clearly indicates that laser welding between the flange 430A of the roof unit RU and each of the body side unit BSU and between the flange 430B of each of the body side unit BSU and the roof unit RU completes a closed cross section structure. This structure reinforces the connection between the roof unit RU and each of the body side units BSU.

With regard to the adhesive connection, the inner trimming is temporarily removed to expose a clearance between each of the protrusions 421 of the body side units BSU and the inner plate 419 (see FIG. 17) of the floor unit FU. Subsequently, the adhesive is put into the exposed clearances. With regard to welding connection between the body side units BSU and the roof unit RU, the inner trimming is temporarily removed to expose overlapped portions between the flanges 430C of the body side units BSU and the portions 430D (see FIG. 18A). Subsequently, these overlapped portions are welded by laser welding. In this manner, good appearance of the interior of the vehicle cabin is maintained. Finally, these temporarily removed trimming parts are mounted again. Such parts to be temporarily removed should be as small as possible to cover only the adhesive and welding connections to avoid any delay work in connecting the vehicle body parts to each other.

Figure 20:
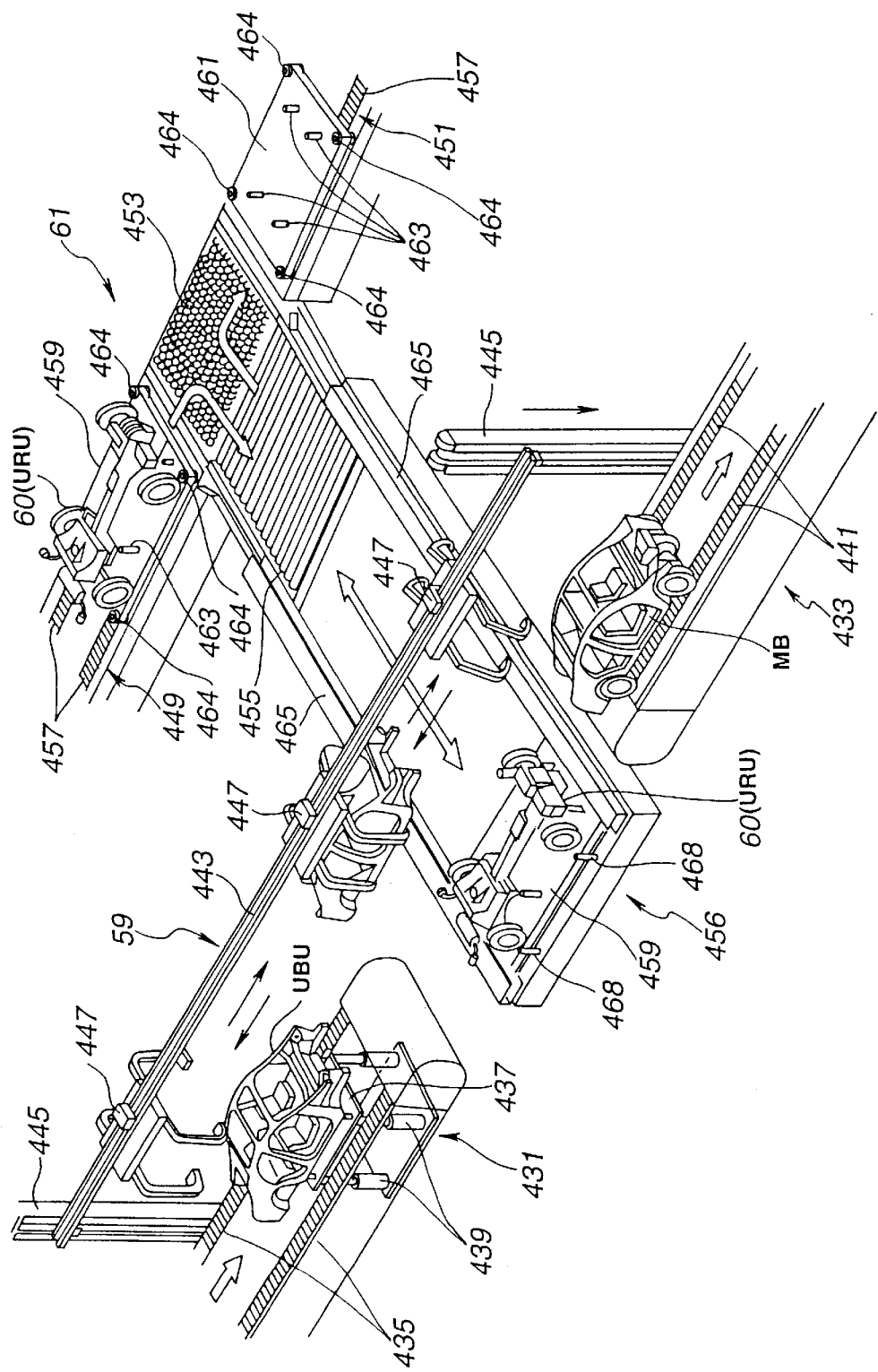
FIG. 20 is a perspective view illustrating an under running unit mount process unit where a body unit and an under running unit are joined.

Referring to FIG. 20, the body unit UBU that has been welded by laser welding operation at the WPU 58 is transferred to the RPMPU D where the body unit UBU and the under running unit URU 60 are joined. As shown in FIG. 20, the RPMPU D includes two automatic conveyers 431 and 433. The automatic conveyer 431 extends on downstream side of the WPU 58 (see FIG. 14). This automatic conveyer 431 is substantially the same as the automatic conveyer 285 illustrated in FIG. 9 and includes a pair of parallel belts 435, which are driven by a motor under a controller.

Near the downstream end of the automatic conveyer 413, a power-assisted lift 437 is arranged. This lift 437 includes a platform supported by extendable cylinders 439. Activating the cylinders 439 lifts the platform of the lift 437. The other automatic conveyer 433 is arranged downstream of the automatic conveyer 431. Similarly, the automatic conveyer 433 includes a pair of parallel belts 441, which are driven by a motor under a controller.

On one side of the automatic conveyers 431 and 433, the automatic mounting machine 59 is installed. The automatic mounting machine 59 include a rail 443. The rail 443 is supported and can be elevated by a lift 445. A wheeled shifter 447 for gripping a body unit UBU is supported by and movable along the rail 443. Three typical positions which the wheeled shifter 447 may take are illustrated in FIG. 20. The wheeled shifter 447 has a first position above the platform of the lift 437. If the lift 445 lowers the rail 343 and the wheeled shifter 447 down to a position where the wheeled shifter 447 can grip an upper body UBU on the platform of the lift 437, the wheeled shifter 447 grips the body unit UBU. Then, the lift elevates the rail 443 together with the wheeled shifter 447 gripping the body unit UBU. The wheeled shifter 447 moves along the rail to a second position above an under running unit URU 60. The rail 443 is lowered again down to a position where the upper vehicle body UBU can be operatively connected to the under running unit URU 60. After completion of joining the body unit UBU with the under running unit URU 69 to provide a main body MB, the rail 443 and the wheeled shifter 447 are elevated again. The wheeled shifter 447 moves from the second position to a third position above the automatic conveyer 433. Then, the rail 443 and the wheeled shifter 447 are lowered again and the wheeled shifter 447 releases the main body MB. The rail 443 and the wheeled shifter 447 are elevated again leaving the main body MB on the automatic conveyer 433. The wheeled shifter 447 moves back to the first position again.

An URU supply unit 61 includes a pair of automatic conveyers 449 and 451 extending from the site 105 where under running units URU are stationed. It also includes a ball roller table 453, a roller conveyer 455, and pallets 459 and 461.

Each of the automatic conveyers 449 and 451 is equipped with a pair of belts 457. The automatic conveyer 449 transfers the pallet 459 having an under running unit URU 60, while the automatic conveyer 451 transfers the empty pallet 461. Each of the pallets 459 and 461 is provided with set pins 463. Each pallet 459 or 461 is equipped with a set of four guide rollers 464 at corners thereof, respectively. The guide rollers of each pallet can rotate about vertical axes, respectively.

The ball roller table 453 is disposed between the automatic conveyers 449 and 451. The roller conveyer 455 transfers the pallet 459 or 461 from the ball roller table 453 to a guide rail 456 and vice versa. The guide rail 456 extends from the roller conveyer 455 to a location between the automatic conveyers 431 and 433. Along this guide rail, the pallet 459 is transferred to a predetermined position between the automatic conveyers 431 and 433. The empty pallet 461 is transferred back to the roller conveyer 455. The guide rail 456 has a pair of channel shaped rails 465, which are spaced with their openings opposed to each other. The guide rail 456 has stops 468 near remotest ends of the rails 465 from the roller conveyer 455.

The automatic conveyer 431 transfers the body unit UBU from the WPU 58. When the body unit UBU reaches the lift 437, a sensor detects that the body unit UBU has reached a position above the platform of the lift 437 and activates the cylinders 439. The cylinders 439 extend to lift the platform to hold the body unit UBU free from the automatic conveyer 431.

Then, the rail 443 of the automatic mounting 59 is lowered. The wheeled shifter 447 grips the body unit UBU on the platform of the lift 437. After having gripped the body unit UBU, the lift 445 elevates the rail 443. With the rail 443 at its elevated position, the wheeled shifter 447 moves from the first position along the rail 443 in a downstream direction to the second position above the guide rail 456 of the URU supply unit 61.

An under running unit URU is transferred from the parts station site 105 (see FIGS. 1A and 1B). The under running unit URU includes an engine, a power train, a suspension system, and a fuel supply system. At the parts station site 105, a pallet 459 is selected in accordance with a production order out of different pallets having different under running units. The automatic conveyer 449 transfers the selected pallet 459 toward the ball roller table 453 as shown in FIG. 20. The automatic conveyer 449 can set the pallet 459 on the ball roller table 453. Workers manually moves the pallet 459 with the under running unit URU from the ball roller table 453 to the guide rail 456 via the roller conveyer 455.

The workers move the pallet 459 along the guide rail 456 to a predetermined position between the automatic conveyers 431 and 433. Movement of the pallet 459 beyond this predetermined position is limited by the stop 468. The guide rollers 464 are in rolling contact with the channel shaped rails 465 for smooth movement of the pallet 459.

When the under running unit URU is at the predetermined position between the automatic conveyers 431 and 433, the rail 443 of the automatic mounting machine 59 is lowered to mount the body unit UBU to the under running unit URU on the pallet 459.

Worker initiate operations to operatively interconnect the body unit UBU and the lower running unit URU. The workers can perform these operations at a level as high as the vehicle main body MB, eliminating such an operation that forces a worker to lie on its back. This results in great enhancement in working environment.

After completion of the interconnecting operation, the lift 445 elevates the rail 443 again to the elevated position. Then, the wheeled shifter 447 with the main body MB moves in the downstream direction toward the third position above the automatic conveyer 433. After reaching the third position above the automatic conveyer 433, the rail 443 is lowered by the lift 445 and the wheeled shifter 447 releases the main body MB to set it on the automatic conveyer 433. The lift 445 elevates the rail 443 again to the elevated position. The empty wheeled shifter 447 moves in an upstream direction toward the first position above the platform of the lift 437 of the automatic conveyer 431.

The automatic conveyer 433 transfers the main body MB to the next EPAPU F where exterior parts are attached to the main body MB. The empty pallet is moved back along the guide rail 456 to the roller conveyer 455. The empty pallet is moved back via the ball roller table 453 to the automatic conveyer 451.

The automatic conveyer 451 returns the empty pallet 461 to the parts station site 105. At the parts station site 105, a new under running unit URU is set on the pallet 461.

Turning back to FIGS. 1A and 1B, in the EPAPU F, a rear bumper from the rear bumper pallet 63, a front bumper from the front bumper pallet 65, and a front end module from the front end module pallet 67 are attached to the main body MB. The main body MB is on a roller conveyer and manually moved along the roller conveyer. The front-end module includes a radiator, a condenser, headlamps, and a bracket structure. The front-end module is heavy. The lift 4 is therefore used to mount it to the main body MB. The rear bumper and front bumper are not heavy so that workers can manually carry them to the main body MB for attachment thereto. After the EPAPU F, workers transfer the main body MB toward the LSPU G using the roller conveyer.

Referring to FIGS. 1A and 1B, in the LSPU G, the worker supplies the main body MB with long life coolant from the long life coolant supply station 68, gasoline from the gasoline supply station 69, brake oil from the brake oil supply station 71, and power steering oil from the power steering oil supply station 73. After the LSPU G, workers transfer the main body MB toward the WAPU H using the roller conveyer.

In the WAPU H, workers draw lamps from the lamp pallet 74 and mount them to the rear end panel, and then draw front and rear windshield panels from the windshield panel pallet 75 and mount them to the main body MB. After mounting the windshield panels, the workers transfer the main body MB toward the DMPU I.

In the DMPU I, a right-hand door unit is assembled in the RDAPU 77 and a left-hand door unit is assembled in the LDAPU 78. With the help of lifts 4, a worker mounts the door units to the main body MB. In the conventional production line, a white body has door panels and is subjected to painting and coating processes. After completion of the painting and coating processes, the door panels are removed and equipped with necessary parts to provide door units. Then, the door units are mounted to the body again. The preferred implementation of the present invention does not employ painting and coating processes. Thus, such complicated work is no longer required to mount doors to the vehicle body.

Referring to FIG. 21, an explanation is made on how to assembly door units. FIG. 21 illustrates the RDAPU 77. The LDAPU 78 is substantially the same as the RDAPU 77 except a minor difference that a left-hand door unit is assembled in the LDAPU 78, while a right-hand door unit is assembled in the RDAPU 77. As shown in FIG. 21, the RDAPU 77 includes the roller conveyer 47. The sash module front pallet 79, inner module pallet 87, interior trim module pallet 85 and door mirror unit pallet 83 are arranged around the roller conveyer 467.

The sash module pallet 79 is set on a load responsive extendable wheeled support 477. The pallet 469 carries a number of sash modules, which number may vary. Thus, the magnitude of weight applied to the support 477 may vary. However, the load-responsive wheeled support 477 extends in response to a reduction in weight applied thereto to hold the pallet 469 at a level as high as the roller conveyer 467.

Using a lift 4, a door sash module 479 is transferred from the pallet 79 onto the roller conveyer 467. Moving the door sash module 479 along the roller conveyer 467, an inner module 481, an interior trim module 483 and a door mirror unit 485 are attached to the door sash module 479 to produce a door unit. Using the lift 4 (see FIG. 1B), the door unit is supplied by worker to the main line and attached to the main body MB on the main line.

Figure 22:
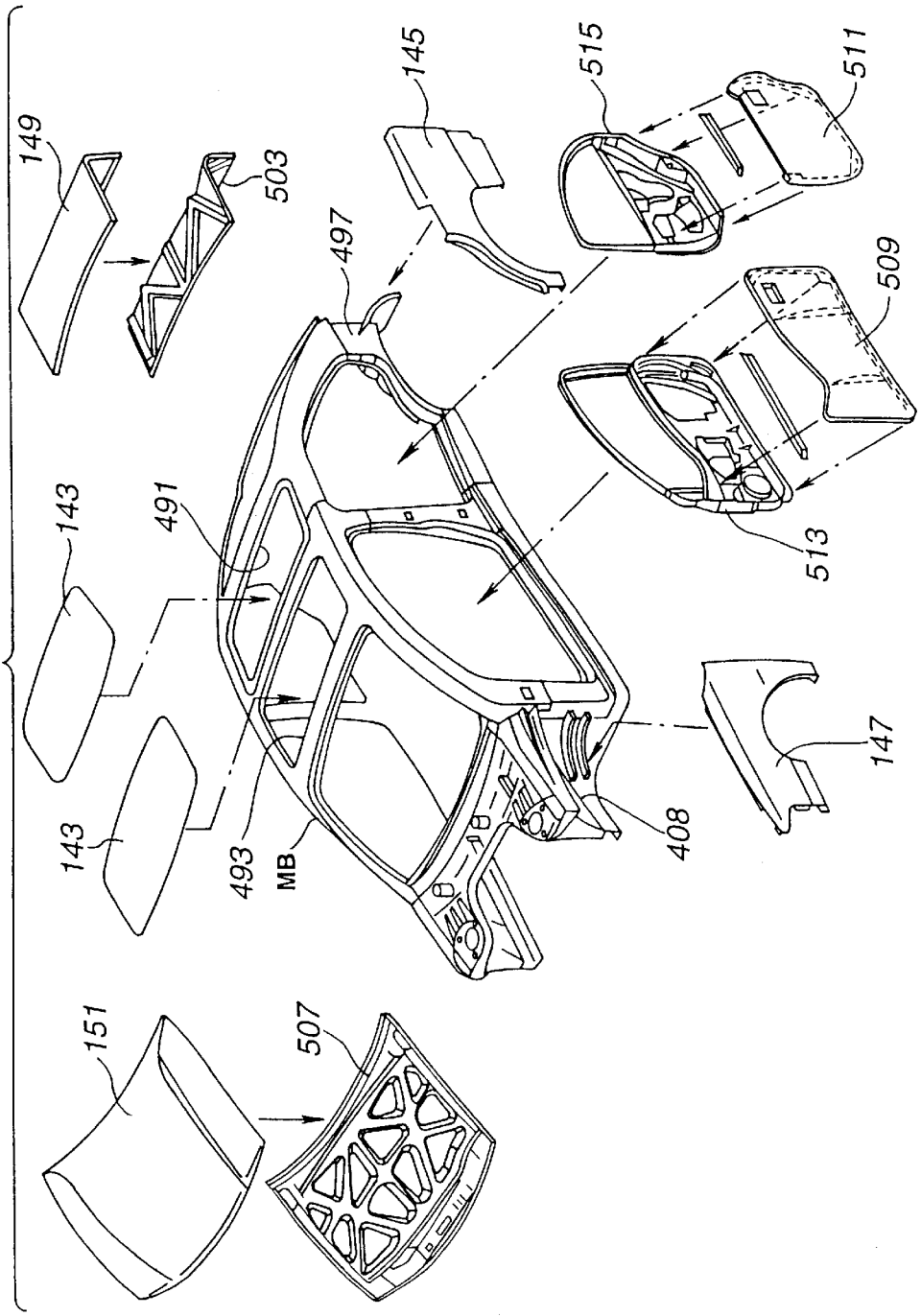
FIG. 22 is a fragmentary exploded view illustrating where to attach resin panels.

After the DMPU I, the main body MB is transferred to the ESDPU E. Referring to FIGS. 1A and 1B and FIG. 22, in the ESDPU E, moving the main body MB along the roller conveyer, a worker draws roof resin panels 143 out of the roof pallet 89 and attaches them to the main body MB. Similarly, the worker draws rear fender resin panels 145 out of the rear fender pallet 91 and attaches them to the main body MB. Next, the worker draws front fender resin panels 147 out of the front fender pallet 93 and attaches them to the main body MB. Further, the worker draws a trunk lid resin panel 149 out of the trunk lid pallet 95 and attaches it to the main body MB. The worker draws a hood resin plate 151 out of the trunk lid pallet 95 and attaches it to the main body MB. These resin panels 143, 145, 147, 149 and 51 have a color. Such resin panels having different colors are stocked at parts station site 111 to cope with production orders demanding color variations.

At the parts station site 111, the resin panels are classified in accordance with a production schedule and then supplied to the pallets 89, 91, 93, 95 and 97.

Referring to FIG. 22, the main body MB is simplified by eliminating unnecessary portions and parts. As readily seen from FIG. 22, the roof resin panels 143 are mounted in roof openings 491 and 493, respectively. The rear fender resin panels 145 are mounted to the outer surfaces of the rear fenders 497 of the main body MB. The front fender resin panels 147 are mounted to the outer sides of the hood ridges 408, respectively.

The trunk lid resin panel 149 is attached to a trunk lid inner 503 and mounted to the main body MB together with the trunk lid inner 503. The trunk lid inner 503 is made of an aluminum die cast product.

The hood resin panel 151 is attached to a hood inner 507 and mounted to the main body MB together with the hood inner 507. The hood inner 507 is made of an aluminum die cast product.

Although not illustrated in FIGS. 1A and 1B, door resin panels 509 and 511 are attached to a front door unit 513 and a rear door unit 515, respectively.

Figure 23:
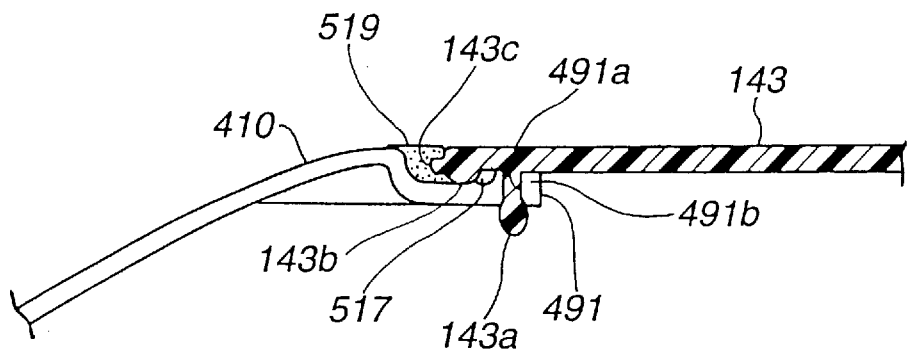
FIG. 23 is a fragmentary section illustrating a structure by which a roof resin panel is mounted in a roof opening.
Figure 24:
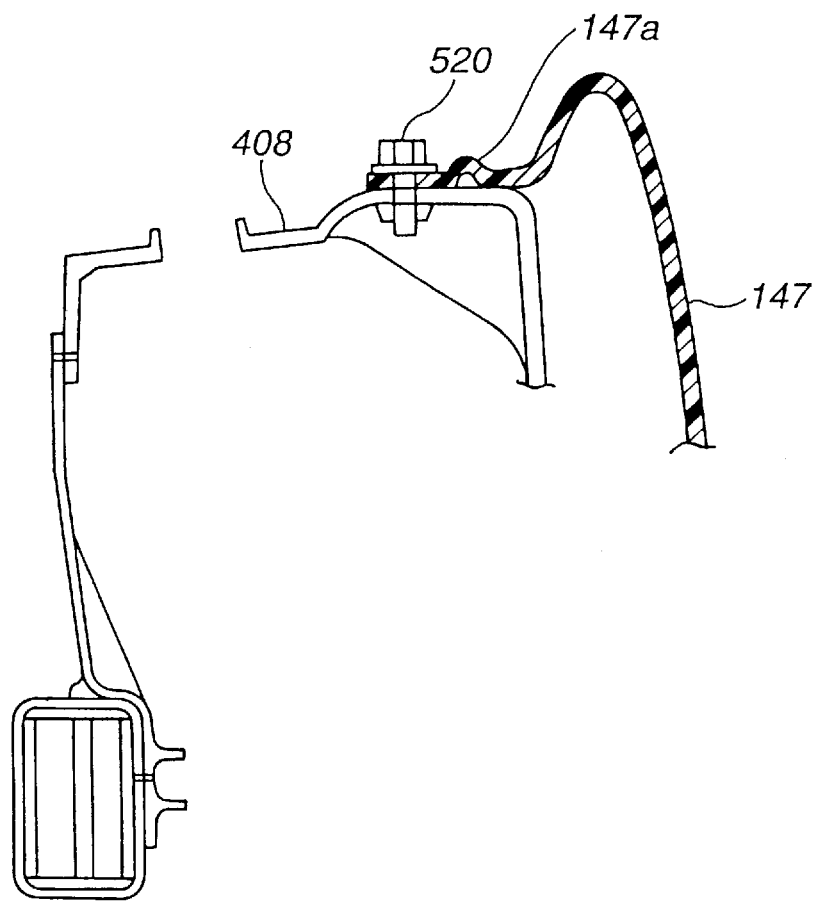
FIG. 24 is a fragmentary section illustrating a structure by which a front fender resin panel is attached to a hood ridge.
Figure 25:
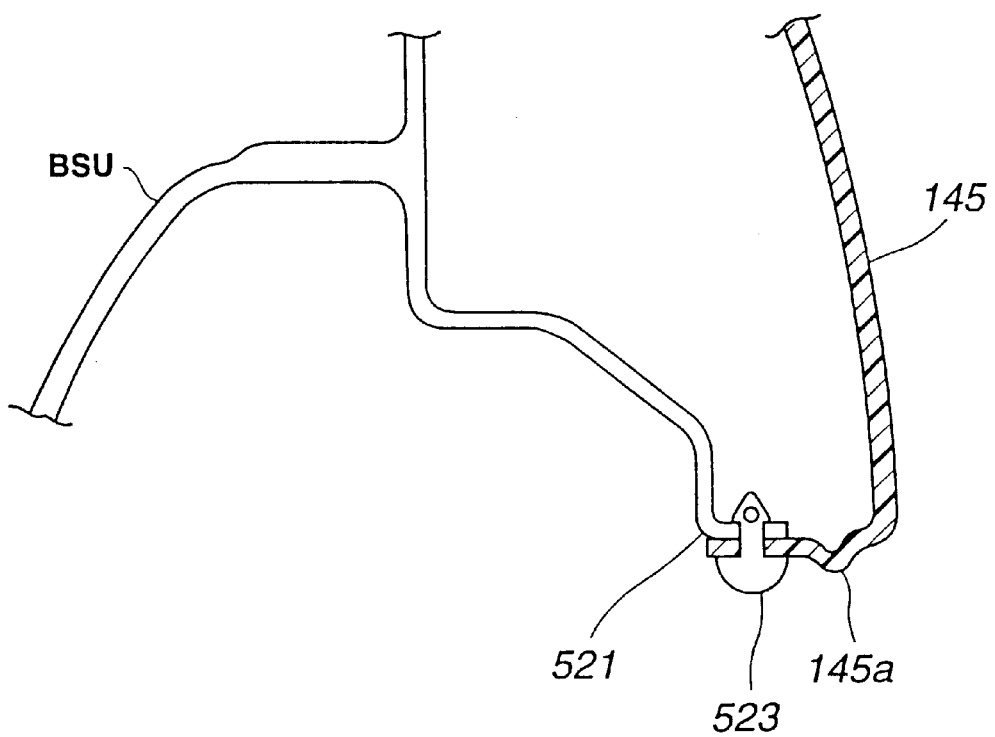
FIG. 25 is a fragmentary section illustrating a structure by which a rear fender resin panel is attached to a wheel housing opening defining edge.

FIGS. 23, 24 and 25 illustrate structures via which the resin panels are attached to the main body MB.

FIG. 23 illustrates the roof resin panel 143 fit in the roof opening 491. The roof resin panel 143 has integral clip portions, only one being shown at 143a, which engage in coupling holes, only one being shown at 491a, respectively. The roof opening 491 is defined by and surrounded by an edge portion 491b. The edge portion 491b is thicker than its surrounding recessed portion and it is formed with the coupling holes 491a. The thickened edge portion 491b comes into firm engagement with the adjacent inner surface portion of the roof resin panel 143 when the clip portions 143a engage in the coupling holes 491a, respectively.

As mentioned above, the adjacent portion surrounding the thickened edge portion 491b is recessed. The roof resin panel 143 has an integral dam 143b downwardly protruding from the inner surface thereof The dam 143b is disposed in the proximity of the outer periphery of the roof resin panel 143, and the clip portions 143a are remoter from the outer periphery of the roof resin panel 143 than the dam 143b is. The dam 143b comes into firm engagement with the recessed surrounding portion of the thickened edge portion 491 when the clip portions 143a engage in the coupling holes 491a, respectively. Sealing material 517 fills in a space between the dam 143b and the thickened edge portion 491. A protrusion 143c on the periphery extends over the overall periphery. This protrusion 143c is used to hold a weather strip 519 in position. The weather strip 519 is disposed within a recess defined by the recessed surrounding portion between the roof side rail 410 and the outer periphery of the roof resin panel 143.

The sealing material 517 is in the neighborhood of the hooked portions 143a, thus keeping enhanced gas tight and liquid tight seal of the vehicle cabin. The provision of the weather strip 519 makes much contribution to enhancement of outward appearance and of seal effectiveness.

Referring to FIG. 24, the front fender resin panel 147 is fixedly connected to the hood ridge 408 by mechanical fasteners, such as a bolt 520 with a nut. The bolts and nuts have undergone process for rust prevention. To absorb a difference in thermal expansion between the hood ridge 408 and the front fender resin panel 147, the front fender resin panel 147 has a curved portion 147a.

Referring to FIG. 25, a lower edge portion of the rear fender resin panel 145 is fixedly connected to a wheelhouse opening defining edge 521 of the body side unit BSU by means of resin clips, only being shown at 523. To absorb a difference in thermal expansion between the body side unit BSU and the rear fender resin panel 145, the front fender resin panel 145 has a curved portion 145a.

The attachment of each of the resin panels 143, 145, 147, 149 and 151 may be accomplished by any one of or any combination of the integral clips, mechanical fasteners, such as, bolts and nuts, and resin clips. In FIGS. 23, 24 and 25, it is illustrated that the integral clips accomplish the attachment of the resin panel 143, the bolts and nuts accomplish the attachment of the resin panel 147, and independent clips accomplish the resin panel 145. The structure to accomplish each of the resin panels 143, 147 and 145 is not limited to the illustrated one. Each of these resin panels may be attached to the main body by any other structure than the illustrated one.

With regard to the other resin panels that are not illustrated in FIGS. 23, 24 and 25, they may be attached to the main body by any appropriate connecting structure.

The preferred implementation of the present invention can considerably reduce the amount of money to be spent for preparing and timely producing variations in body color and in three-dimensional appearance reflecting a variety of needs of users. This is because resin panels 43, 145, 147, 149 and 151, which may have color variations as well as three-dimensional variations, are used to change color and three-dimensional appearance of a vehicle body, making vehicle design independent from vehicle production line.

The preferred implementation of the present invention can considerably reduce money reserved for repairing any damage on body panels, which might occur during the production line. This is because resin panels are attached to the vehicle body at the final stage of the vehicle production line.

The preferred implementation of the present invention has made it quite easy to change body color and three-dimensional appearance without changing structure of the main body MB. If a need arises to change body color and three-dimensional appearance, it is now possible to change them without any change in structure of the main body MB only by replacing the existing resin panels with new resin body panels having now color and three-dimensional appearance. Thus, the main body of the same structure may be used for extended period of time.

The preferred implementation of the present invention has made it possible to recycle the same vehicle body because the body structure of corrosion resisting alloy, such as aluminum alloy, is superior in regard to rust prevention in openings, and thus may be used for a period much longer than a steel body structure. If a user desires any change in color and/or three-dimensional appearance, what is needed is to replace at least one of the body panels with new version. This results in a reduction in the amount of discharge from the vehicle production.

The preferred implementation of the present invention has abolished the conventional painting and coating process of vehicle body and provided a superior vehicle body structure owing to the use of corrosion resisting light metal alloy, such as aluminum alloy.

The preferred implementation of the present invention has appreciably shorten a period of time required for production of a vehicle, making it possible to implement production on orders in manufacturing vehicles. This is because the conventional painting and coating process has been abolished. If constituent parts of a vehicle body are made of light metal alloy, such as aluminum alloy, the vehicle body shows superior corrosion resisting property because, when exposed to the atmosphere, a corrosion resisting oxidation film naturally grows on the surface of the vehicle body. The conventional vehicle body of steel has electrostatic deposition coating for rust resisting. If a piece of stone or a barrier striking the steel body damages the electrostatic deposition coating, a remarkable drop in rust resisting performance results. However, an oxidation film grows on the damaged portion of a vehicle body of aluminum alloy. This is the reason why the vehicle body of aluminum alloy is superior to the conventional vehicle body of steel in rust resisting performance.

The preferred implementation of the present invention has realized an automobile manufacturing plant that may be established within a considerably small area. This results from realization of a remarkably short production line.

The preferred implementation of the present invention provides a body assembly line integral with a trimming line. This has been accomplished by abolishment of the conventional painting and coating process, which was allowed by using a vehicle body of corrosion resisting light metal alloy, such as aluminum alloy.

The preferred implementation of the present invention has improved working environment by eliminating jobs within a closed space defined by a vehicle body. In the conventional vehicle production line, a worker has to enter a narrow closed space defined by a vehicle body to set seats, an instrument panel and harness. The closed space demands that worker continues jobs in an uncomfortable posture in bad working environment where he/she is not allowed to take a standing position. The preferred implementation provides good working environment by allowing a worker or workers to conduct jobs in an open space on a floor unit. Subsequently, the floor unit, body side units and a roof unit are joined to form a vehicle body. Each of the body side units includes a door trimming, and the roof unit includes a roof lining. Providing such good environment may result in increased working efficiency.

The preferred implementation according to the present invention has realized a very compact production line as a result of an enormous reduction in overall length of the line by replacing the conventional painting and coating process with attachment of color body panels of resin. Naturally, abolishment of the painting and coating process eliminates a need to change color in equipment to cope with a change in body color demand, opening the possibility that the body assembly may synchronize with the trimming. Accordingly, a great reduction in number of vehicle bodies before and after the painting and coating process is expected as well as a great reduction in stock pile of parts.

The preferred implementation according to the present invention greatly reduces the total stock of vehicles waiting for shipment by employing production on orders, bringing about a reduction in cost for transportation and stock control.

The very compact production line enormously shorten period of time from order to delivery, making it possible to change the current anticipated production to production on orders.

The preferred implementation according to the present invention has made it possible to abolish a jig for holding vehicle body parts during process of connecting them together. Pin and locate hole connection, which is employed in assembling a floor unit, body side units and a roof unit, functions to perform positioning as well as interconnection, thus eliminating a need of a jig.

The preferred implementation according to the present invention has remarkably reduced the weight of each of structural parts of a floor unit and the amount of load applied to workers attending the assembly. Each of the structural parts is an aluminum alloy extrusion die cast product and about half the weight of the identical structural part of steel.

The preferred implementation according to the present invention has appreciably reduced payment for dies and molds. Dies for extrusion casting is far less expensive to make than dies for press operation. Aluminum alloy extrusion die cast products by extrusion casting are used as they are without subjecting them to bending process, causing an appreciable reduction in the cost of the secondary process. Aluminum alloy extrusion die cast products and mold products have replaced conventional parts formed by pressing operation. They all make much contribution to a remarkable reduction in the amount of money to be spent for dies and molds.

The preferred implementation according to the present invention has lowered the amount of money to be spent for a variety of three-dimensional body appearances, which are to be prepared to meet varying design demands by users. Resin panels with different colors and three-dimensional appearances are prepared as body panels and selectively for attachment, by means of bolts and/or clips, to cope with such varying design demands. Preparation for such resin panels can be made without any modification of the production line.

The preferred implementation according to the present invention has lowered the amount of money reserved for repairing any damage on body surface as a result of a remarkable drop in probability of occurrence of damage. The attachment of resin panels is conducted at the final stage of the production line, causing such remarkable drop in occurrence of damage within a vehicle production plant.

The preferred implementation according to the present invention has made it possible to lower the amount of waste discharged out of automotive industry. Body resin panels are replaced with new ones to change color and/or three-dimensional appearance with the body structure unaltered if a user wishes to refresh body color and/or appearance. Thus, the body structure may be used for extended period of time.

The preferred implementation according to the present invention has extended period of time for which a body structure may be used by using the body structural parts of anticorrosion material such as aluminum alloy. Such anti-corrosion material possesses superior in rust resisting at edges of openings of the body structure.

Turning back to FIG. 4A, the front floor constituent parts 192, 193 and 195 are aluminum alloy extrusion die cast products. Each of the aluminum alloy extrusion die cast products has been made, in an extrusion die casting process, by forcing molten aluminum alloy through a mold cavity in a direction parallel to a transverse direction of the vehicle. Turning to FIG. 6, the dash cross member 237 is an aluminum alloy extrusion die cast product that has been mad, in an extrusion die casting process, by forcing molten aluminum alloy through a mold cavity in the same direction parallel to the transverse direction of the vehicle.

Referring to FIGS. 26 to 33, another example of a front floor 600 is explained as well as a dash cross member 700 and joints 800RH and 800LH.

Figure 26:
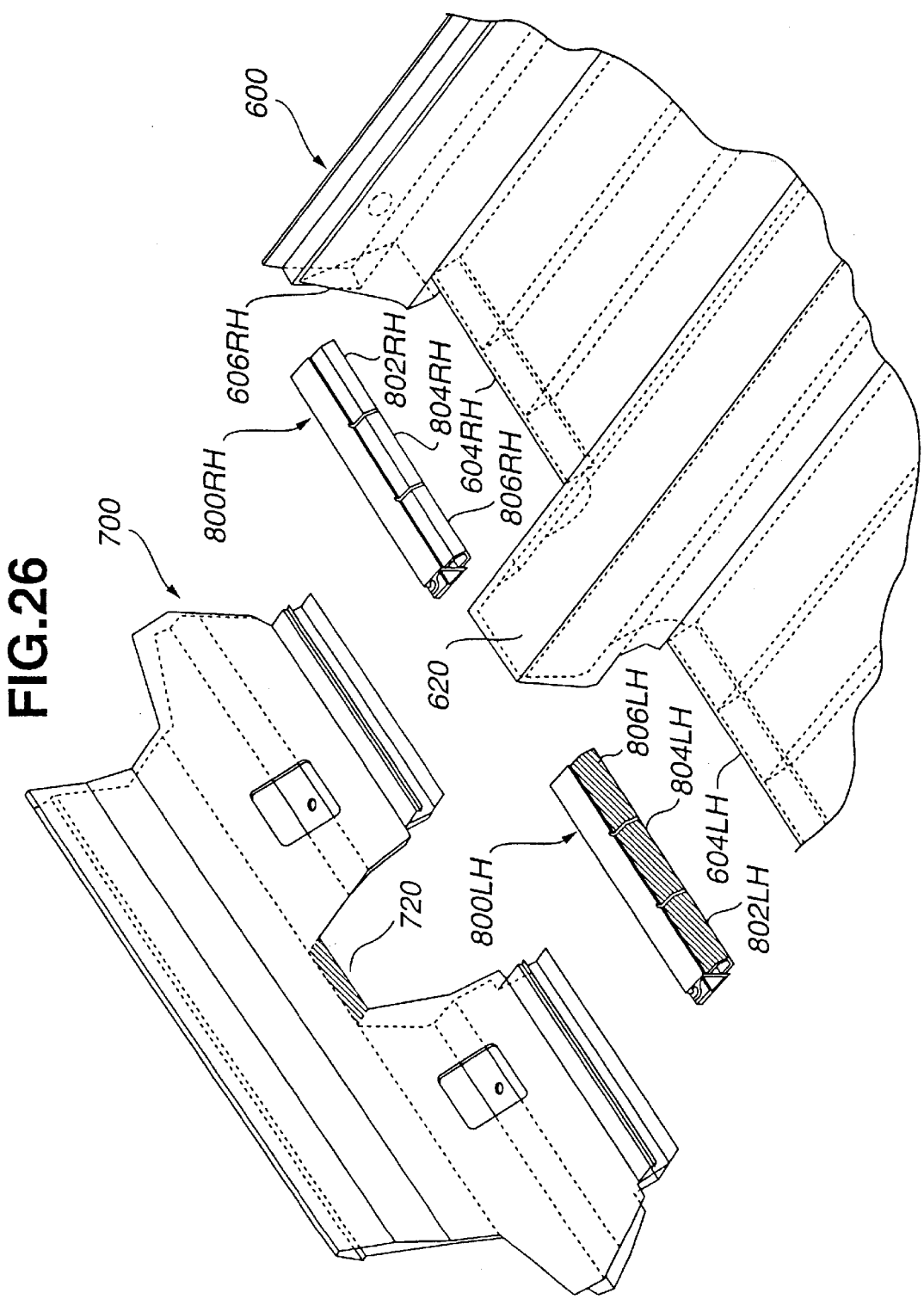
FIG. 26 is an exploded perspective view of a portion of anther example of a floor structure with joints and a dash cross member.
Figure 27:
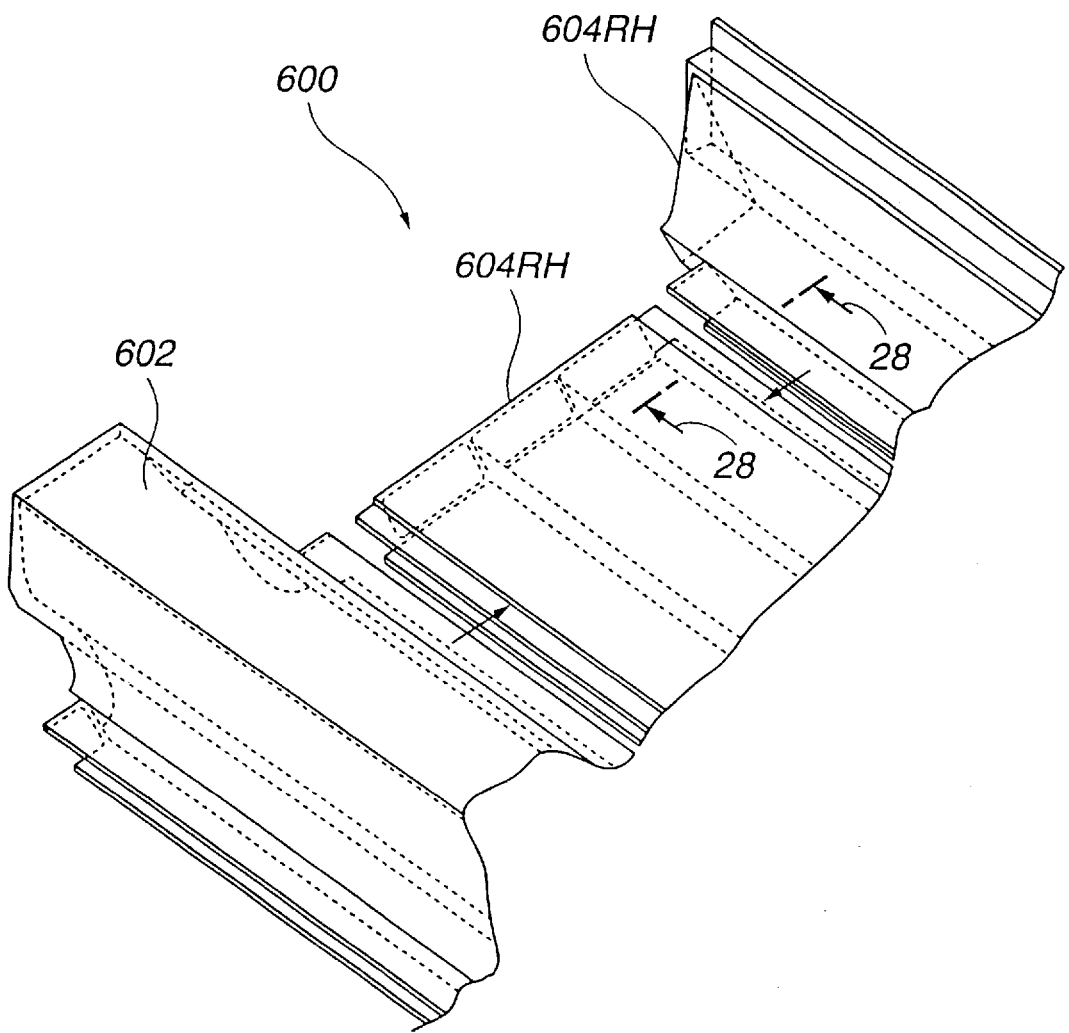
FIG. 27 is an exploded perspective view of a portion of the floor structure shown in FIG. 26.
Figure 29:
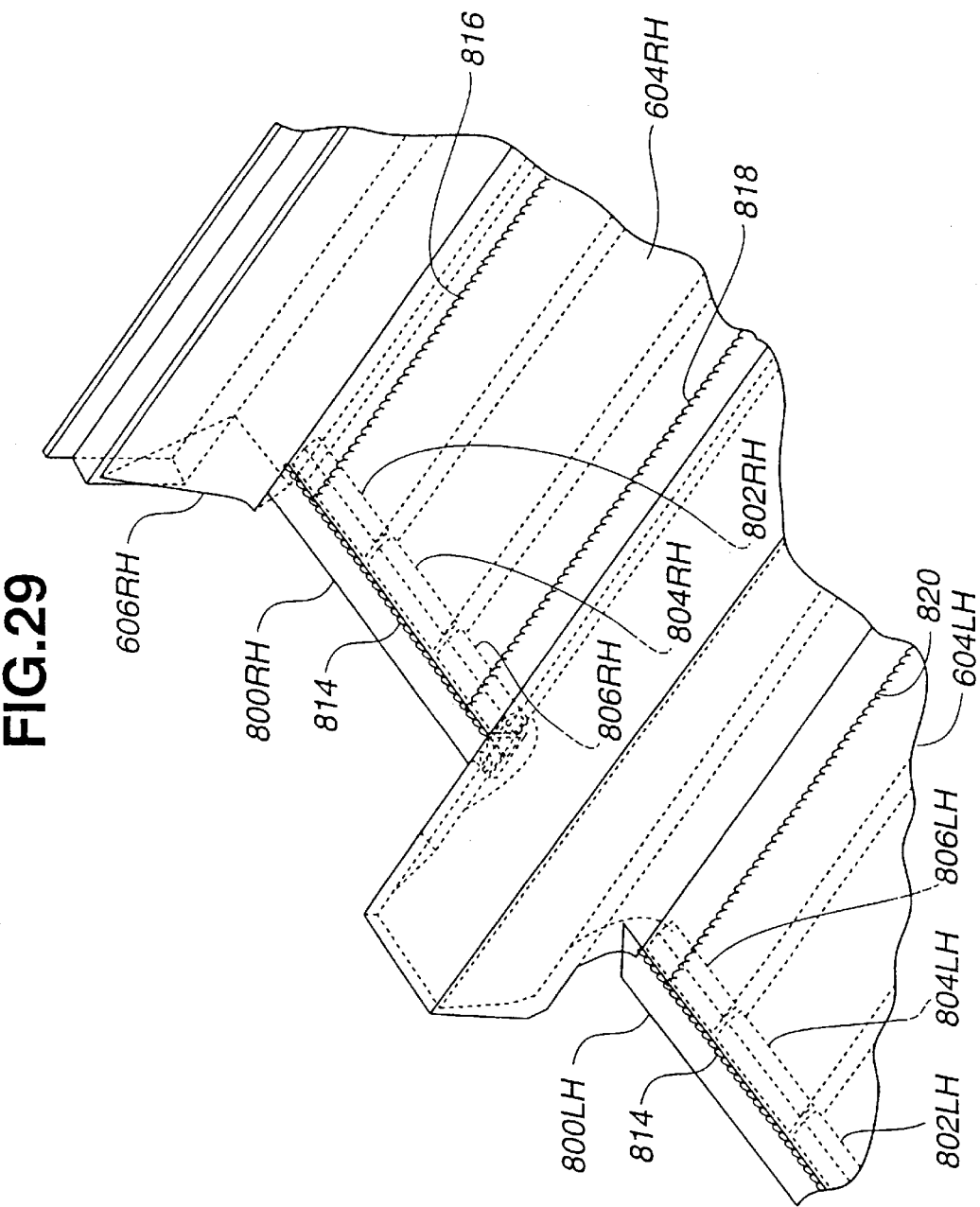
FIG. 29 is a fragmentary perspective view of the floor structure with joints shown in FIG. 26.

As readily seen from FIGS. 26 and 27, the front floor 600 is dividable into and includes, as constituent parts, a tunnel 602, a right-hand font floor center 604RH, a left-hand front floor center 604LH, a right-hand side sill 606RH, and a left-hand side sill, not shown. As best seen in FIG. 29, the right-hand front floor center 604RH interconnects the tunnel 602 and the right-hand side sill 606RH, while the left-hand front floor center 604LH interconnects the tunnel 602 and the left-hand side sill. Each of the constituent parts is an aluminum alloy extrusion die cast product that has been made, in an extrusion die casting process, by forcing molten aluminum alloy through a mold cavity in a direction parallel to a longitudinal direction of the vehicle. Each of the joints 800RH and 800LH is an aluminum alloy extrusion die cast product that has been made, in an extrusion die casting process, by forcing molten aluminum alloy through a mold cavity in a direction parallel to a transverse direction of the vehicle. The dash cross member 700 is an aluminum alloy extrusion die cast product that has been made, in an extrusion die casting process, by forcing molten aluminum alloy through a mold cavity in a direction parallel to the transverse direction of the vehicle. Via the joints 800RH and 800LH, the front floor 600 is connected to the dash cross member 700.

Each of the right-hand and left-hand front floor centers 604RH and 604LH has three independent through bores or holes extending from their front ends near the dash cross member 700 to their rear ends remotest from the dash cross member 700.

The left-hand joint 800LH is elongate and has three wedges 802LH, 804LH, and 806LH as shaded in FIG. 26, which are arranged one after another to define one side of the joint 800LH. In the same manner, the right-hand joint 800RH is elongate and has three wedges 802RH, 804RH, and 806RH, which are arranged one after another to define one side of the joint 800RH. Referring to FIG. 29, the wedges 802LH, 804LH, and 806LH are inserted into the through bores of the left-hand floor center 604LH from the bore end openings to correct vertical dimension of each of the bore openings. In the same manner, the wedges 802RH, 804RH, and 806RH are inserted into the through bores of the left-hand floor center 604RH from the bore end openings to correct vertical dimension of each of the bore openings.

These wedges 802LH, 804LH, 806LH, 802RH, 804RH, and 806RH are operative, when the front floor parts are welded as shown in FIG. 29, to reduce a clearance between the left-hand floor center 604LH and the left-hand side sill, a clearance between the left-hand floor center 604LH and the tunnel 602, a clearance between the right-hand floor center 604RH and the right-hand side sill 606RH, and a clearance between the right-hand floor center 604RH and the tunnel 602. These wedges are operative also to suppress variations between the clearances. Besides, these wedges are operative to reduce distortion owing to stress during welding operation. Accordingly, there are realized welding connections of sufficiently high level of strength, providing quality stability and reliability of the products.

Figure 28:
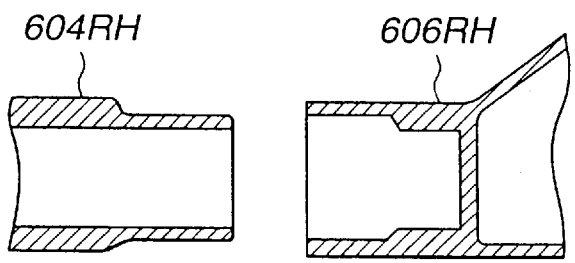
FIG. 28 is a fragmentary section taken through the line 28—28 in FIG. 27.

Referring to FIGS. 27 and 28, temporary assembly of the front floor 600 is explained step by step.

The right-side sill 606 and the right-hand front floor center 604RH are coupled with each other after moving the side sill 606RH along a horizontal plane toward and into engagement fit with the front floor center 604RH (see FIG. 28). The tunnel 602 and the right-hand front center 604RH are coupled with each other after moving the tunnel 602 along horizontal plane toward and into engagement fit with the front floor center 604RH. The left-hand front floor center 604LH are coupled with the tunnel 602 after moving the front floor center 604LH along horizontal plane toward and into engagement fit with the tunnel 602. The left-hand side sill and the front floor center 604LH are coupled with each other after moving the left-hand side sill along horizontal plane toward and into engagement fit with the front floor center 604LH.

Figure 30:
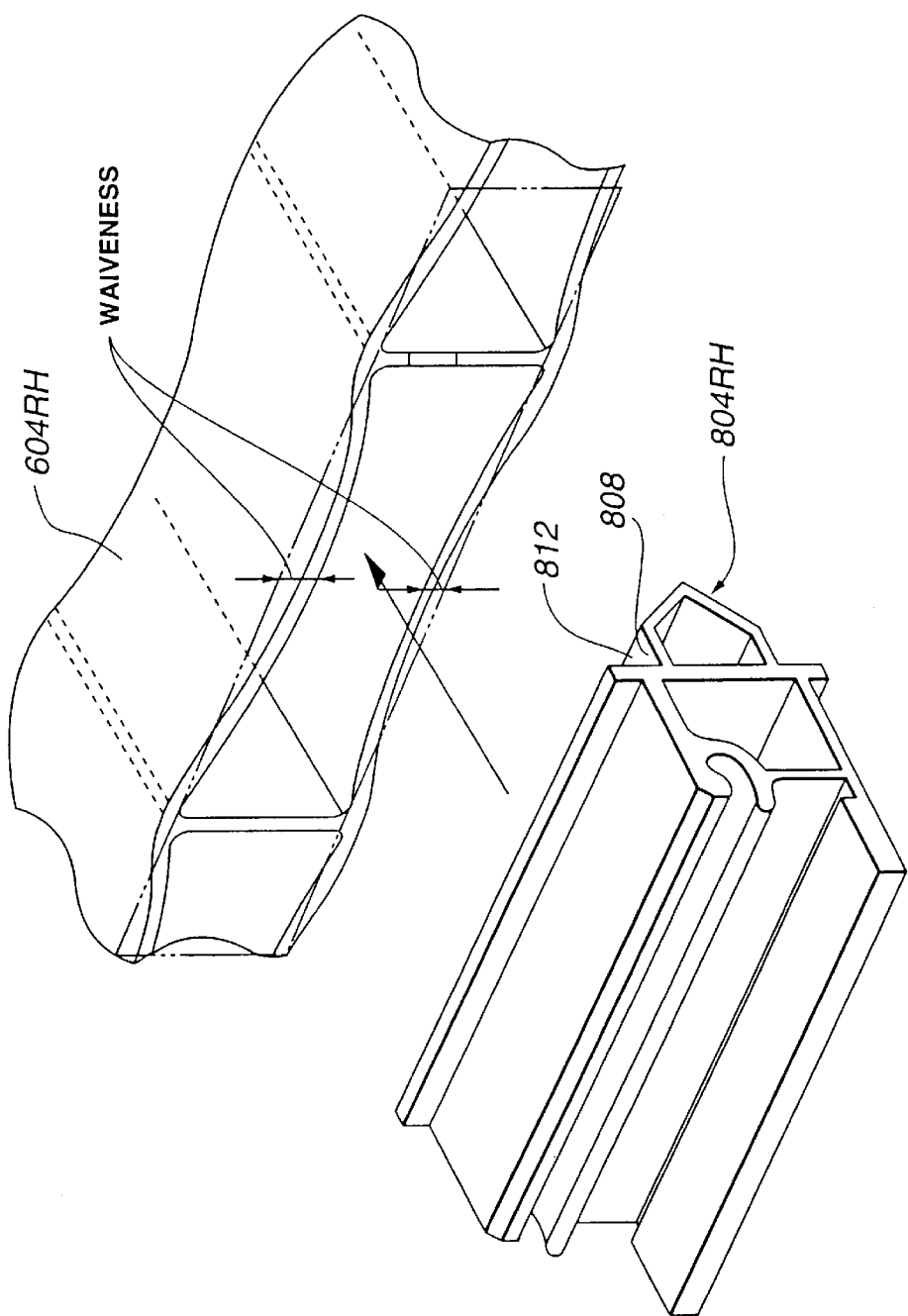
FIG. 30 is a simplified diagrammatic view illustrating a joint prior to insertion into a bore that extends inwardly from one end of a front floor center.
Figure 31:
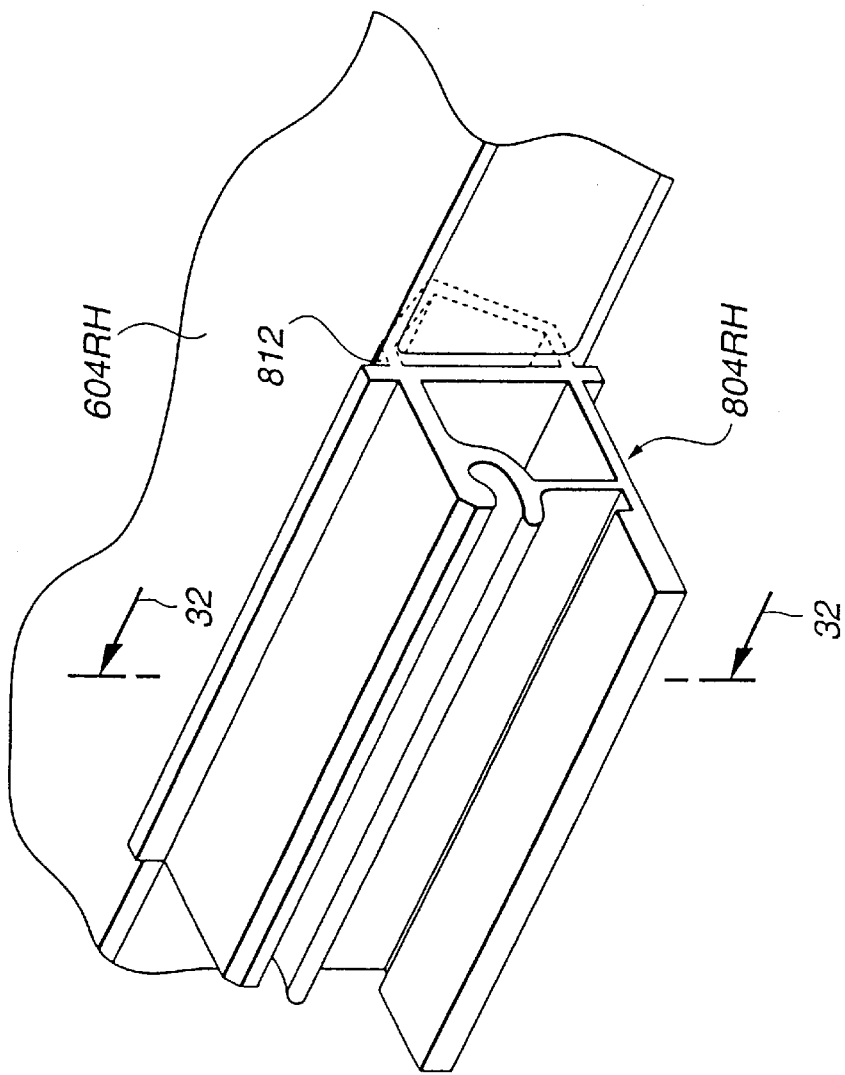
FIG. 31 is a view similar to FIG. 30 illustrating the joint inserted into the bore of the front floor center.
Figure 32:
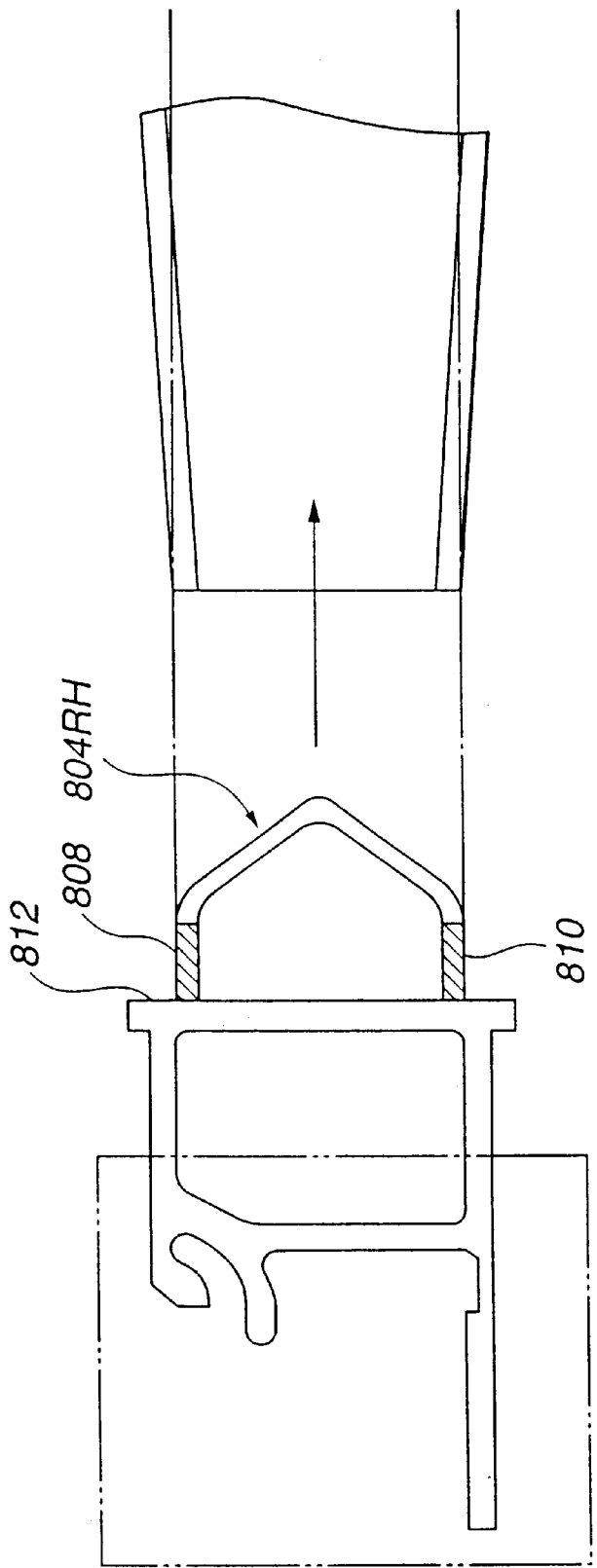
FIG. 32 is a section taken through the line 32—32 of FIG. 31 with the joint being prior to insertion into the bore of the front floor center.

At their wedges, the left-hand and right-hand joints 800LH and 800RH are inserted into the bore openings of the left-hand and right-hand front floor centers 604LH and 604RH. As best seen in FIGS. 30 and 31, the vertical dimension of each of the bore openings of the front floor center 604RH, for example, is less at a mid point between two spaced ribs than that at a point adjacent each of the ribs owing to occurrence of waviness of two spaced walls bridging the ribs. Such waviness is often found in an extrusion die cast product that has been made, in an extrusion die casting process, by forcing molten metal through a mold cavity. Thus, in an extrusion die casting process, an aluminum alloy extrusion die cast product is made such that the vertical dimension at the mid point is less than a designed dimension as indicated by one-dot chain line in FIG. 32. Inserting the wedge 804RH into the bore opening of the front floor center 604RH expands the vertical dimension at the mid point of the bore opening of the front floor center 604RH to a distance between two parallel outer walls 808 and 810 as shown in FIG. 32. In this manner, the wedge 804RH can correct the vertical dimension of the bore opening of the front floor center 604RH.

Each of the joints 800LH and 800RH has a plane wall 812 adapted to contact with end surfaces of the front floor parts for positioning them in the longitudinal direction of the vehicle. The plane wall 812 of each of the joints extends long enough to contact with the end surfaces of the associated front floor parts. The above-mentioned two parallel outer walls 808 and 810 extend from this plane wall 812 as shown in FIG. 32.

After completion of the temporary assembly, the front floor is subjected to a welding operation to produce a front floor main structure.

FIG. 29 illustrates portions to be welded.

The joints 800LH and 800RH are connected to the temporarily assembled front floor parts by welding at portions 814.

The right-hand side sill 606RH is connected to the right-hand front floor center 604RH by welding at portions 816. In the same manner, the left-hand side sill is connected to the left-hand front floor center 604LH by welding.

The right-hand front center 604RH is connected to the tunnel 602 by welding at portions 818. The left-hand front center 604LH is connected to the tunnel 602 by welding at portions 820.

In most cases, welding at the above-mentioned portions as shown in FIG. 29 increases the tendency of warping the floor parts. It is found that this tendency has been suppressed by the joints 800LH and 800RH inserted into the through bore openings of the front floor centers 604LH and 604RH.

Figure 33:
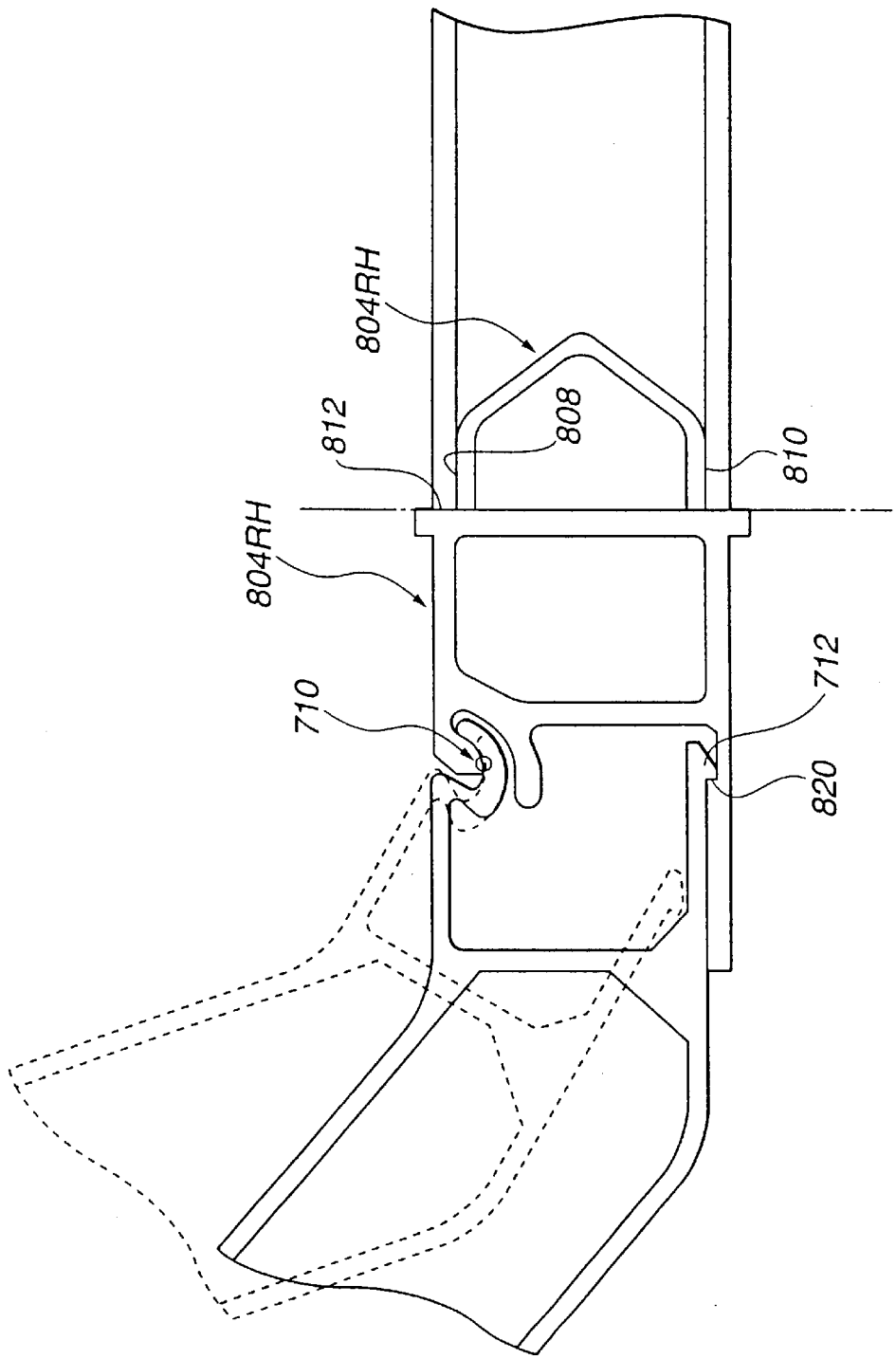
FIG. 33 is a section taken through the line 32—32 of FIG. 31 with a dash cross member coupled with the joint.

Referring to FIGS. 26 and 33, the temporary connection between the assembled front floor 600 with the joints 800LH and 800RH and the dash cross member 700 is explained.

Each of the joints 800LH and 800RH are of an aluminum alloy extrusion die cast product that has been made, in an extrusion die casting process, by forcing molten aluminum alloy through a mold cavity in the same direction as the extrusion direction of the dash cross member 26. In this case, since the extrusion directions are the same, any conventional coupling structure may be employed in connecting them, leading to increased flexibility in selecting a coupling structure for connecting the joints 800LH and 800RH to the front cross member 700.

In this illustrated example, a coupling structure is employed, which requires rotation of the dash cross member 700, about an axis 710, from a position as illustrated by broken line in FIG. 33 to a position as illustrated by the fully drawn line in FIG. 33 for engagement with the joints 800RH and 800LH. During this rotation, a claw 712 is elastically deforms to allow smooth movement. When the claw 712 engages a shoulder 820, the temporary connection between the dash cross member 700 and the joins 800LH and 800RH is completed. In temporary assembly, a worker holds an upper portion of the dash cross member 700 to impart downward force to cause its rotation about the axis 710. If a distance between the axis 710 and the upper portion of the dash cross member 700 is L1 and a distance between the axis 710 and the leading end of the claw 712 is L2, increasing a ratio L1/L2 causes a reduction in manipulating force required to complete the coupling.

The dash cross member 700 is cut upwardly to expose a flat wall portion 720. This flat wall portion 720 is adapted to rest on an upper surface 620 of the tunnel 602 upon completion of the coupling between the joints 800LH, 800RH and the dash cross member 700. The tunnel 602 has side surfaces cooperating with cutout defining edges of the dash cross member 700 to guide the dash cross member 700 to bring the flat wall portion 720 into seated engagement with the upper surface 620 of the tunnel 602. This makes it possible to accomplish the complete coupling only by rotating the dash cross member 700 about the axis 710.

Figure 34:
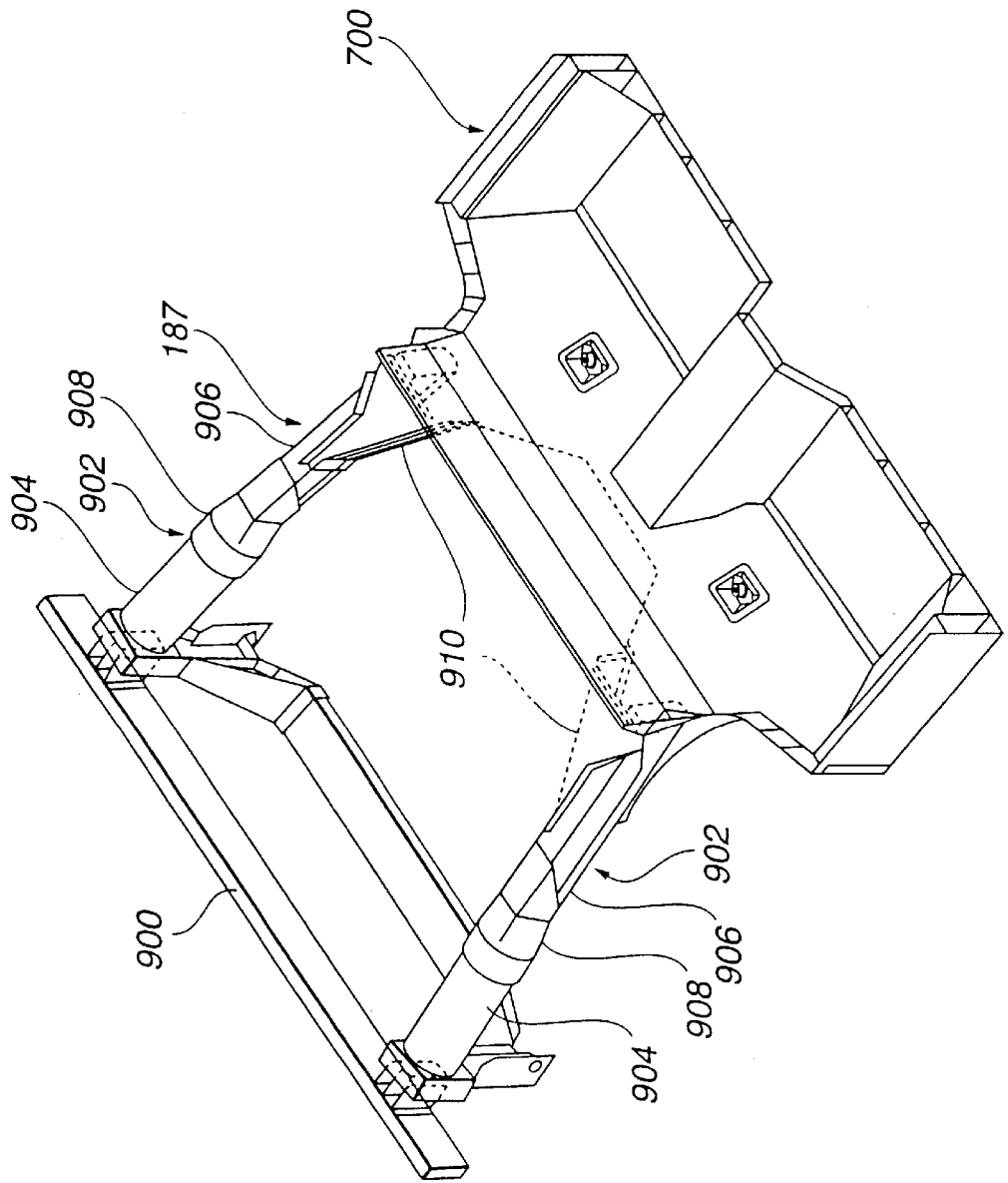
FIG. 34 is a perspective view, illustrating an engine compartment frame.
Figure 35:
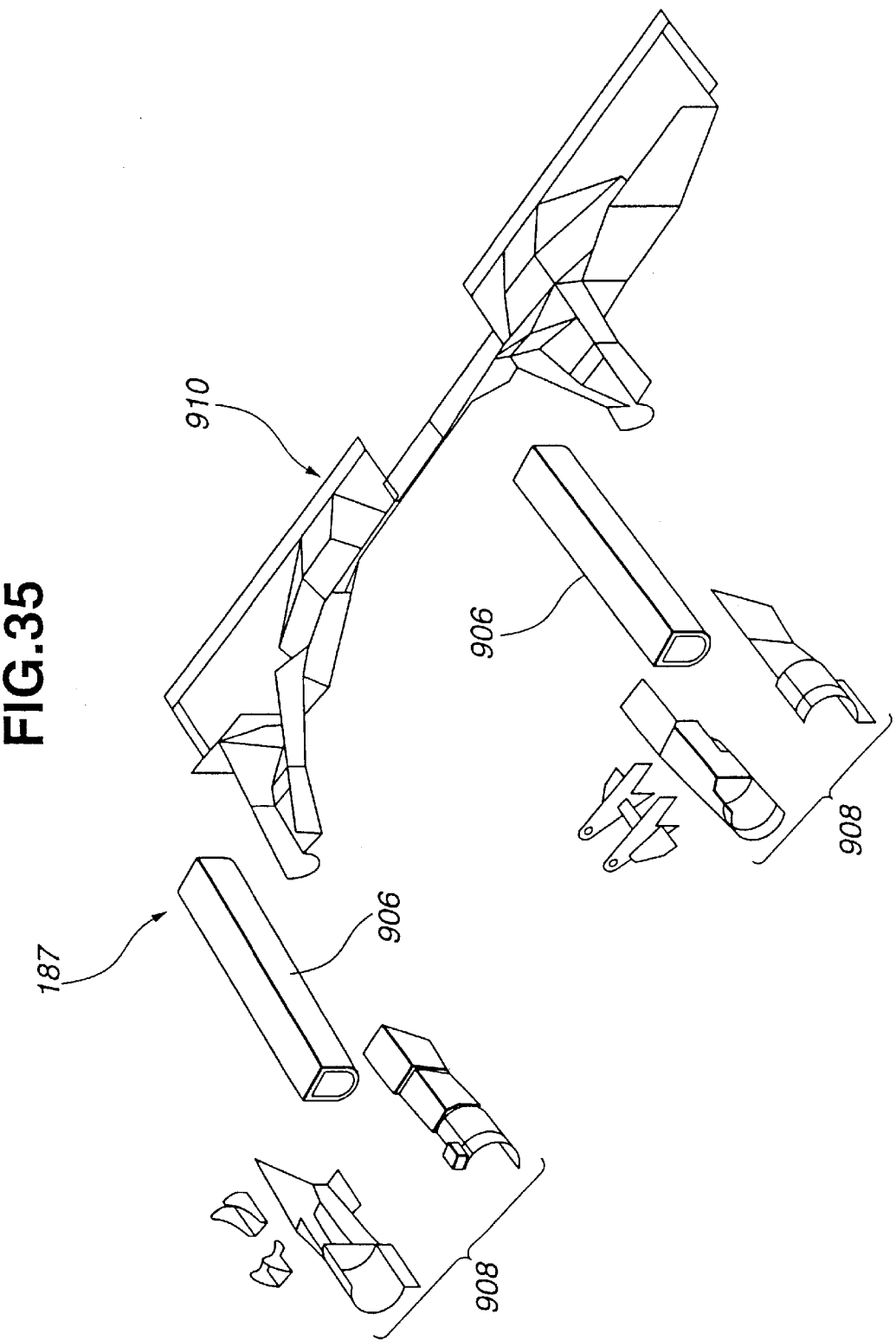
FIG. 35 is an exploded view of side members of the engine compartment frame in FIG. 34.

Referring to FIGS. 34 and 35, another example of an engine compartment frame is explained. This engine compartment frame includes a bumper stay 900, two side member assemblies 902 extending from the dash cross member 700 to the bumper stay to hold the bumper stay 900. Each of the side member assemblies 902 has a front member 904, a rear member 906, and a joint 908 interconnecting the front and rear members 904 and 906. A reinforcement member 910 supports the rear ends of the rear members 906.

Figure 36:
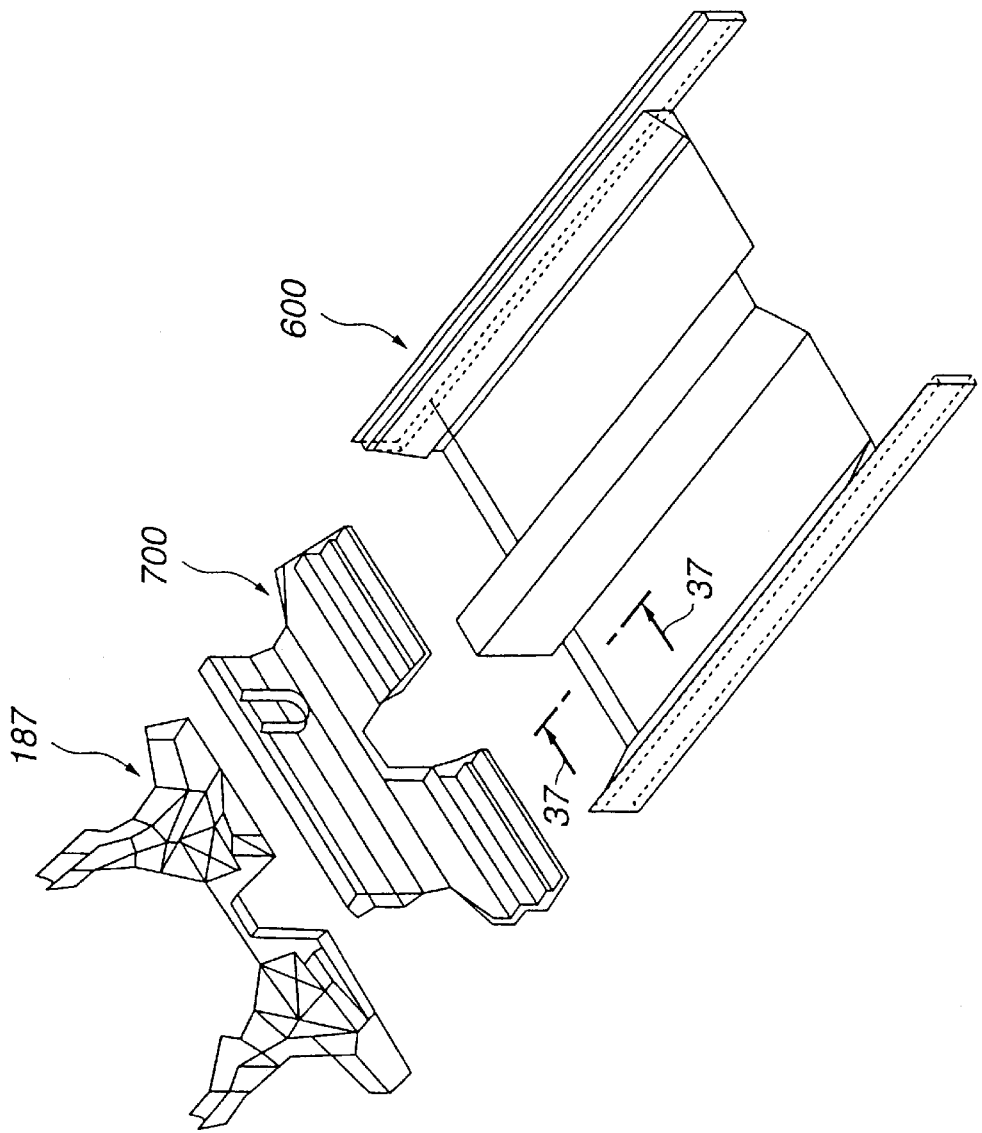
FIG. 36 is a perspective exploded view of a front floor structure, a dash cross member and an engine compartment frame incorporating another example of coupling structure between the dash cross member and the front floor structure.
Figure 37:
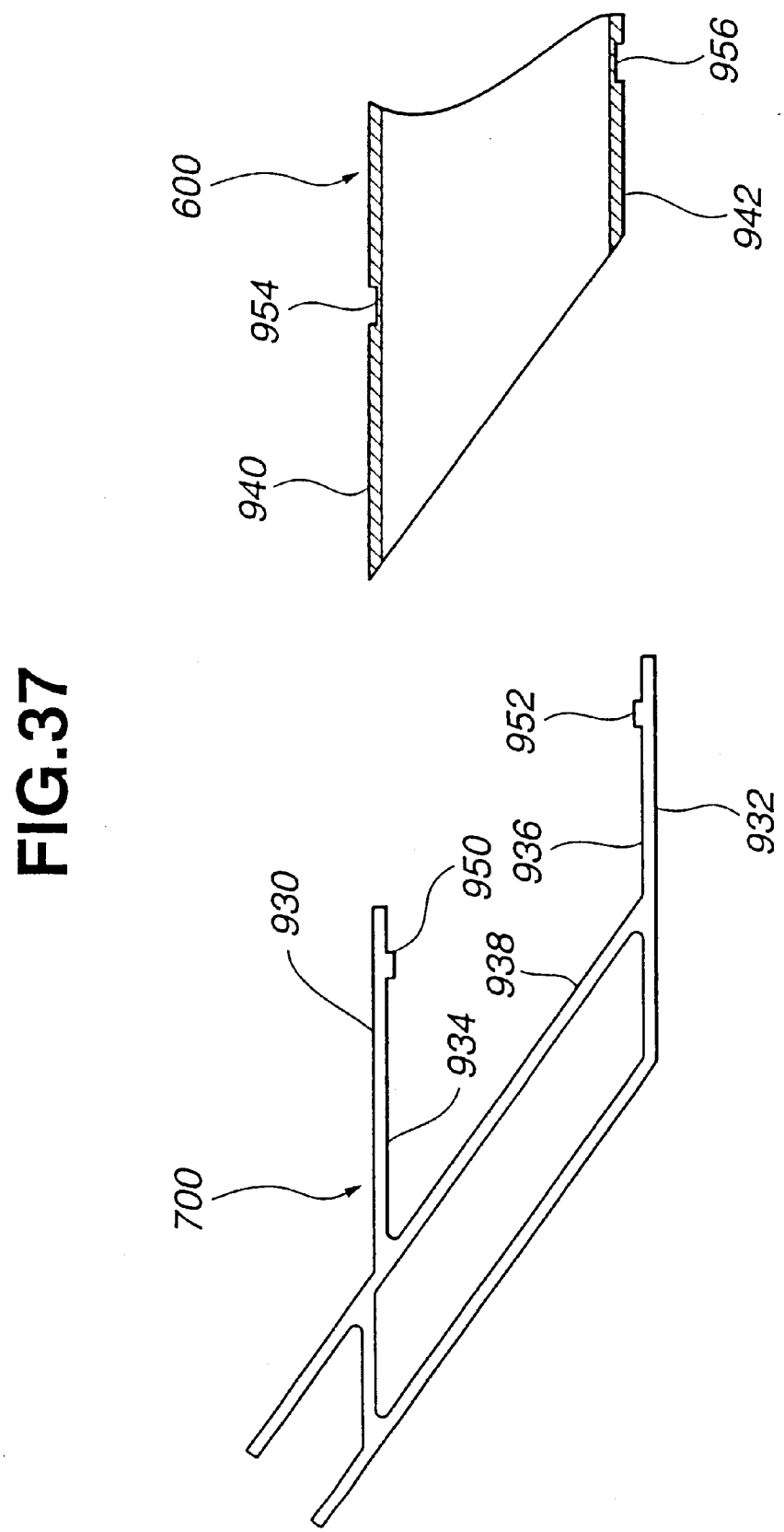
FIG. 37 is a fragmentary side view of a lower portion the dash cross member shown in FIG. 36 together with a section taken though the line 37—37 of the front floor structure, illustrating a female coupling section on the dash cross member and a male coupling section on the front floor structure.

Referring to FIGS. 36 and 37, the temporary connection of a front floor structure 600 to a dash cross member 700 will be described.

As best seen in FIG. 37, at a lower portion, the dash cross member 700 has a female coupling section, while, at a front end, the front floor structure 600 has a male coupling section. The dash cross member 700 is formed of an aluminum alloy extrusion die cast product and includes integral upper and lower flanges 930 and 932. The upper and lower flanges 930 and 932 have integral upper and lower protrusions 950 and 952 on their inner walls 934 and 936, respectively. The inner walls 934 and 936 of the flanges 930 and 932 are spaced from each other and connected to an inclined bottom wall 938, thereby defining therebetween in cooperation with the bottom wall 938 a groove for receiving the male coupling section of the front floor structure 600. At the front end, the front floor structure 600 is inclined to correspond to the inclined bottom wall 938. Extending rearwards from the inclined front end are an upper outer wall 940 and a lower outer wall 942. The inclined front end and the upper and lower outer walls 940 and 942 come into opposed relationship to the inclined bottom wall 938, the upper inner and lower inner walls 934 and 936, respectively, when the male coupling section of the floor structure 600 is inserted into the groove of the female coupling section of the dash cross member 700. The upper and lower outer walls 940 and 942 are formed with upper and lower recesses 954 and 955. The upper and lower protrusions 950 and 952 engage in the upper and lower recesses 954 and 956, respectively, when the male coupling section is inserted into the groove of the female coupling section. Engagement of the protrusions 950 and 952 with the recesses 954 and 956 will automatically position the front floor structure 600 relative to the dash cross member 700 in the longitudinal line of the vehicle. This feature has made it easier to assemble the front floor structure 600 and the dash cross member 700 with sufficiently good accuracy. No equipment to position the front floor structure relative to the dash cross member 700 is needed in assembly. This temporal connection can suppress any deviation that might be caused by vibrations during conveyance.

Preferably, the upper flange 930 should be thinner than the lower flange 932 so that the upper flange 930 can resiliently deform to facilitate insertion of the front floor structure 600 into the groove between the upper and lower flanges 930 and 932. This results in a considerable reduction in effort to be paid by worker in inserting the front floor structure into the groove between the upper and lower flanges 930 and 932.

Figure 38:
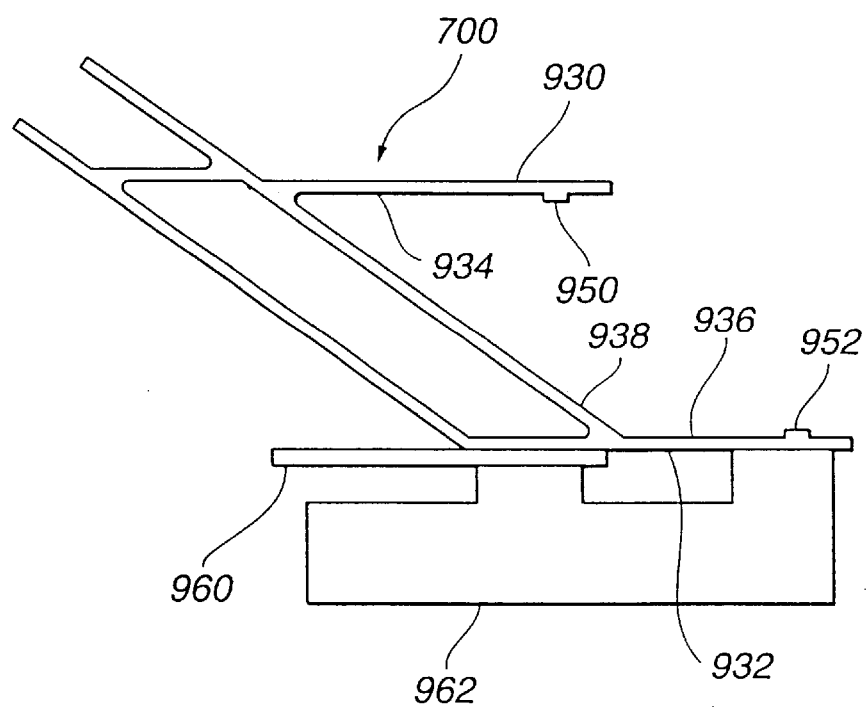
FIG. 38 is a similar section to FIG. 37 illustrating a reinforcement fixedly attached to the dash cross member and a support which the dash cross member is placed on during assembly with the front floor structure.

If, as shown in FIG. 38, the lower flange 932 is placed on a support 962, resilient deformation of the lower flange 932 is suppressed during insertion of the front floor structure 600 into the dash cross member 700. This will cause the upper flange 930 to resiliently deform greatly to allow insertion of the front floor structure 600 with less effort.

Turning back to FIG. 37, the lower protrusion 952 is not located below the upper protrusion 950. The lower protrusion 952 is remoter from a frontal end of the vehicle, not shown, toward the vehicle rear end than the upper protrusion 950 is. Besides, the upper and lower flanges 930 and 932 overlap the upper and lower outer walls 940 and 942, respectively. This connecting structure is effective in suppressing the amount of deformation of the dash cross member 700 when it is subjected to a counterclockwise bending moment viewing in FIG. 37 because of distribution of stress. Such bending moment is imparted to the dash cross member 700 during the vehicle frontal collision.

The upper flange 930 extends toward the vehicle rear end less than the lower flange 932 does to expose the lower protrusion 952. This allows worker to confirm the location of the lower protrusion 952 during assembly, making it easier for the worker to guide the front floor structure 600 into the dash cross member 700.

Figure 39:
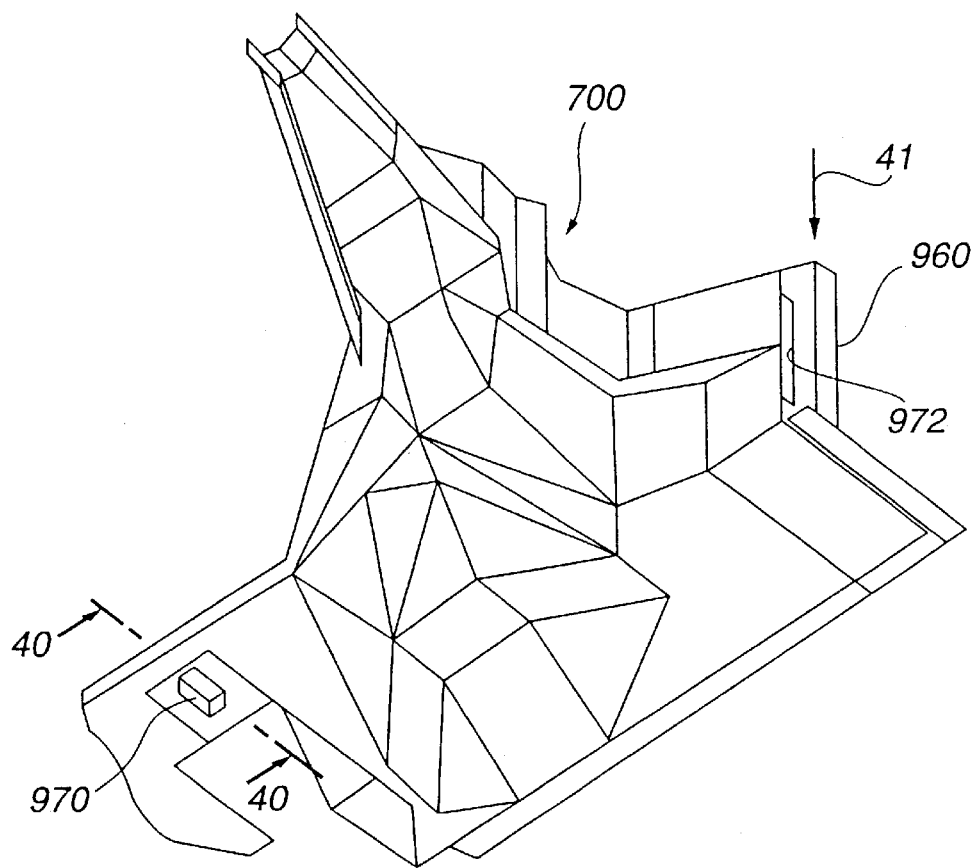
FIG. 39 is a fragmentary perspective view of the dash cross member with the reinforcement, illustrating locations of an integral boss and an integral rib of the reinforcement for positioning the front floor structure.
Figure 40:
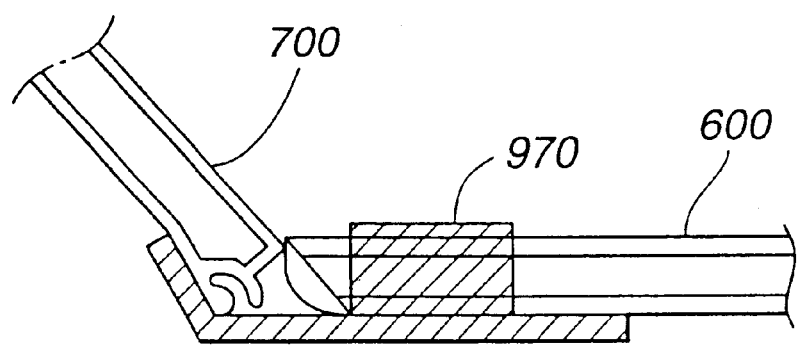
FIG. 40 is a section taken through the line 40—40 of FIG. 39, illustrating the integral boss of the reinforcement.
Figure 41:
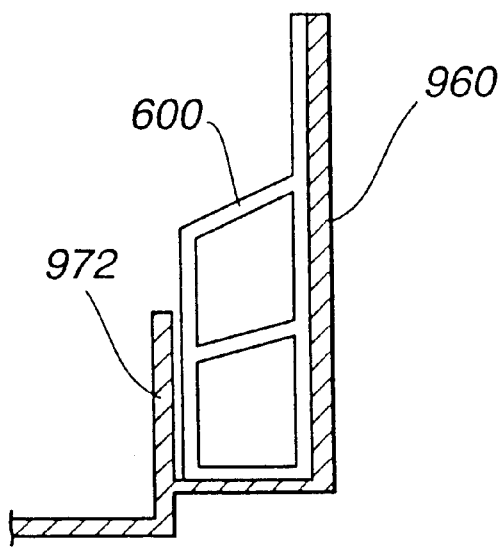
FIG. 41 is a view viewing FIG. 39 along an arrow 41, illustrating the integral rib of the reinforcement.

Referring to FIG. 38, the dash cross member 700 is fixedly attached to an upper surface of a reinforcement 960 made of a die cast product. The dash cross member 700 is made of an aluminum alloy extrusion die cast product. Referring also to FIGS. 39 to 41, the reinforcement 960 has an integral boss 970 and an integral rib 972. The boss 970 and rib 972 are used to guide the front floor structure 600 to an appropriate position relative to the dash cross member 700 during the assembly. After the assembly, laser welding fixedly interconnects the assembled engine compartment including the dash cross member 700 and the front floor structure 600.

Figure 42:
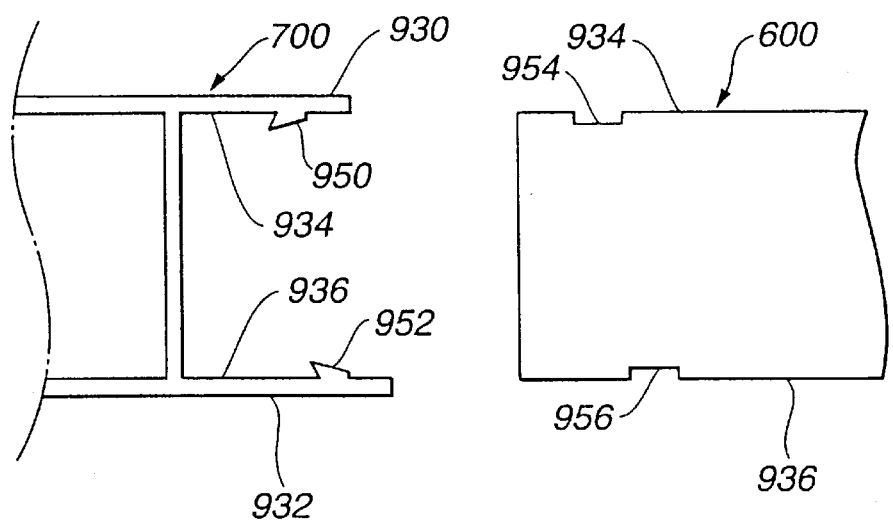
FIG. 42 is a similar view to FIG. 37, illustrating still another example of female and male coupling sections.

FIG. 42 is a similar view to FIG. 37, illustrating still another example of female and male coupling sections. This example is substantially the same as that illustrated in FIG. 37 except the profile of each of upper and lower protrusions 950 and 952. In FIG. 42, each of the protrusions 950 and 952 has a slope to assure smooth insertion of a front floor structure 600 into a dash cross member 700.

Figure 43:
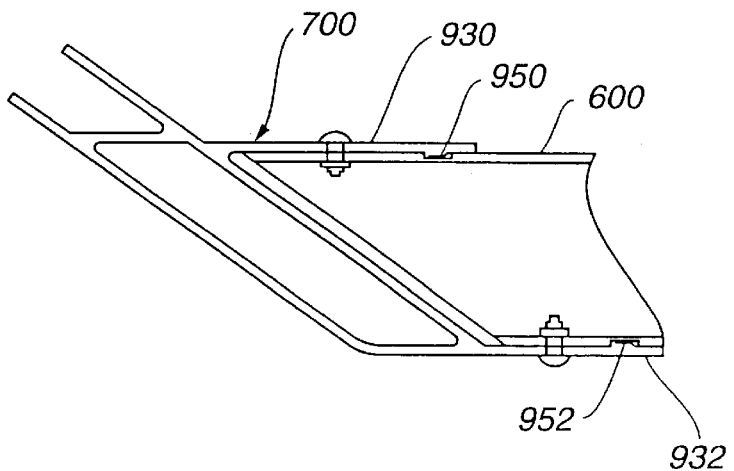
FIG. 43 is a similar view to FIG. 37, illustrating female and male coupling sections fixedly connected by bolt and nut connections.

FIG. 43 is a similar view to FIG. 37, illustrating female and male coupling sections fixedly connected by bolt and nut connections.

Figure 44:
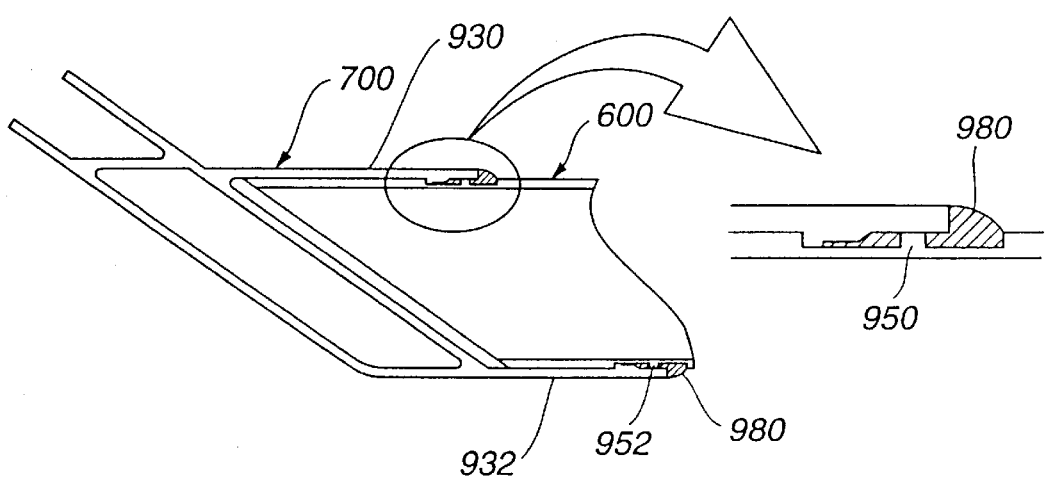
FIG. 44 is a similar view to FIG. 43, illustrating female and male coupling sections fixedly connected by adhesive.

FIG. 44 is a similar view to FIG. 43, illustrating female and male coupling sections fixedly connected by adhesive 980.

Figure 13:
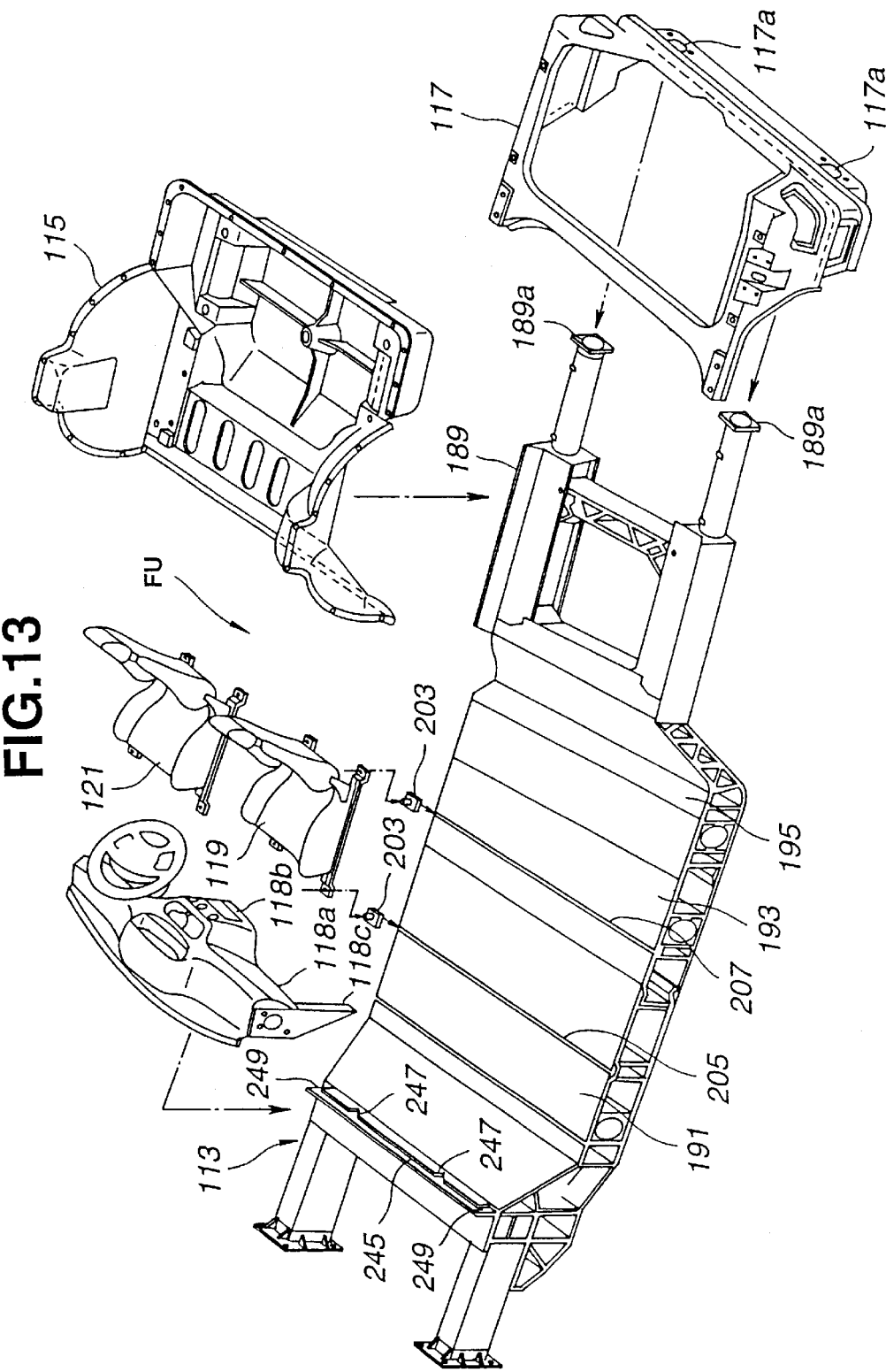
FIG. 13 is a perspective exploded view of a floor unit, illustrating how interior parts, such as a dash module, seats, a rear floor module, and a rear end module, are mounted to a floor structure.

Turning back to FIG. 13, interior parts including a dash panel 118, which includes an instrument panel, and seats 119 and 121 are mounted to a floor structure before body side units are assembled with the floor structure. Thus, the body side units do not hinder manually mounting the interior parts to the floor structure.

Turning to FIGS. 18A and 18B, the illustrated embodiment employs assembling the body side units with the floor unit, and subsequent assembling a roof unit to the assembled body side units and floor unit for accurately locating the roof unit in required accurate geometric relation. Alternatively, it may employ assembling body side units with a roof unit, and subsequent assembling the assembled roof unit and body side units for accurately locating the roof unit in required accurate geometric relation.

Turning to FIG. 22, body panels 143, 145, 147, 149, 151, 509, and 511 to be attached to a body unit are exterior color panels made of synthetic resin, thereby to make it no longer necessary to rely on conventional painting and coating line to color exterior surface of the body unit. The exterior color panels may be divided into a first group of thin panels to bridge framing portions of the body unit and a second group of thick color panels to be attached to other portions of the body unit. Each of the thick color panels, which belong to the second group, is selectable from various thick panels having different three-dimensional configurations.

Turning to FIGS. 10 and 17, a floor structure of a floor unit is constructed to minimize heat transmission due to laser weld to the interior parts mounted to the floor structure.

The content of disclosure of Japanese Patent Application No. 10-353428 (filed Dec. 11, 1998) is hereby incorporated by reference in its entirety.

The above-described implementations of the present invention are example implementations. Moreover various modifications to the present invention may occur to those skilled in the art and will fall within the scope of the present invention as set forth below.

What is claimed is:

1. A system of production of vehicles, comprising:
a floor process unit (FPU) for assembling floor constituent parts, each being a light metal extrusion die cast product and connecting said assembled floor constituent parts to make a floor structure;
an interior parts mount process unit (IPMPU) for mounting interior parts to said floor structure to make a floor unit;
a body main process unit (BMPU) for trimming each of two body side structures to make a body side unit, trimming a roof structure to make a roof unit, assembling said floor unit, said body side units, and said roof structure, and connecting said assembled floor unit, body side units and roof unit to make a body unit;
a running parts mount process unit (RPMPU) for mounting to said body unit an under running unit that includes an engine, a power train, and a suspension unit; and
an exterior parts attachment process unit (EPAPU) for attaching body panels to said body unit.

* * * * *